TELETYPEWRITER SWITCHING SYSTEM

Filed Oct. 12, 1950 24 Sheets-Sheet 1

INVENTORS D. E. BRANSON
G. A. LOCKE
BY R. C. Perry
ATTORNEY

April 14, 1953 D. E. BRANSON ET AL 2,635,139

TELETYPEWRITER SWITCHING SYSTEM

Filed Oct. 12, 1950 24 Sheets-Sheet 2

INVENTORS D. E. BRANSON
G. A. LOCKE
BY
R. C. Terry
ATTORNEY

INVENTORS D. E. BRANSON
G. A. LOCKE
BY
R. C. Terry
ATTORNEY

INVENTORS D. E. BRANSON
G. A. LOCKE
BY R. C. Terry
ATTORNEY

April 14, 1953 D. E. BRANSON ET AL 2,635,139

TELETYPEWRITER SWITCHING SYSTEM

Filed Oct. 12, 1950 24 Sheets-Sheet 5

INVENTORS D. E. BRANSON
G. A. LOCKE
BY R. C. Terry
ATTORNEY

INVENTORS D. E. BRANSON
G. A. LOCKE
BY R. C. Terry
ATTORNEY

April 14, 1953 D. E. BRANSON ET AL 2,635,139

TELETYPEWRITER SWITCHING SYSTEM

Filed Oct. 12, 1950 24 Sheets-Sheet 7

INVENTORS D. E. BRANSON
G. A. LOCKE
BY R. C. Terry
ATTORNEY

TELETYPEWRITER SWITCHING SYSTEM

Filed Oct. 12, 1950 24 Sheets-Sheet 8

INVENTORS D. E. BRANSON
G. A. LOCKE
BY R. C. Terry
ATTORNEY

TELETYPEWRITER SWITCHING SYSTEM

Filed Oct. 12, 1950 24 Sheets-Sheet 9

INVENTORS D. E. BRANSON
G. A. LOCKE
BY R. C. Terry
ATTORNEY

INVENTORS D. E. BRANSON
G. A. LOCKE
BY R. C. Terry
ATTORNEY

TELETYPEWRITER SWITCHING SYSTEM

Filed Oct. 12, 1950 24 Sheets-Sheet 11

INVENTORS D. E. BRANSON
G. A. LOCKE
BY R. C. Terry
ATTORNEY

INVENTORS D. E. BRANSON
G. A. LOCKE
BY R.C. Perry
ATTORNEY

TELETYPEWRITER SWITCHING SYSTEM

Filed Oct. 12, 1950 24 Sheets-Sheet 13

INVENTORS D. E. BRANSON
G. A. LOCKE
BY R. C. Perry
ATTORNEY

TELETYPEWRITER SWITCHING SYSTEM

INVENTORS D. E. BRANSON
G. A. LOCKE
BY R. C. Terry
ATTORNEY

April 14, 1953 D. E. BRANSON ET AL 2,635,139

TELETYPEWRITER SWITCHING SYSTEM

Filed Oct. 12, 1950 24 Sheets-Sheet 15

INVENTORS D. E. BRANSON
G. A. LOCKE
BY R. C. Terry
ATTORNEY

TELETYPEWRITER SWITCHING SYSTEM

Filed Oct. 12, 1950 24 Sheets-Sheet 16

INVENTORS D. E. BRANSON
G. A. LOCKE
BY R. C. Terry
ATTORNEY

April 14, 1953 D. E. BRANSON ET AL 2,635,139

TELETYPEWRITER SWITCHING SYSTEM

Filed Oct. 12, 1950 24 Sheets-Sheet 17

INVENTORS D. E. BRANSON
G. A. LOCKE
BY R. C. Terry
ATTORNEY

INVENTORS D. E. BRANSON
G. A. LOCKE
BY R. C. Terry
ATTORNEY

TELETYPEWRITER SWITCHING SYSTEM

INVENTORS D. E. BRANSON
G. A. LOCKE
BY R. C. Perry
ATTORNEY

INVENTORS D. E. BRANSON
G. A. LOCKE
BY R. C. Terry
ATTORNEY

TELETYPEWRITER SWITCHING SYSTEM

Filed Oct. 12, 1950 24 Sheets-Sheet 21

INVENTORS D. E. BRANSON
G. A. LOCKE
BY R. C. Terry
ATTORNEY

TELETYPEWRITER SWITCHING SYSTEM

Filed Oct. 12, 1950 24 Sheets-Sheet 22

INVENTORS D. E. BRANSON
G. A. LOCKE
BY R. C. Perry
ATTORNEY

April 14, 1953 D. E. BRANSON ET AL 2,635,139

TELETYPEWRITER SWITCHING SYSTEM

Filed Oct. 12, 1950 24 Sheets-Sheet 23

INVENTORS D. E. BRANSON
G. A. LOCKE
BY R. C. Perry
ATTORNEY

INVENTORS D. E. BRANSON
G. A. LOCKE
BY R. C. Terry
ATTORNEY

Patented Apr. 14, 1953 2,635,139

UNITED STATES PATENT OFFICE 2,635,139

TELETYPEWRITER SWITCHING SYSTEM

David E. Branson, River Edge, N. J., and George A. Locke, Glen Head, N. Y., assignors to Bell Telephone Laboratories, Incorporated, New York, N. Y., a corporation of New York Application October 12, 1950, Serial No. 189,862

27 Claims. (Cl. 178—2)

Figures 1, 25, 26:
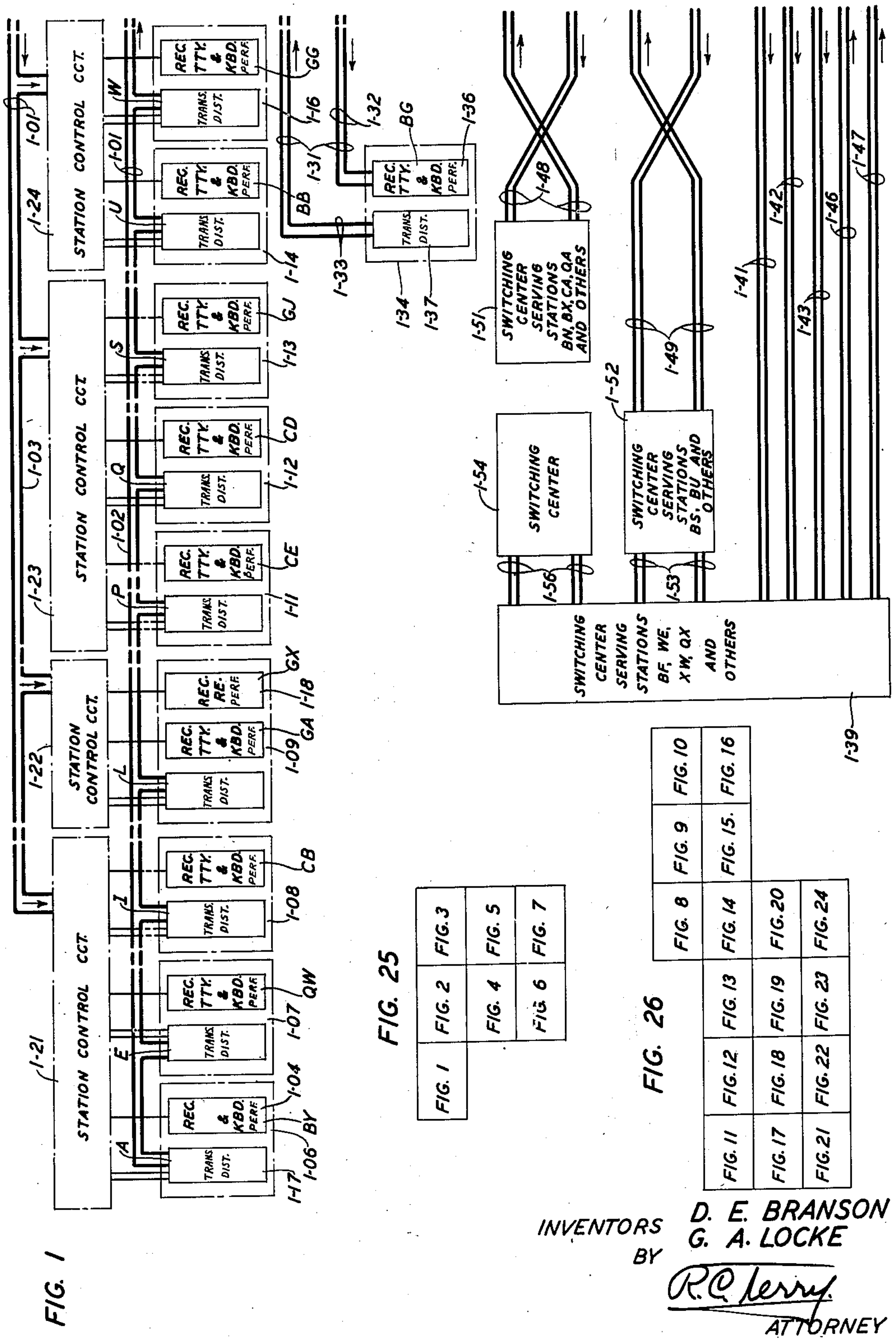

This invention relates to communication systems and particularly to automatic telegraph switching systems in which messages are automatically directed and routed to stations of ultimate destination under control of certain signals or code combinations usually preceding each message and customarily described as address codes.

More specifically the invention relates to the routing of messages designated for transmission to more than one destination or addressee station, such message usually being preceded by the call directing codes designating the stations that are to receive the messages, and being called multiple address messages.

In a copending application, Serial No. 119,184, filed October 1, 1949 by Bacon-Knandel-Krecek-Locke, there is disclosed a teletypewriter switching system including a multiple address message handling circuit that is adapted to seize two or more outlets, which may be outgoing lines or trunks or local station lines, in response to two or more address codes preceding a message, and to transmit the message to all of the seized outlets.

An object of the present invention is to expand the multiple address traffic handling facilities in a teletypewriter switching system of the kind shown in Bacon et al. application.

In Branson et al. Patent 2,430,447, granted November 11, 1947, there is disclosed a teletypewriter switching system which includes no facilities for the seizure at a switching center of a plurality of outlets in response to a plurality of call directing codes preceding a message for the routing of a multiple address message to such outlets. The present invention is adapted to be incorporated into a teletypewriter switching system of the type shown in the Branson et al. patent to provide for the handling of multiple address messages.

Accordingly, it is another object of the invention to provide multiple address message handling facilities in systems of the type shown in the Branson et al. patent which otherwise are capable of routing messages only on a single address basis to single outlets.

In the Branson et al. patent, and in the Bacon et al. copending application, there is disclosed a teletypewriter switching system in which lines incoming from and outgoing to a plurality of stations on private line or party line basis terminate in a teletypewriter switching center. There may also terminate in such switching center lines incoming from and outgoing to single stations on a private line basis, and trunks incoming from and outgoing to other switching centers. The incoming and outgoing lines connecting a particular station on a private line basis to the switching center, or connecting a party line group of stations to the switching center, or the incoming and outgoing trunks interconnecting two switching centers, comprise full duplex communication facilities or channels.

Each incoming line or runk terminates in a control circuit, which is usually designated as an incoming line circuit or incoming trunk circuit respectively, which includes a typing reperforator on which incoming messages are recorded. Associated with each such incoming line circuit or trunk circuit is a director circuit for decoding the call directing codes or address codes preceding incoming messages. The reperforator associated with any incoming line circuit or incoming trunk circuit has associated with it a transmitter distributor by means of which code combinations perforated in the tape by the reperforator are sensed and retransmitted. Under the control of the tape sensing mechanism the associated director decodes the two call directing code combinations that comprise an address code, thereby determining the outgoing line or trunk over which the message must be transmitted to reach the addressed station.

Each of the outgoing line or trunk circuits, with an exception which will be noted hereinafter with specific reference to the Bacon et al. application, has in the switching center, a control circuit which is called an outgoing line circuit or outgoing trunk circuit and which includes two reperforator transmitters. When the director has determined or identified the outgoing line or trunk over which the message is to be transmitted it tests for availability of one of the two reperforator units associated with the selected outgoing line or trunk. If one is idle the director seeks the permission of a sequence circuit to establish a cross-office transmission path from the transmitter distributor of its incoming line or trunk reperforator transmitter to the available reperforator in the selected outgoing line circuit. The sequence circuit regulates the establishment of such cross-office connections through a link circuit so that there shall be in progress at any one time the process of establishing through the link circuit not more than one such connection. Under the joint control of the director circuit and the sequence circuit the link circuit, which comprises a crossbar switch, is operated to establish a cross-office transmission path, and when the path has been established the director sets in operation it associated transmitter to cause the message, preceded by the address code, to the outgoing line or trunk reperforator to which the connection has been established, and the message is again reperforated in tape, this time in the reperforator associated with the selected outgoing line circuit or outgoing trunk circuit.

The transmitters of the outgoing line or trunk reperforators are given access to the outgoing line or trunk alternately to transmit the messages that have been recorded in perforated form in the reperforator tapes. An exception was noted above in connection with the disclosure of the Bacon et al. application. The disclosure of that application includes multichannel trunks extending between switching centers. An outgoing multichannel trunk comprises two or more outgoing transmission paths from one switching center to another, which have no outgoing reperforator transmitter but are connectable directly to the transmitter of an incoming line or trunk reperforator transmitter through the cross-office transmission path for direct message transmission across office and out over the trunk channel to the remote switching center. An incoming multichannel trunk comprises two or more incoming transmission paths from another switching center, each such path terminating in an incoming trunk circuit having an incoming reperforator-transmitter unit for recording of an incoming message preparatory to switching it across office to the outlet, such as an outgoing line or trunk, over which the message must be transmitted to reach the addressee station.

As previously mentioned, the copending Bacon et al. application discloses a feature that is not included in the disclosure of the Branson et al. patent, namely, a multiple address circuit. The multiple address circuit comprises two reperforator-transmitter units, control circuits individual to the two reperforator-transmitter units, control circuits common to both, and a director circuit associable with either of the reperforator-transmitter units for decoding all address codes preceding a message and for seizing all of the outlets represented by the address codes for retransmission of the message to all of them. A multiple address message is preceded by a special multiple address code which causes an incoming line or trunk director, upon decoding such address code, to establish a cross-office transmission path to one or the other of the two reperforators of the multiple address circuit in the same manner that such director establishes a cross-office path to an outgoing line or trunk reperforator. After the cross-office connection has been established the address codes representing addressee stations are transmitted to the multiple address circuit reperforator and are reperforated in a tape, after which the text of the message is perforated in the tape. The transmitter associated with the multiple address circuit reperforator, in cooperation with the multiple address director circuit, when the director circuit is idle or becomes idle following use by the other reperforator-transmitter unit, decodes the address codes in succession, seizes, over paths which by-pass the link circuit, the outgoing lines or trunks or other types of outlets to which the message is to be transmitted as indicated by the call address codes, transmits to each seized outlet the address code which caused its seizure, and blinds it so that it will not receive the address codes causing the seizure of other outlets. When the outlets corresponding to all of the address codes preceding the message have been seized and the address codes transmitted to them, all are unblinded and the text of the message is transmitted to them, the director circuit being released upon the initiation of text transmission to render it available to the other multiple address circuit reperforator-transmitter unit.

In some installations of the type of teletypewriter switching system disclosed in the Bacon et al. application the volume of traffic routed through the multiple address circuit is frequently or generally very heavy, so that the incoming line or trunk circuit directors encounter delays in gaining access to the multiple address circuit. Also the transmission of messages out of the two transmitters of the multiple address circuit may lag farther and farther behind the recording of the messages in the multiple address circuit reperforators, because of waiting periods involved in seizure of outlets that are found busy when tested for availability, and cannot be seized until they become idle.

A general object of the present invention, as stated previously, is to reduce the load on an overloaded multiple address circuit and to prevent the overloading of such circuit by diverting from it all multiple address messages having not more than a predetermined number of address codes preceding them, the limiting number in the specific embodiment of the invention shown and described herein being four address codes.

Another object of the invention is to convert multiple address messages having a small number of address codes to a corresponding number of single address messages.

Another object of the invention is to reintroduce the single address messages into the flow of switched message traffic through a switching center in a manner identical to that of single address messages received over an incoming line or trunk.

Another object of the invention is to precede each of the single address messages so reintroduced into the flow of switched message traffic by an address code for only one destination.

The supplementary multiple address circuit which embodies the present invention comprises a plurality of reperforator transmitters, and control circuits for selectively connecting two or more of them to the transmitter of an incoming line or trunk reperforator transmitter over a cross-office path. The control circuits include three test leads which are connected in multiple to appropriate final code points of the call directing code decoding circuits of all of the incoming line or trunk circuit directors. Each of these test leads is designated by, and is reached through the decoding of, an address code individual thereto, and one of these address codes precedes the destination address codes of a message addressed to two destinations, another of these codes precedes the address codes of a message having three destinations and the third precedes the address codes of a message directed to four destinations.

Upon the decoding of one of these three supplementary multiple address codes by an incoming line or trunk circuit director the test is made over the particular test lead and the selection of the particular test lead indicates to the control circuits of the supplementary multiple address circuit the number of reperforators that are required to record the message, whether two, three or four. There are five paths entering the supplementary multiple address circuit from the link circuit in the specific embodiment shown, and if any one of these is idle the sequence circuit jointly with the director circuit that is seeking the connection causes the link circuit to operate to establish a cross-office path to the supplementary multiple address circuit.

Upon completion of the cross-office path the supplementary multiple address circuit proceeds to test for availability of the number of reperforator transmitters indicated by the test lead over which the establishment of a connection to the supplementary multiple address circuit was initiated. The arrangement disclosed herein contemplates the provision of ten reperforator transmitters and five cross-office paths to the supplementary multiple address circuit. The number of cross-office paths and reperforators may be increased or diminished in accordance with the volume of traffic in a switching center. In the exemplary arrangement disclosed the capabilities for message handling are five two-address messages or three three-address messages with one reperforator transmitter remaining idle or two three-address messages and one four-address message or one two-address message and two four-address messages.

Assuming that the required number of reperforator transmitters are available, the supplementary multiple address circuit seizes them by operating a subordinate link circuit to connect them to the cross-office path that has been established through the principal link circuit. The supplementary multiple address circuit then sends back into the director circuit a go-ahead signal and that director starts the transmitter to transmit to the supplementary multiple address circuit the address codes designating the destinations of the message, codes indicating the end of the addresses, carriage return and line feed signals being used for this purpose as described in the Branson et al. patent and the Bacon et al. application, followed by the text of the message which ends with a disconnect or message end signal.

The supplementary multiple address circuit has a counting mechanism for counting the message destination call directing codes and a blinding circuit for permitting or suppressing response of the connected reperforator transmitters to signals received over the cross-office connection from the incoming line or trunk reperforator transmitter. Prior to the cross-office transmission of the first address code one of the reperforators is unblinded and the others that have been seized are blinded so that only one receives the first message destination address code. When that code has been recorded on that reperforator it is blinded, the counting circuit registers the reception of one address code, another reperforator is unblinded to receive the second address code. When that code has been received the second reperforator is blinded, another is unblinded and the third address code is counted. Following the recording of the last address code and the counting of that code, all of the seized reperforators are unblinded and they receive the carriage return and line feed signals, which designate the end of the addresses, followed by the text of the message and ending with the message end signal which is usually the figures or shift signal followed by an H signal. In response to the end of message signal the cross-office path through the principal link circuit to the supplementary multiple address circuit is broken down or disconnected and the connections to the several reperforator transmitters through the subordinate link circuit in the supplementary multiple address circuit are broken down. These reperforators are now available for connection to another cross-office path to receive another message.

Each of the reperforators has perforated a tape containing one message destination address code, the end of address codes comprising carriage return and line feed, the text of the message and the end-of-message signals. Each of these reperforator-transmitter units is provided with a director circuit so that these reperforator transmitters are equivalent in the switching center to the reperforator transmitters of incoming line or trunk circuit. These reperforator-transmitter units, under the control of their director circuits and in cooperation with the sequence circuit proceed to route the single address messages which are perforated in their tapes to the outlets which the address codes in the tapes indicate, over cross-office paths established through the principal link circuit to such outlets, which may be outgoing line or trunk reperforator transmitters or the channels of a multichannel trunk or the receiving teletypewriters of a local outlet.

A feature of the invention operating as set forth in the foregoing description is that it divides a multiple address message preceded by two, three or four addresses into two, three or four messages each preceded by a single address.

Another feature of the invention is that access to the supplementary multiple address circuit is gained through a multiple address code that differs from the one giving access to the regular multiple address circuit when such circuit is provided.

Another feature of the invention is that access to the supplementary multiple address circuit is gained through a different multiple address code for each of two, three, or four address messages.

Another feature of the invention is the provision of a plurality of reperforators for producing single address message tapes and in the specific arrangement disclosed there are ten such reperforators.

Another feature of the invention is that the particular multiple address code that precedes the message directing address codes and causes seizure of the supplementary multiple address circuit designates to that circuit the number of reperforators that are to be connected.

Another feature of the invention is the provision of five cross-office paths into the supplementary multiple address circuit whereby all of the reperforators may be concurrently in operation recording multiple address messages having the minimum number of message destination address codes, namely, two.

Another feature of the invention is that reperforators that have been connected to record a message are unblinded one at a time during the transmission of the address codes so that each receives only one address code.

Another feature of the invention is that the unblinding and reblinding of reperforators in succession and the final unblinding of all of them is controlled by a counting circuit that counts the address codes received over the cross-office path.

Another feature of the invention is that if a message routed into the supplementary multiple address circuit is preceded by more than four address codes all such address codes in excess of four will be recorded by all of the reperforators because they will be unblinded by the counting mechanism following the recording by one of them of the fourth address code.

A system for accomplishing the foregoing objects and others which may hereinafter be set forth or become apparent, and embodying the foregoing features and others which may also be hereinafter set forth or become apparent, may be fully understood by reference to the following detailed description to be interpreted in the light of the accompanying drawings wherein:

Figs. 1 to 7, when arranged in accordance with the pattern shown in Fig. 25 contained on the same sheet as Fig. 1 show in general schematic form a typical system comprising switching centers interconnected by trunks and each having lines which it serves.

Figs. 8 to 24, when arranged in accordance with the pattern shown in Fig. 26, which is contained on the same sheet as Figs. 1 and 25, show the complete circuits of a supplementary multiple address circuit in accordance with the present invention and portions of cooperating circuits of a switching center.

Figure 4:
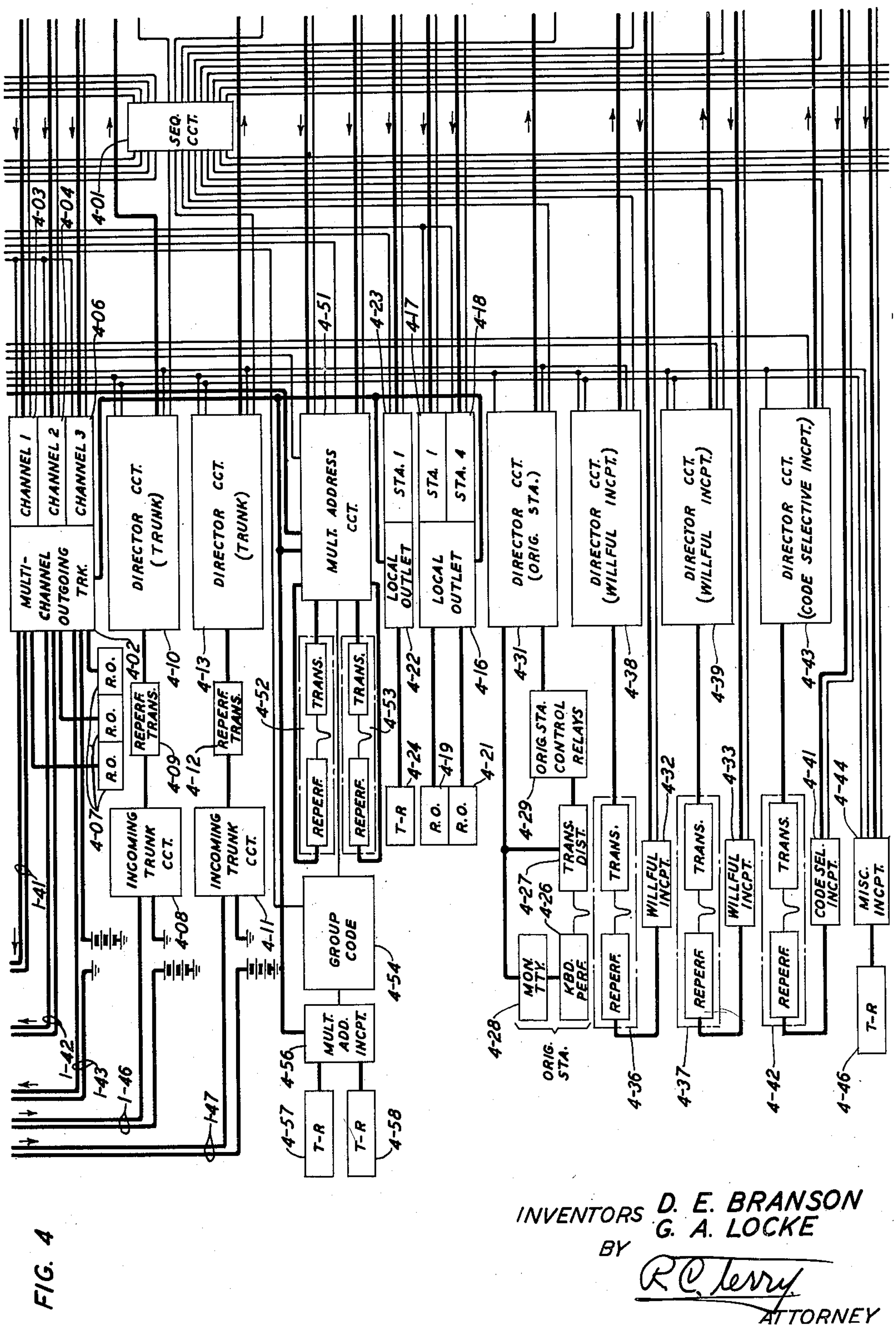
Figure 5:
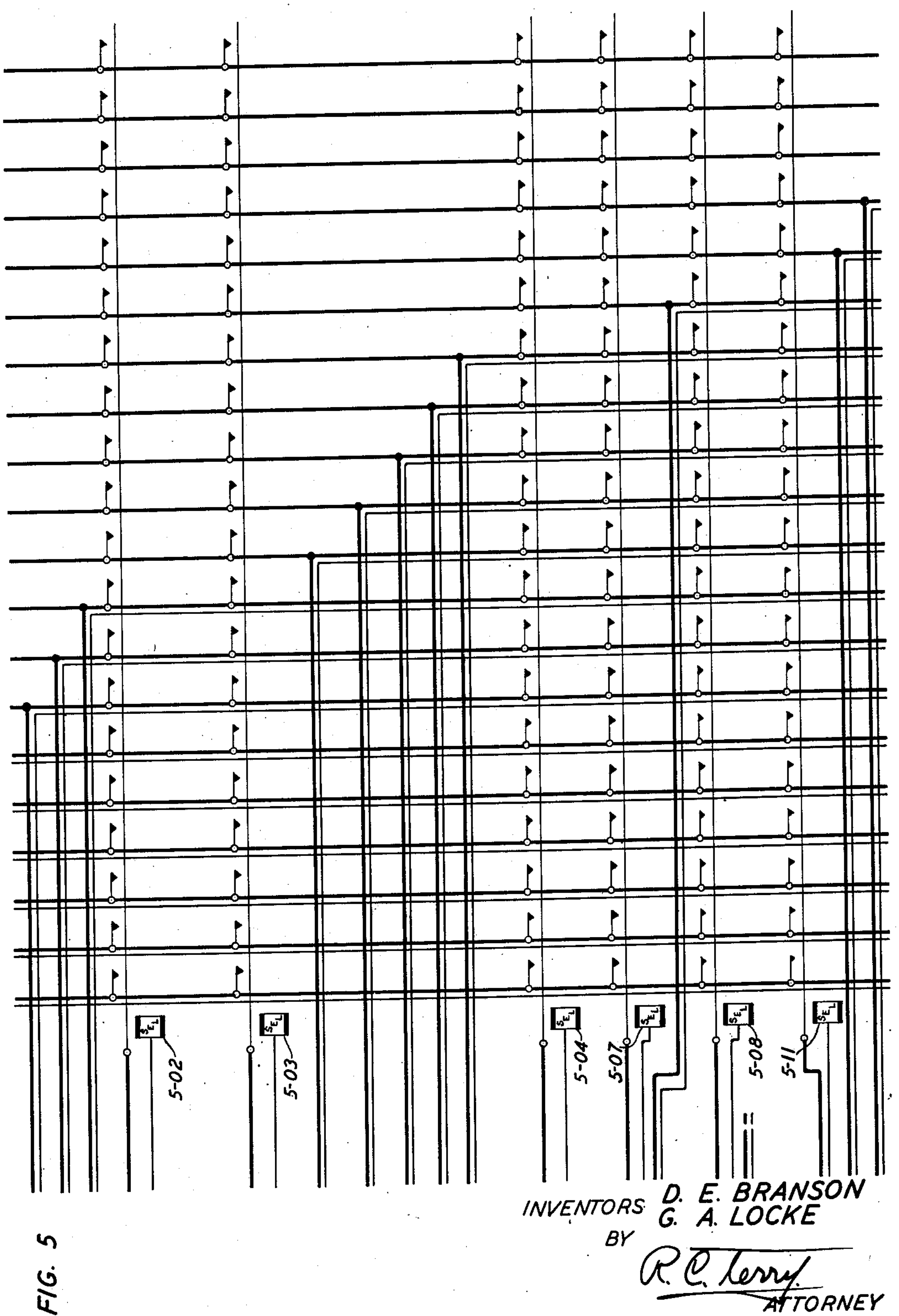
Figure 6:
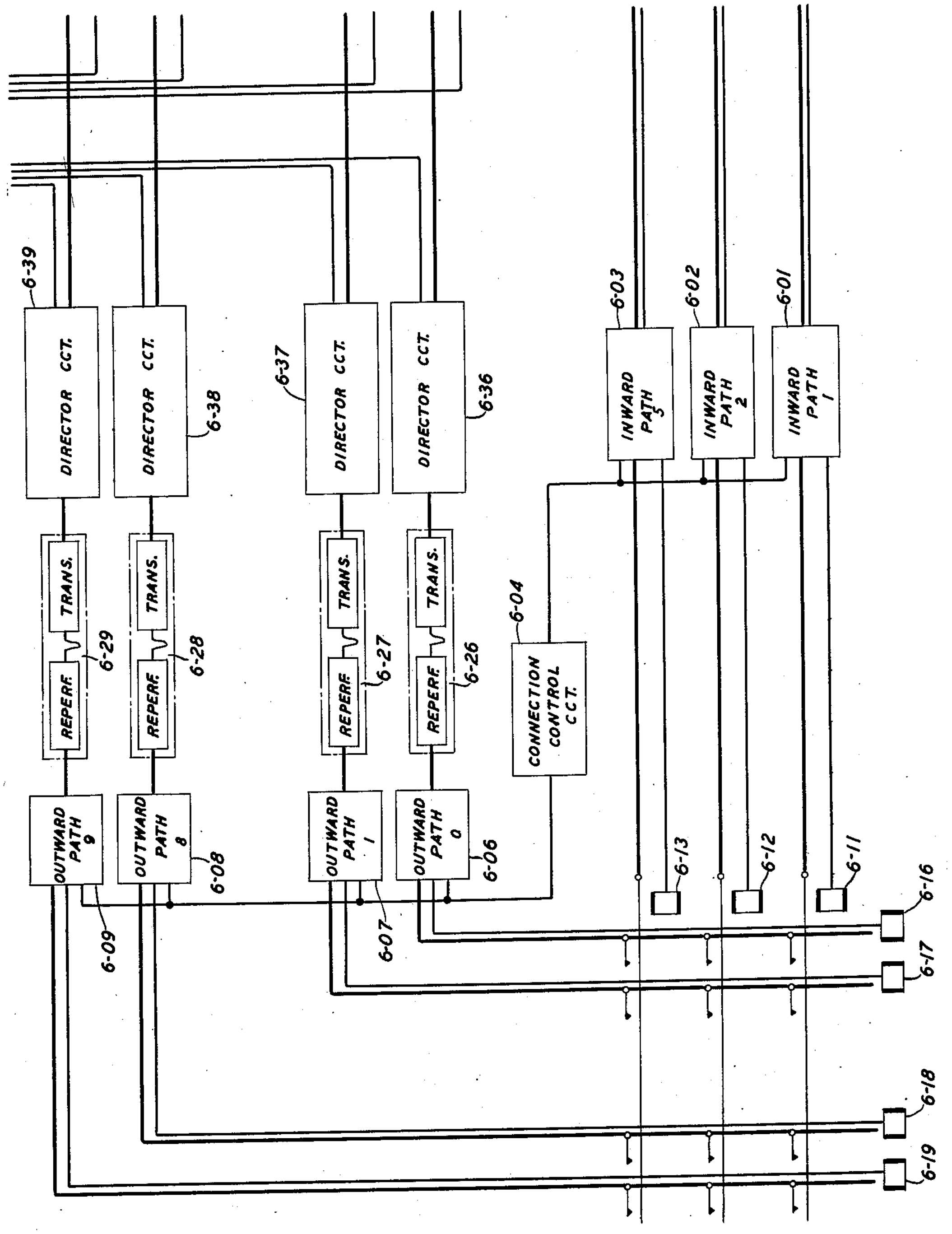
Figure 7:
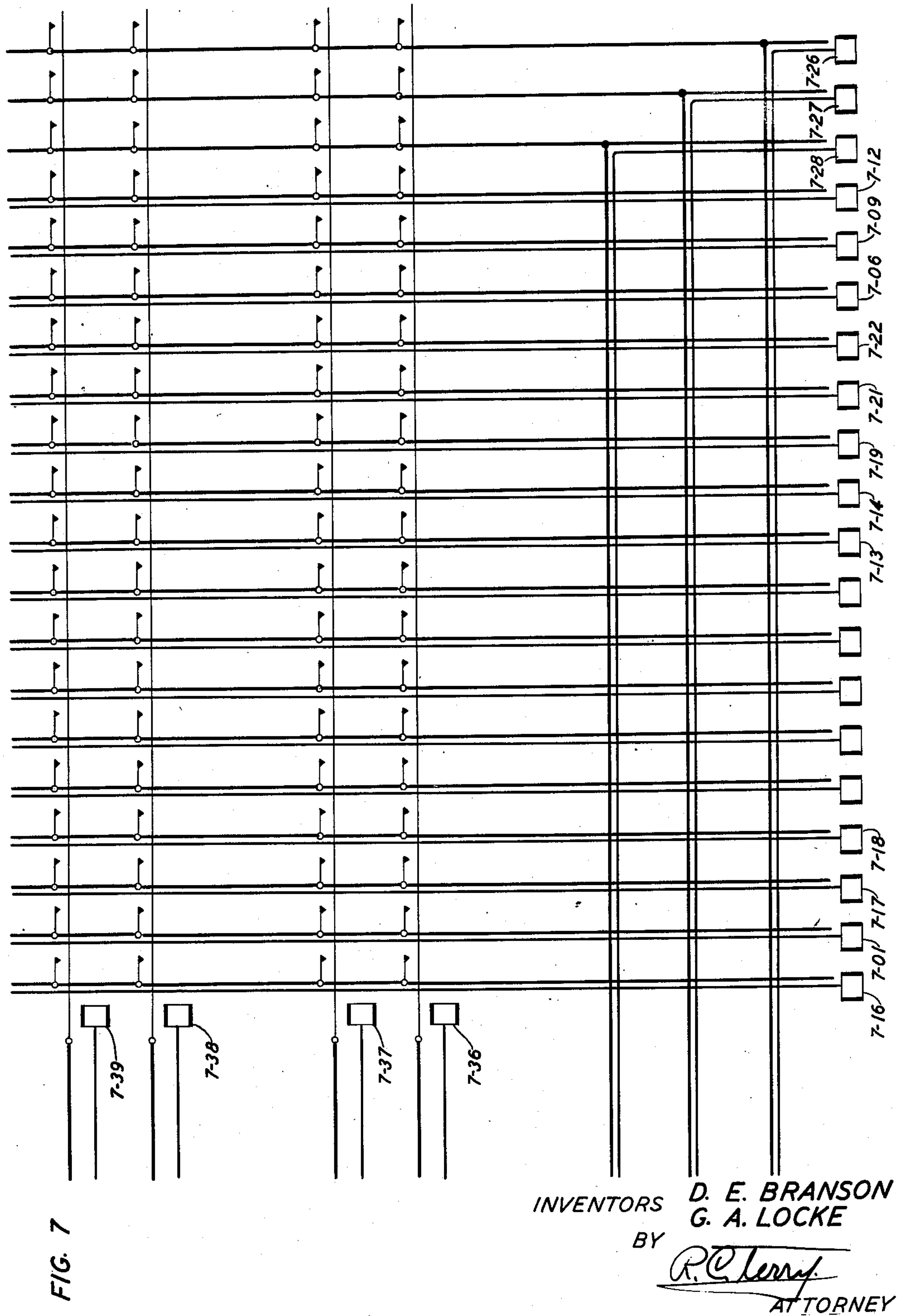

For purposes of identification, Fig. 1 corresponds with and represents the disclosures of Figs. 3 to 8, inclusive, of the Bacon et al. application, and Figs. 2 to 5 and 7 correspond with and represent the disclosures of Figs. 9 to 12 of that application. Fig. 6, in combination with Fig. 7, represents schematically a supplementary multiple address circuit in accordance with the present invention and the manner in which it cooperates with other circuits of the switching center represented in Figs. 2 to 5, inclusive, 7 and the upper portion of Fig. 1, the detailed circuits of which are found in Figs. 13 to 185 of the Bacon et al. application.

Figure 2:
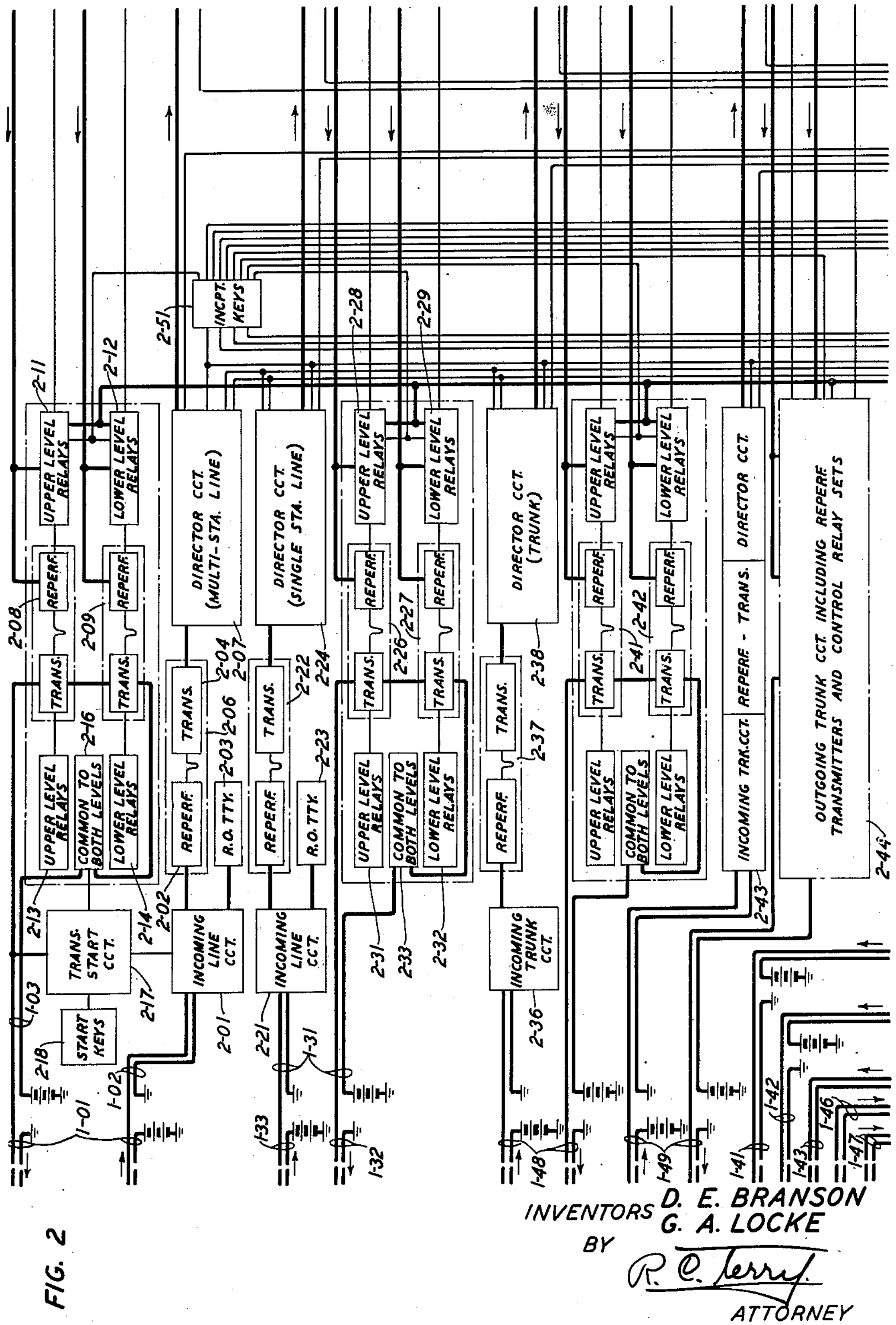
Figure 3:
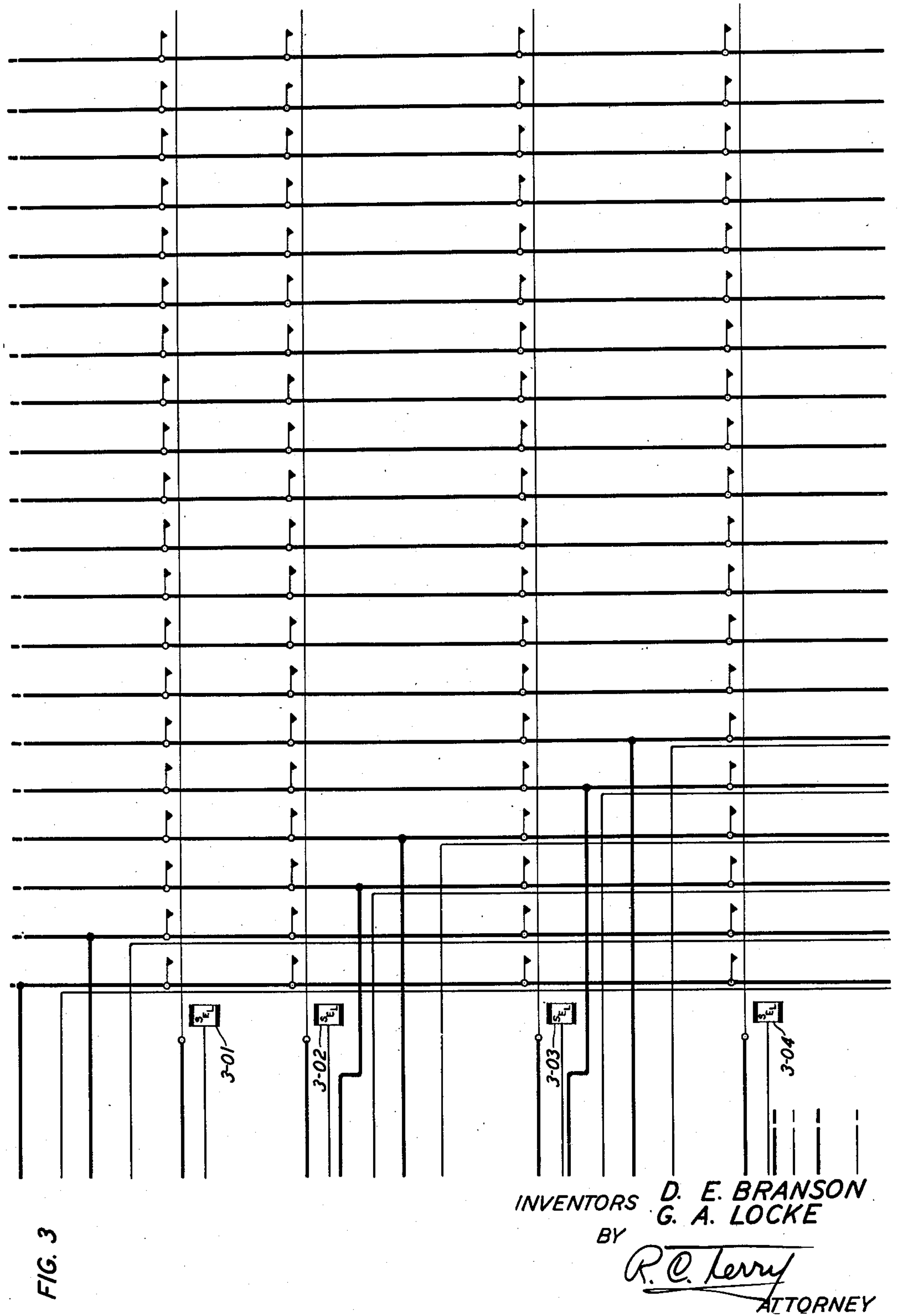
Figure 8:
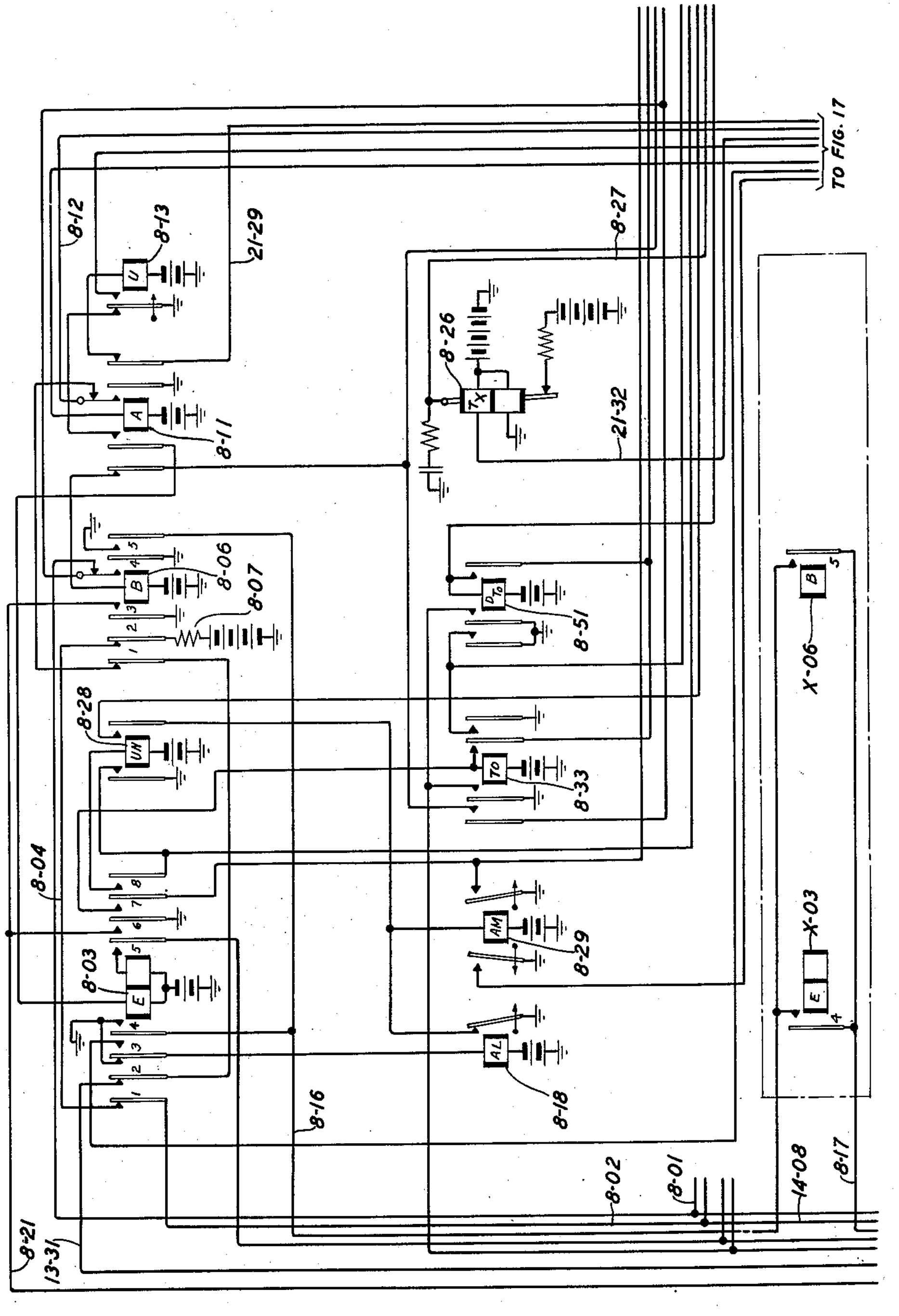
Figure 9:
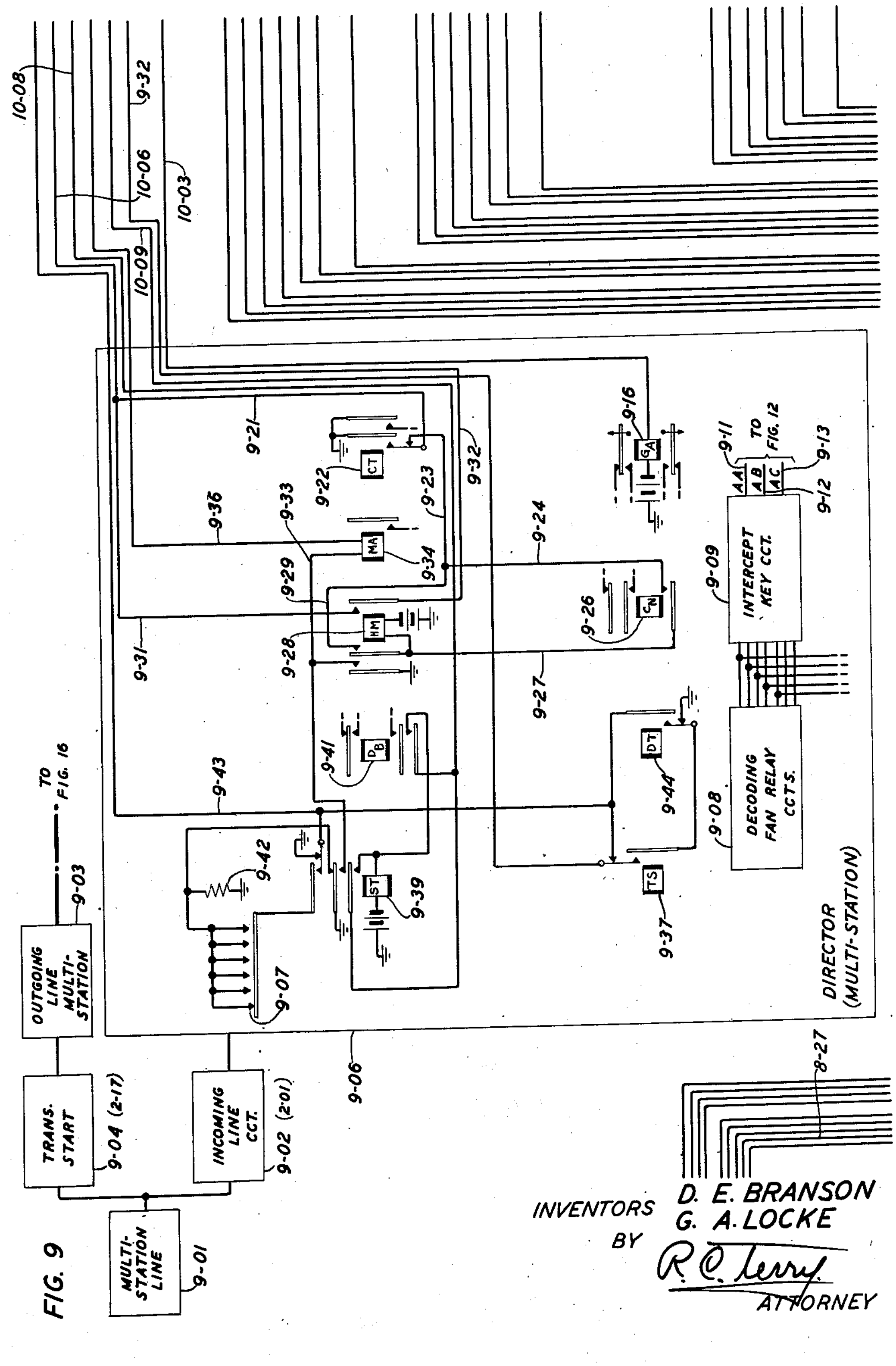

Fig. 9 shows partly by labeled rectangles and partly by circuits as much of a switching center, represented schematically in Figs. 2 and 4 except for the link circuit which is represented schematically in Figs. 3 and 5, as is considered necessary to an understanding of the way in which the supplementary multiple address circuit, represented schematically in Fig. 6, is incorporated into and cooperates with the switching center. The detailed circuits of the supplementary multiple address circuit are contained in Figs. 8, 11 to 15, and 17 to 24.

In the diagrammatic and circuit figures of the drawings, the reference numerals follow a plan, in accordance with which each includes a dash, the numbers preceding the dash identifying the figure of the drawings in which the element identified appears, or in the case of a conductor extending through more than one figure, the figure of the drawings in which the conductor is first identified as a circuit path, and the number following being the individualistic portion of the reference numeral and identifying the element or conductor.

*General description*

The general features of the system will now be described with reference to Figs. 1 to 7, inclusive, when arranged as shown in Fig. 25. Fig. 1 shows in block diagrammatic form the stations and equipment connected to a typical full duplex party line or multiple station line 1—01. The full duplex party line 1—01 comprises a transmission channel or path 1—02 for transmitting signaling impulses from the outlying subscriber station to the central switching station shown in Figs. 2 to 7 and a receiving channel 1—03 for transmitting signaling impulses from the switching center to the outlying subscriber station.

The party line 1—01 has been shown in the drawing as comprising two separate and distinct metallic transmission circuits. It is to be understood, however, that these lines or paths may include any of the usual types of transmission systems suitable for the transmission of telegraph permutation code pulses. These two channels may consist of the two paths of a bridge type full duplex telegraph transmission system, in which case the impulses transmitted to and from the central office are transmitted over a single line conductor as is well understood in the art. These lines may also include telegraph channels of composite telephone and telegraph lines, channels of voice frequency carrier current, channels of high frequency carrier current, radio channels and time division multiplex channels, and the method of transmission over these channels may be in accordance with any of the well-known transmission systems including pulses of current and no current, pulses of positive current and negative current, pulses of currents of different magnitudes, pulses of carrier current and no-carrier current, pulses of carrier currents of different frequencies, and pulses of current in some portions of the system may be represented by pulses of no current in other portions of the system as is well understood in the various types of telegraph transmitting systems.

The full duplex telegraph line 1—01 extends to nine outlying subscribers' stations designated 1—06 through 1—09, 1—11 through 1—14 and 1—16. Each of the subscriber stations is provided with a receiving teletypewriter and keyboard perforator, represented in the case of the station 1—06, by the labeled rectangle 1—04, and is also provided with a tape transmitter distributor represented in the case of the station 1—06 by the rectangle designated 1—17. The function of the receiving teletypewriter 1—04 is to receive messages transmitted from the switching center. The function of the keyboard perforator associated with the receiving teletypewriter is to prepare tape perforated in accordance with messages to be transmitted from the station to the switching center. The function of the transmitter distributor 1—17 is to transmit messages under the control of the perforated tape.

While receiving apparatus and transmitting apparatus have been shown at each of the subscriber stations, it will be readily understood by those skilled in the art that receiving-only equipment may be provided at certain subscriber stations while transmitting apparatus only may be provided at other subscriber stations. Since the receiving and transmitting equipments operate substantially independently of each other, each station may be arranged to transmit or receive, or both, in accordance with the subscriber's particular requirements.

Typical apparatus suitable for use in combination with the circuits of the system described herein for receiving messages and perforating tape and transmitting signals in accordance therewith are described in detail in United States Patents 1,965,972 granted July 10, 1934 to C. W. Burcky et al.; 1,965,602 granted July 10, 1934 to R. A. Lake; and 1,969,891 granted August 24, 1934, to R. A. Lake et al., and the disclosures of these patents are incorporated herein by reference as part of the present specification.

The receiving and transmitting equipment at each of the subscriber stations is controlled from a secondary or subordinate switching center or control selector which may be located in the immediate vicinity of or on the premises of one or more outlying subscriber stations. In Fig. 1 four such secondary switching centers have been shown, the subordinate switching center 1—21, or station control circuit as it is also called, serving the subscriber stations 1—06, 1—07 and 1—08, the station control circuit 1—22 serving only the one subscriber station 1—09, the station control circuit 1—23 serving subscriber stations 1—11, 1—12 and 1—13, and the station control circuit 1—24 serving the subscriber stations 1—14 and 1—16. The provision of the station control circuit 1—22 serving only the single subscriber station 1—09 is explained by the fact that this subscriber station is provided with two receiving recorders, namely, a receiving printer and a tape reperforator, which are to receive messages on a selective basis, and the station control circuit is needed in order to effect the selection between them. The reperforator is designated by the reference numeral 1—18 and may be of the type shown in Patent 2,042,788 granted June 2, 1936 to H. L. Krum or Patent 2,255,794 granted September 16, 1941 to R. A. Link, the disclosures of which are incorporated by reference as part of the present specification.

The station control circuits include a monitoring selector connected to the receiving channel 1—03 of multiple station line 1—01, which selector is provided with numerous contacts that are selectively actuated in response to various signals transmitted over the party lines. These contacts are employed to control the switching apparatus for connecting the receiving equipment at the several subscriber stations to the receiving channel 1—03 and for controlling the operation of the tape transmitters to transmit signals over the transmission channel 1—02.

The monitoring selector which is employed as an element of the station control circuit may be characterized as a sequentially operated teletypewriter selector. It is arranged to receive permutation code telegraph signals and to operate selectable elements in response to the reception of code combinations. It is provided with interlocking latches by means of which certain of the selectable elements may respond to their assigned code combinations only upon being unlatched or prepared for operation by the signal responsive operation of a selectable member in response to a different code combination or the same code combination, from which it follows that the first-mentioned selectable member is operable only in response to reception of the particular two-code combinations in sequence. In the case of the control of transmitters, single code combinations are employed for effecting the desired controls whereas the receivers, such as printers or the reperforator 1—18, are connected selectively to the receiving channel 1—03 by address codes or comprising a sequence of two call directing code combinations. Typical address codes are shown in Fig. 1 for the receiving equipments associated with the receiving channel 1—03. Thus the receiving teletypewriter 1—04 at the station 1—06 is designated by the address code BY, the receiver at station 1—07 has the address code QW, the receiver at station 1—08 has the address code CB, the receiving teletypewriter at station 1—09 has the address code GA and the receiving reperforator at that station has the address code GX, and the receivers at stations 1—11, 1—12, 1—13, 1—14 and 1—16 have the address codes CE, CD, CJ, BB and GG, respectively.

Any subscriber station, in addition to being connectable by the station control circuit to the receiving channel 103 in response to its assigned address code, may also be connected in response to one or more group address codes. These are two-letter codes that are assigned in common to a plurality of stations to which messages of a particular type or character are frequently directed, and the group address code will cause the message to be transmitted to all of the stations, regardless of where located in the system, to which that group address code has been assigned. As disclosed in the Bacon et al. application, the group code circuit functions in cooperation with the multiple address circuit disclosed in that application. It is not contemplated that messages invalving group codes shall be routed into the supplementary multiple address circuit of the present invention, since the supplementary multiple address circuit would thereby be burdened with the handling of a message that would have to be routed from the supplementary multiple address circuit to the multiple address circuit disclosed in the Bacon et al. application in order to gain access to the group code circuit. Accordingly, no assignments of group address codes to the stations in Fig. 1 have been indicated.

In addition to assigning address codes to the receiving equipment at each of the stations connected to multiple station line 1—01, a code is assigned to each transmitter connectable thereto, to enable this transmitter to be controlled from the central switching station through the subordinate switching center or station control circuit. Thus the transmitter 1—17 at station 1—06 is assigned code A and the transmitters of the eight other stations associated with the multiple party line are assigned codes E, I, L, P, Q, S, U and W.

Another full duplex channel appearing in Fig. 1 is designated by the reference numeral 1—31 and comprises receiving channel 1—32 and transmitting channel 1—33. Full duplex channel 1—31 terminates in a single station 1—34 which has exclusive use of the channel and comprises a receiving teletypewriter combined with a keyboard perforator, this unit being designated 1—36 and being connected to receiving channel 1—32, and a tape transmitter distributor 1—37 connected to transmitting channel 1—33.

Since the tape transmitter 1—37 has sole and exclusive access to the transmitting channel 1—33, it has no transmitter code, as have the transmitters associated with the multiple station line, because transmission from it is not controlled from the switching center and it may transmit at any time. There is no station control circuit associated with the station 1—34 because the receiving teletypewriter 1—36 is always connected to the receiving channel 1—32 and will receive all signals incoming over that channel. The channel 1—32 is selectable at the switching center by the individual address code BG.

The full duplex party line 1—01 and the full duplex single station line 1—31 extend to the switching center which serves those lines, the circuits and apparatus of which are indicated diagrammatically in Figs. 2 to 7, inclusive. The switching center, in addition to serving the lines indicated, also has connection directly and indirectly by means of trunk circuits with other switching centers. At the bottom of Fig. 1 a multiple channel trunk directly connects the switching center shown in Figs. 2 to 7 to a switching center 1—39. It has been assumed that there is sufficient traffic from the switching center at the right, comprising Figs. 2 to 7 to the switching center 1—39 to justify three transmission channels in that direction, and these three channels are designated by the reference numerals 1—41, 1—42 and 1—43. It has further been assumed that the volume of traffic in the opposite direction is not so heavy and that it may be accommodated by two channels designated 1—46 and 1—47. When there is still less traffic between two switching centers, a simple full duplex trunk, comprising a single transmission channel in each direction may be provided, and two such trunks terminating at the switching center in Figs. 2 to 7 are shown, one, designated by reference numeral 1—48 extending to a switching center 1—51, represented merely by a labeled rectangle, and the other, designated by the reference numeral 1—49 terminating at a similarly represented switching center designated by the reference numeral 1—52. As indicated in Fig. 1, it has been assumed that switching center 1—51 serves stations having the individual address codes BN, BX, CA and QA as well as others. With reference to the switching center 1—52 it has been assumed that stations served by that switching center have individual call directing codes BS and BU as well as others.

A full duplex trunk circuit designated 1—53 connects switching center 1—52 to switching center 1—39. It has been assumed that switching center 1—39 serves stations having the individual address codes BF, WE, XW, QX and others. Another switching center 1—54, with reference to which no code assignments have been assumed, is connected to switching center 1—39 by full duplex trunk 1—56. In view of the fact that no other trunk circuits have been shown in association with switching centers 1—51 and 1—54, it is to be assumed that neither has direct connection with the other nor with the switching center 1—52, and that switching center 1—51 cannot directly reach the switching center 1—39 nor can the switching center 1—54 directly reach the switching center shown in Figs. 2 to 7. This arrangement of switching centers is typical of systems of this type.

The terminal equipment for the lines and trunks represented in Fig. 1 is shown in Figs. 2 to 7 which also show other circuits and equipment at the switching center. Considering first the terminal equipment of the party line 1—01, the transmitting channel 1—02 terminates in an incoming line circuit indicated generally by reference numeral 2—01. This incoming line circuit controls the reperforator 2—02 and the receiving teletypewriter 2—03. The incoming line circuit recognizes certain address codes preceding messages and causes messages for the switching center to be recorded on the receiving-only teletypewriter 2—03. If the massage is to be transmitted to another station in addition to being recorded on teletypewriter 2—03 it will be recorded also on the perforator 2—02. If the message is not to be recorded for the use of the switching center, it will be recorded only on the reperforator 2—02. A transmitter 2—04 is combined with reperforator 2—03 to form a unit 2—06. Transmitter 2—04 is connected to a director circuit 2—07 which, under the control of transmitter 2—04, decodes the address portion of the message and then under the supervision of a sequence circuit 4—01 operates a select magnet 3—01 individual to that director, and thereafter operates a hold magnet associated with the channel over which the message is to be transmitted.

The switching apparatus employed in the typical embodiment of this invention and described herein makes use of a switch having a plurality of groups of contacts arranged in a rectangular coordinate pattern. Switches of this type are frequently called cross-bar switches and are arranged so that any set of contacts may be selected and actuated by operating magnets representing coordinates of the group of contacts to be operated. For example, the usual arrangement is to provide the contacts in rows and columns, and to select and operate any set of contacts by operating a select magnet which is common to a row of contacts and then to operate a hold magnet which is common to a column of contacts. Only those contacts which represent the intersection of the row and column will be operating.

Figs. 3, 5 and 7 contain a schematic representation of a cross-bar switch. The select magnets for the incoming channels of party line 1—01, single station line 1—31, trunk 1—48 and trunk 1—49 are shown in Fig. 3 and are identified by reference numerals 3—01, 3—02, 3—03 and 3—04, respectively. Select magnets of the incoming channels 1—46 and 1—47 of the multiple channel trunk and select magnets of other sources of messages to be routed through the switching center are shown in Fig. 5. Select magnets for the routing of single address messages derived from multiple address messages entering the supplementary multiple address circuits embodying the present invention are shown in Fig. 7. All of the hold magnets of the cross-bar switch are shown at the bottom of Fig. 7.

Access to the transmitting channel 1—03 of the full duplex party line is had through the instrumentality of two reperforator-transmitter units 2—08 and 2—09 which may be similar to the reperforator-transmitter unit 2—06. Each of these reperforator-transmitter units has its own set of input control relays 2—11 and 2—12, respectively, and these sets of relays cooperate mutually with each other and individually with their respective reperforator-transmitter units to control the selective establishment of a connection to one or the other of the reperforators, if idle, through the cross-bar switch. The hold magnets 7—16 and 7—01, when operated, establish transmission paths to the reperforator units 2—08 and 2—09, respectively.

The transmitting portions of reperforator-transmitters 2—08 and 2—09 are associated with outgoing channel 1—03 which has hereinbefore been identified as the receiving channel from the standpoint of the subscriber stations of party line 1—01. These transmitters have sets of control relays 2—13 and 2—14, respectively, and there is also a common set of control relays 2—16, the three sets of relays cooperating to give one or the other of the transmitters access to the outgoing channel 1—03. A transmitter start circuit, identified by reference numeral 2—17, cooperates with the incoming line circuit 2—01 and the set of control relays 2—16 to transmit to the outgoing channel 1—03 a set or pattern of code signals for starting any of the transmitters associated with the party line 1—01. Transmitter start circuit 2—17 has associated with it a set of manually operable start keys 2—18 by means of which automatic operation of the transmitter start circuit may be initiated to cause the several transmitters associated with the party line to obtain access thereto in rotation and by means of which such automatic operation may be stopped, and alternatively the transmitter selecting code for any one of the subscriber stations may be transmitted under manual stimulus.

Figure 10:
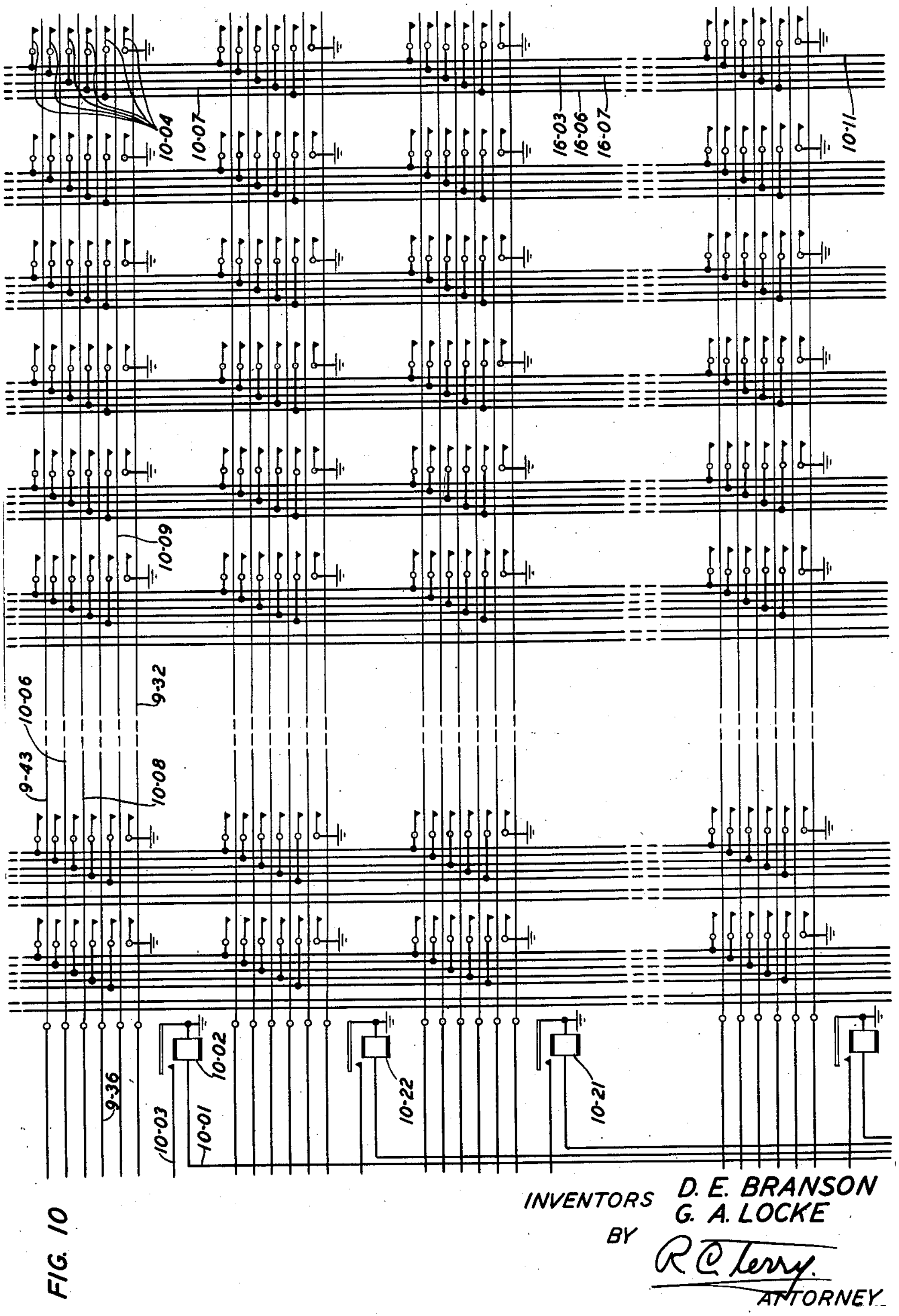
Figure 11:
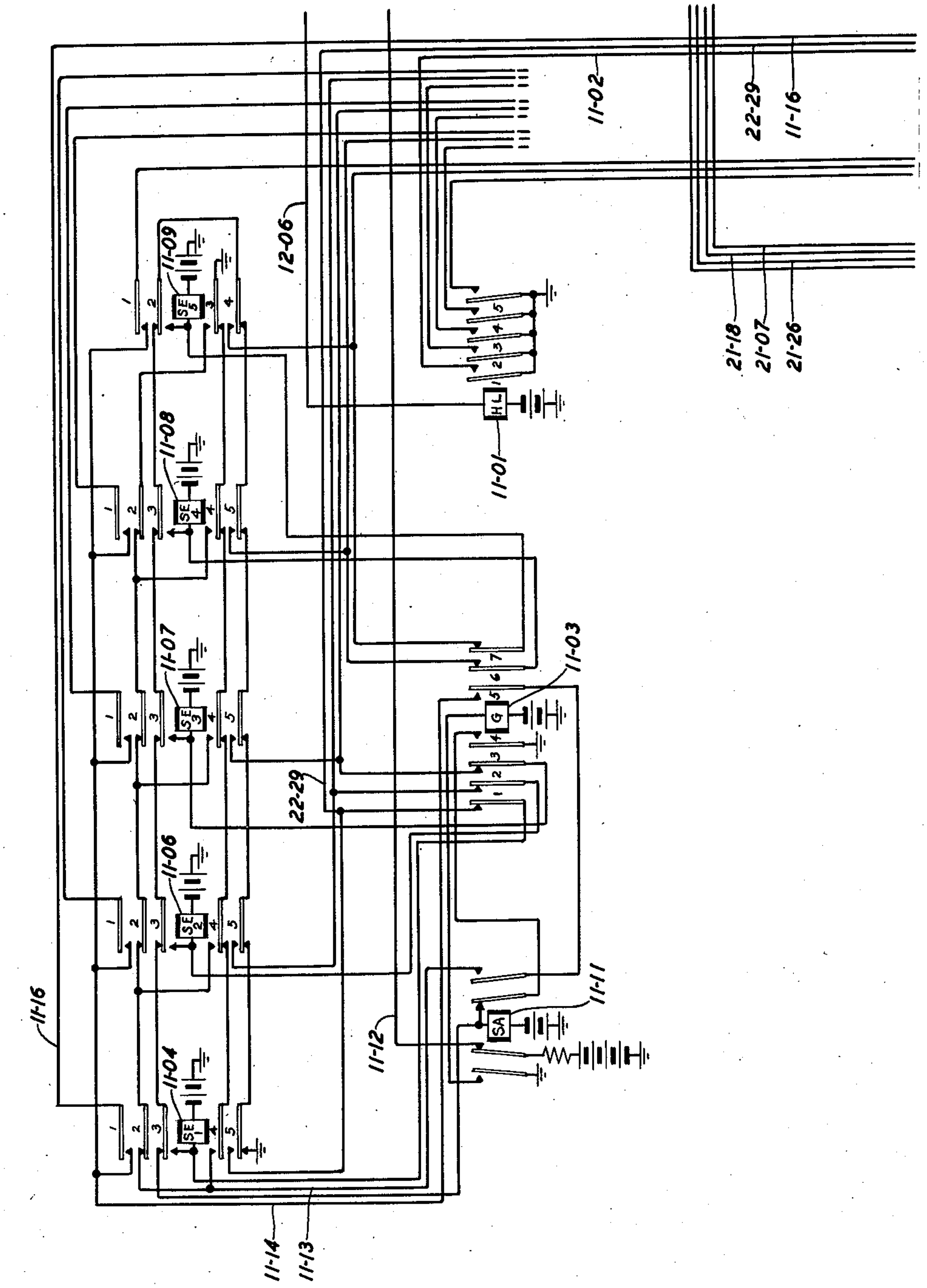
Figure 12:
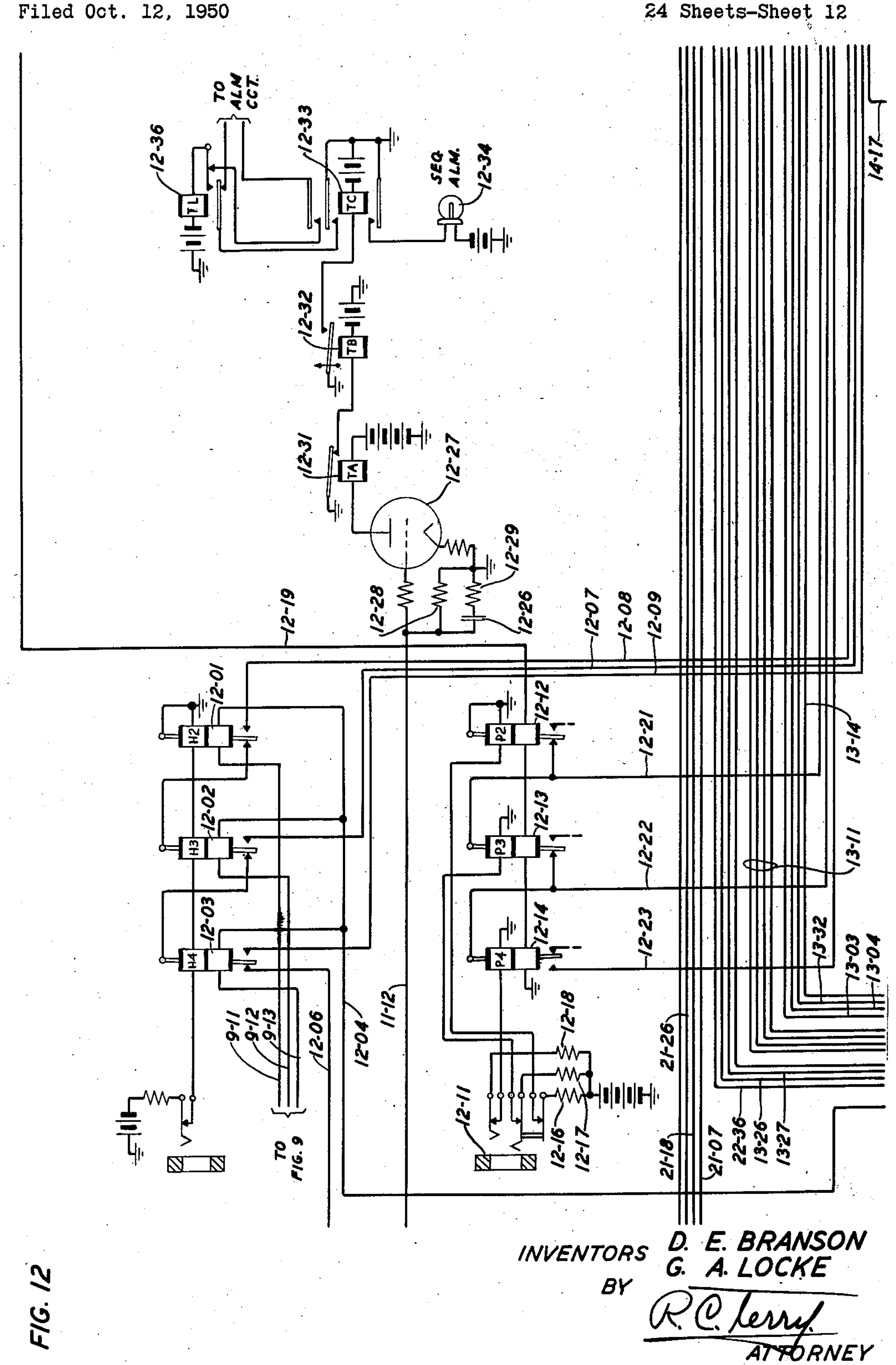

Figs. 2, 3, 4 and 5 will not be further described in detail because they are identical with Figs. 9, 10, 11 and 12 of the Bacon et al. application except for the fact that the hold magnets of the cross-bar switch are contained in Fig. 12 of the Bacon et al. application whereas they are contained in Fig. 7 instead of Fig. 5 of the present disclosure. A complete understanding of the operation of the system as represented in Figs. 2, 3, 4 and 5 may be obtained from that portion of the Bacon et al. application which describes Figs. 9, 10, 11 and 12. Reference numerals not specifically mentioned in the present specification identify corresponding parts of Figs. 9, 10, 11 and 12 of the Bacon et al. disclosure, when account is taken of the fact that the last two digits identify specific elements and the first digit of three-digit numbers and the first two digits of four-digit numbers identify the figure of location of such elements.

Fig. 6 shows in diagrammatic form the supplementary multiple address circuit embodying the present invention. Access to it is had through five vertical columns of contacts of the cross-bar switch, only three of which have been shown, these being controlled by the hold magnets 7—26, 7—27 and 7—28. The hold magnets 7—26, 7—27 and 7—28 give access to the first, second and fifth inward paths of the supplementary multiple address circuit, designated by reference numerals 6—01, 6—02 and 6—03, respectively. The inward paths 6—01, 6—02 and 6—03 are associated with a common connection control circuit 6—04 which operates, upon establishment of a connection to an inward path, to control the seizure of two, three or four outward paths, of which there are ten, the first, second, ninth and tenth being represented in Fig. 6 and being designated by reference numerals 6—06, 6—07, 6—08 and 6—09. Connection control circuit 6—04 has the attributes of a sequence circuit, among other characteristics, in that it is available to the inward paths one at a time to control the establishment of connections therefrom to a plurality of outward paths. The number of outward paths which the connection control circuit seizes for connection to an inward path is dependent upon the particular one of the three different supplementary multiple address codes that causes the routing of a message to the supplementary multiple address circuit and seizure of an inward path thereof.

Connections from an inward path to a plurality of outward paths are established through a link circuit or cross-bar switch, similar to the one represented in Figs. 3, 5 and 7, and having cross-connection contact sets arranged in four horizontal rows for each of the five inward paths, making a total of twenty horizontal rows and ten vertical columns for the ten outward paths. The reason for the provision of four horizontal rows of sets of cross-connection contacts for each inward path is that connections are established from an inward path to two, three or four outward paths through sets of cross-connection contacts in different horizontal rows, a set for each of the two, three or four outward paths, so that the message destination address codes may be distributed to the outward paths, each path receiving but one message address. Select magnets 6—11, 6—12 and 6—13 are controlled by inward path circuits 6—01, 6—02 and 6—03, respectively, to prepare for operation the horizontal rows of contacts associated therewith. Only one of the four select magnets for each inward path is shown in Fig. 6. Hold magnets 6—16, 6—17, 6—18 and 6—19 are individual to the vertical columns of contacts associated with outward paths 6—06, 6—07, 6—08 and 6—09, respectively, and upon the operation of two, three or four of the hold magnets following operation of two, three or four of the select magnets the corresponding number of outward paths will be connected to an inward path.

Outward paths 6—06, 6—07, 6—08 and 6—09 have reperforator-transmitter units 6—26, 6—27, 6—28 and 6—29, respectively, connected thereto. These reperforator-transmitter units may be of the same type as the reperforator-transmitter unit 2—06 which records and retransmits messages received over the incoming channel 1—02 or multiple party line 1—01. Upon the seizure of two, three or four outward paths the inward path causes the message destination address codes preceding a message entering the supplementary multiple address circuit over that inward path to be distributed individually to the outward paths and recorded by their associated reperforators so that each reperforator receives and records the address code of only one station that is to receive the message. Following the recording of the addresses individually by the reperforators that have been seized and connected to an inward path they are unblinded so that all receive the carriage return and line feed signals which intervene in the last of the address codes and the text of the message, and thereafter receive and record the text of the message and finally the end of message signal. The end of message signal, in addition to being transmitted to and recorded by the several reperforators, also causes the restoration of switching circuits to normal, including the release of hold magnet 7—26, 7—27 or 7—28 to disconnect the transmission circuit to the inward path and restore that path to normal.

Upon the restoration of an inward path 6—01, 6—02 or 6—03 to normal the operated ones of the hold magnets 6—16, 6—17, 6—18 and 6—19 which had connected the particular inward path to outward paths are also released, to disconnect the outward paths from the inward path, and render the outward paths available to the same or other inward paths in the same or other combinations.

The reperforator-transmitter units 6—26, 6—27, 6—28 and 6—29 have individual director circuits 6—36, 6—37, 6—38 and 6—39, respectively, which may be identical with director circuit 2—07 associated with reperforator-transmitter unit 2—06 that receives messages incoming over channel 1—02 of party line 1—01. Like all of the incoming line or trunk circuit directors in the switching center the director circuits 6—36, 6—37, 6—38 and 6—39 decode the address codes of the messages recorded by the reperforator portions of reperforator-transmitter units 6—26, 6—27, 6—28 and 6—29 and then under the supervision of sequence circuit 4—01, which is common to all such director circuits, they operate the select magnets 7—36, 7—37, 7—38 and 7—39, respectively. Following operation of the select magnet and in accordance with the outlet through which the addressed station is reached, any one of the hold magnets in Fig. 7, with the exception of a few as will be noted hereinafter, may be operated to establish a cross-office path for the transmission of the message preceded by a single address code to the desired outlet. The exceptions above mentioned are the hold magnets 7—13, 7—14, 7—26, 7—27 and 7—28. The first two of these five magnets cause the establishment of a cross-office path to reperforator-transmitter units 4—52 and 4—53 of the regular or principal multiple address circuits 4—51. There is no point in routing single address messages to that circuit and moreover messages are routed thereto by a special multiple address call directing code as set forth in the Bacon et al. application. There would be no point in operating the hold magnets 7—26, 7—27, and 7—28 to put single address messages being delivered from the supplementary multiple address circuit back into the same circuit. The director circuits 6—36, 6—37, 6—38 and 6—39 will cause the operation of those of the hold magnets in Fig. 7 that will establish a cross-office transmission path to an outgoing line circuit or full duplex trunk or multiple channel trunk circuit or to the local outlet circuits, and under the circumstance that messages for the addressed station are being intercepted, to the willful intercept circuit, or in the case of a garbled or unassigned call directing code, to the miscellaneous intercept circuit.

For detailed consideration of the operation of the supplementary multiple address circuit it will be assumed that the switching center is in operation and that the subscriber at station 1—08 has prepared a perforated tape containing a message to be transmitted to three stations, and that his transmitter has been set in operation by the transmitter start circuit 2—17 at the switching center and the message is being received on reperforator 2—02. It will further be assumed that the message is to be routed through the switching center to station 1—12 on the party line, station 1—34 on the single station line and the station served by switching center 1—51 that has the address code CA. The address codes of the three stations addressed are CD, BG and CA. It will be further assumed that the supplementary multiple address codes for routing two, three and four address messages to the supplementary multiple address circuit are AA, AB and AC, respectively. In accordance with the message preparation practices described in the Bacon et al. application, the tape prepared by the subscriber at station 1—08 will contain codes for AB, letters, CD, letters, BG, letters, CA, letters, carriage return, line feed, the message text, figures, H, letters (end of message), and if this is the only message to be transmitted from station 1—08 at this time, or if it is the last of several messages, the additional signals H and letters, to indicate end of transmission will follow the end of message signals.

*Switching center receives multiple address message*

Referring to Fig. 9, the entire party line, with which station 1—08 in Fig. 1 that has been assumed to originate the message is associated, is represented by rectangle 9—01. Its incoming line circuit is designated 9—02 (2—01 in Fig. 2), its outgoing line circuit is designated 9—03 and its transmitter start circuit is designated 9—04 (2—17). The message transmitted from station 1—08 upon the initiation of transmission under the control of transmitter start circuit 9—04 is recorded by the reperforator associated with incoming line circuit 9—02. The rectangle designated 9—06 represents the director circuit designated by the reference numeral 2—07 in Fig. 2 and certain circuit elements of the director circuit are shown therein. Tape transmitter 9—07 which has been shown inside rectangle 9—06 is the transmitter designated by the reference numeral 2—04 in Fig. 2 associated with incoming line reperforator 2—02. Decoding fan circuits of relays, contained in the director circuit and represented by rectangle 9—08 decode, in cooperation with transmitter 9—07, the first address code perforated in the tape, assumed to be the code AB designating a three-address message. In response to this address code the fan relay circuits select one of a plurality of final code points which are connected through intercept key circuit 9—09 to test conductors, three of which are shown in Fig. 9, designated by reference numerals 9—11, 9—12 and 9—13, these being the test leads selectable by the supplementary multiple address codes AA, AB and AC, respectively. Test lead 9—12 is the one selected in this instance and the selection is evidenced by the connection of ground in the director circuit to that test lead.

*Director circuit seizes an inward path of the supplementary multiple address circuit*

Figure 22:
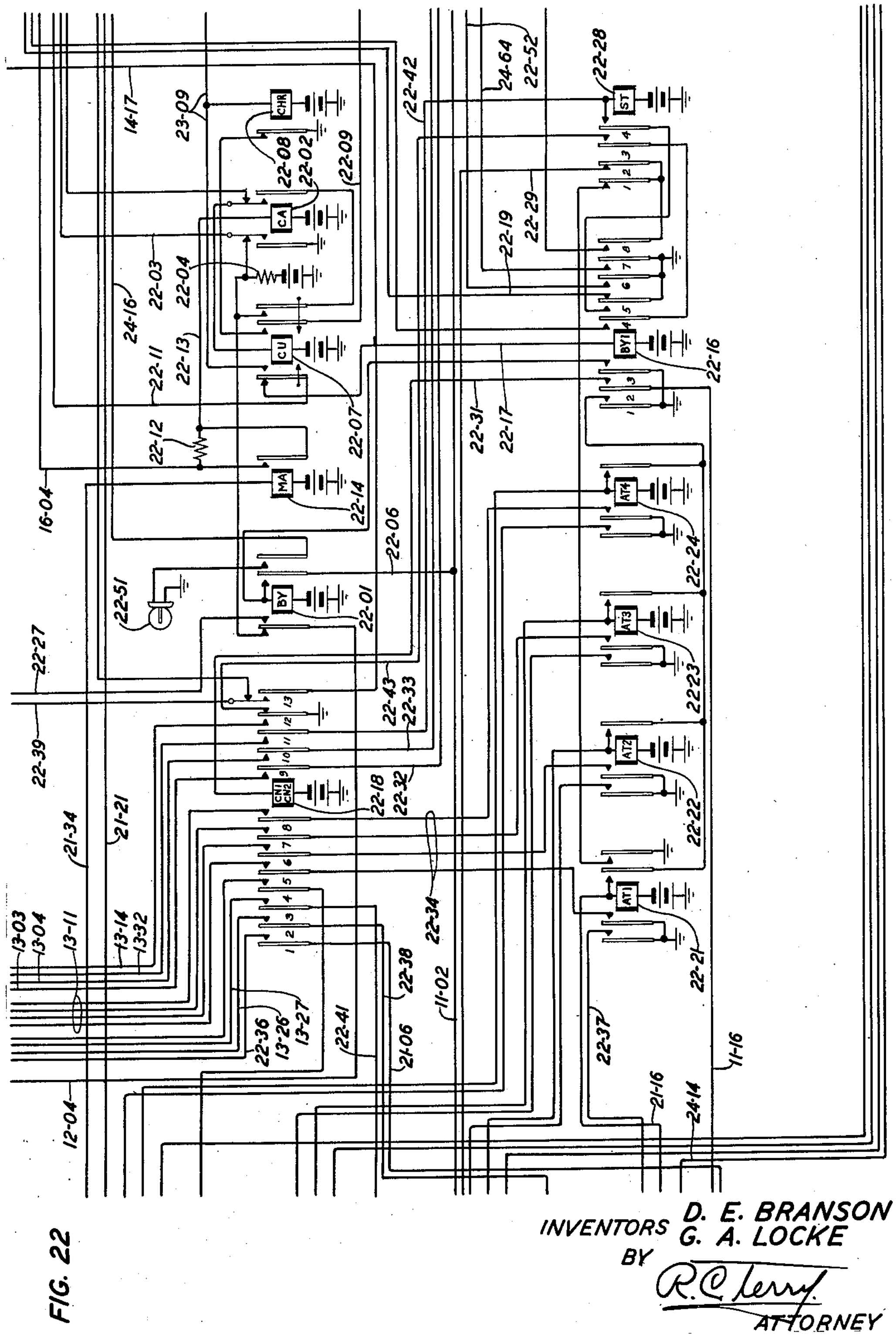
Figure 23:
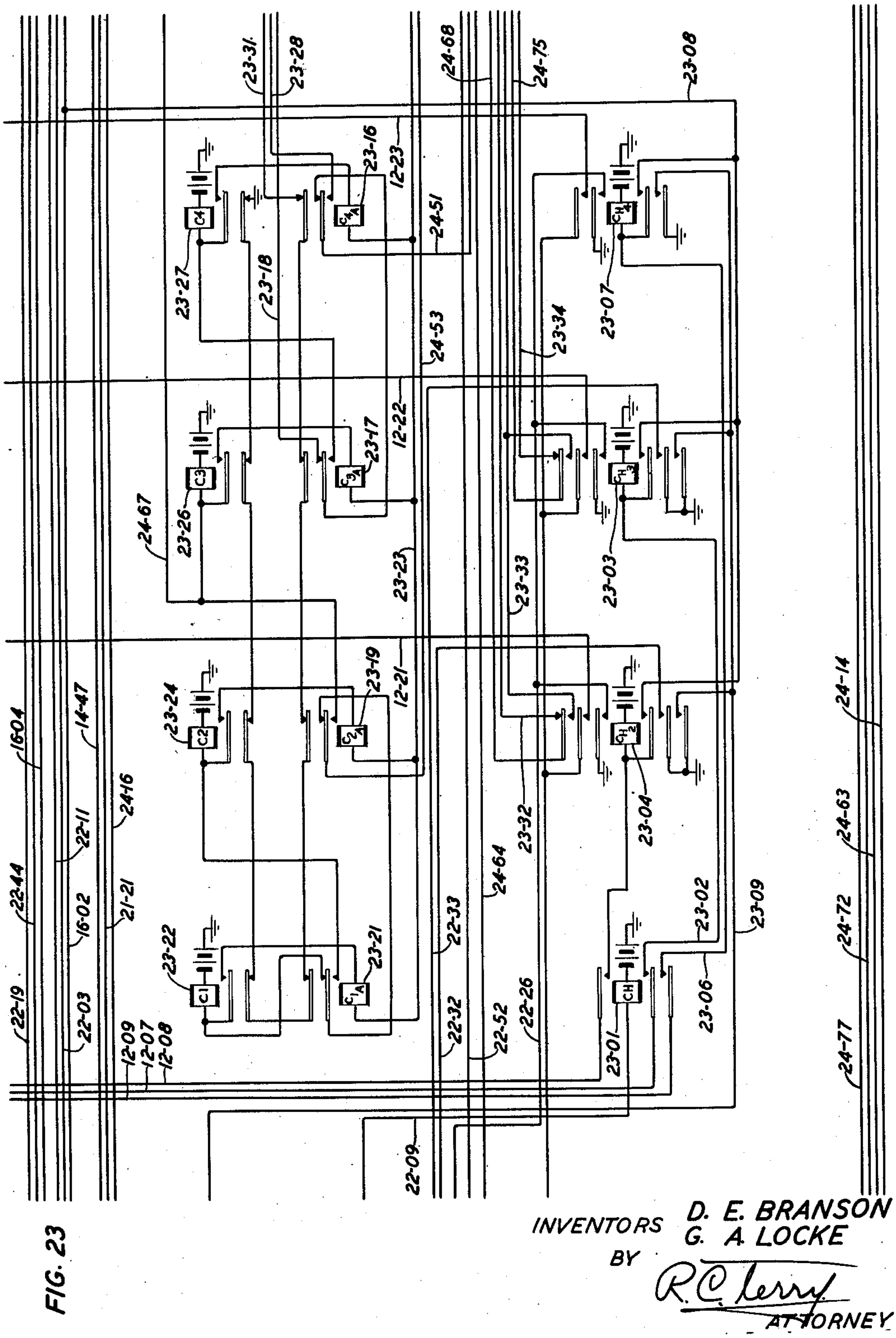
Figure 24:
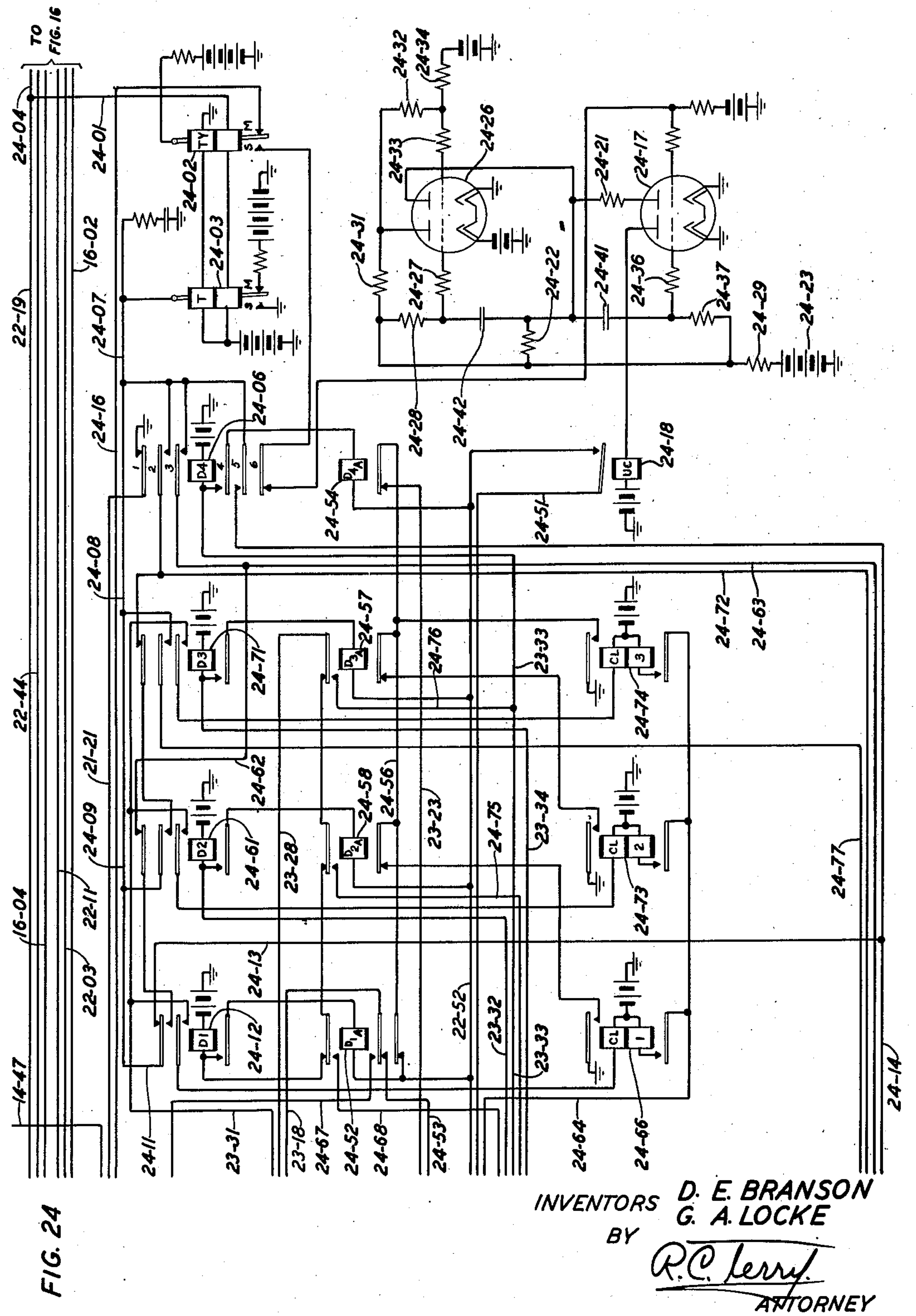

Conductors 9—11, 9—12 and 9—13 are bracketed to Fig. 12 where they reappear and extend through the operating windings of relays 12—01, 12—02 and 12—03, respectively, to conductor 12—04. In the particular instance here under consideration, the ground connection is extended over conductor 9—12, through the winding of relay 12—02 and to conductor 12—04 through which the path extends across Fig. 18 and into Fig. 22, left-hand armature and back contact of busy relay 22—01 which will be assumed to be released, break contacts controlled by the left-hand armature of relay 22—02, conductor 22—03 which extends through Fig. 23 to Fig. 24 and there is included in a group of conductors bracketed to Fig. 16 in which the conductor is found to extend through the winding of hold magnet 16—01 (7—26) to battery. Figs. 22, 23 and 24 represent the first inward path, designated by the reference numeral 6—01 in Fig. 6, and with neither of the relays 22—01 and 22—02 operated, and the test lead path extended through the winding of hold magnet 16—01 to battery this inward path is indicated to the director circuit as being idle. As set forth in the Bacon et al. application the director circuit recognizes the idle condition of the tested outlet while restricting the flow of current in the test lead to such a value that the hold magnet in the test path, in this instance the hold magnet 16—01, does not immediately operate. The director circuit responds to the indicated idle condition of the first inward path of the supplementary multiple address circuit by seizing the sequence circuit, shown only in Fig. 4 and there designated by the reference numeral 4—01 and through the sequence circuit battery is connected to conductor 10—01 to operate select magnet 10—02 of the cross-bar switch. Magnet 10—02 prepares for operation the uppermost horizontal row of groups of cross-connection contacts of the cross-bar switch and also connects ground over conductor 10—03 to operate the "go-ahead" relay 9—16 in the director circuit. Relay 9—16 initiates a number of operations in the director circuit, one of which is the shorting of a resistor that has been limiting the current in the test lead including the lower winding of relay 12—02, resistor 22—04 and in parallel therewith the winding of hold magnet 16—01 and the current increases sufficiently to operate relay 12—02 and hold magnet 16—01.

The relay 12—02, in operating, first interrupts a path traced from ground through the armature and left-hand contact of relay 12—01, the armature and left-hand contact of relay 12—02, the armature and left-hand contact of relay 12—03, conductor 12—06 and winding of relay 11—01 to battery and this relay releases. At its armature 1 and back contact relay 11—01 extends ground over conductor 11—02 and conductor 22—06 to the inner right-hand armature of relay 22—01 for holding the relay operated if it should be operated at this time, and it will be assumed that it is not operated. At its right-hand armature the relay 12—02 extends the ground connection which was disconnected from the winding of relay 11—01 over conductor 12—07 to the inner lower armature of relay 23—01. This relay is not yet operated.

In the meantime hold magnet 16—01 has operated, closing one of the groups of cross-connection contacts prepared for operation by select magnet 10—02, namely, the contacts 10—04. Also the hold magnet 16—01 connects ground through its front contact and armature to conductor 16—02 which is included in the group of conductors bracketed to Fig. 24, conductor 16—02 reappearing there and the circuit being traced through break contacts controlled by the right-hand armature of relay 22—02 to the winding of relay 22—07 which operates. Relay 22—07 has a slow operating characteristic and when it does operate it completes a circuit traced from ground through the armature and back contact of unoperated relay 22—08, front contact and inner right-hand armature of relay 22—07, conductor 22—09 and winding of relay 23—01 to battery and this relay operates. With relay 23—01 operated the ground connection extended over conductor 12—07 to its inner lower armature from the right-hand contact of relay 12—02 is extended over conductor 23—02 to the winding of relay 23—03 which operates. It should be noted at this point that had the relay 12—01 been operated by the making of the busy test over conductor 9—11 for a two-address message the ground connection would have been extended over conductor 12—08, the upper armature and front contact of relay 23—01 to the winding of relay 23—04 which would now operate, whereas if the busy test had been made over test lead 9—13 for a four-address message the ground connection would have been extended through the right-hand contact of relay 12—03 and over conductor 12—09, the outer lower armature of relay 23—01 and conductor 23—06, the winding of relay 23—07 which would now operate. The relays 23—03, 23—04 and 23—07 register in the supplementary multiple address circuit under the control of relays 12—01, 12—02 and 12—03 the number of outward paths that are to be seized and connected to receive a message, relay 23—04 indicating that two outward paths are to be seized, relay 23—03 indicating that three outward paths are to be seized and relay 23—07 indicating that four outward paths are to be seized.

Relay 23—03 locks in a circuit traced through its innermost lower armature and front contact and conductor 23—08 to conductor 16—02 which is receiving ground through the front contact and armature of hold magnet 16—01. At its outer lower armature the relay 23—03 connects ground through its associated front contact, conductor 23—09 to the winding of relay 22—08, which operates, and also through the front contact and left-hand armature of relay 22—07, conductor 22—11 which extends to Fig. 24 and is there bracketed to Fig. 16 in which conductor 22—11 reappears and is there connected to cross-bar switch vertical conductor 16—03 from which the path is extended through the second of the contacts 10—04, counting from the top, cross-bar switch horizontal conductor 10—06, conductor 9—21, break contacts controlled by the inner armature of relay 9—22 in the director circuit, conductors 9—23 and 9—24, front contact and lower armature of director circuit relay 9—26, which was energized as one of the operations resulting from the energization of relay 9—16 by select magnet 10—02, the path traced through the lower front contact of relay 9—26 being extended through the armature, conductor 9—27 and the winding of relay 9—28 to battery, to operate relay 9—28. Upon the operation of relay 9—28 a holding path shunting the lower armature and front contact of relay 9—26 is traced through the inner left-hand armature and front contact of relay 9—28 and conductor 9—29 to conductor 9—23. Still another holding path independent of the ground supplied to energize relay 9—28 is traced, beginning at the battery connection on relay 9—28 through its winding, the inner left-hand armature and front contact, conductors 9—29 and 9—23, break contacts controlled by the inner right-hand armature of relay 9—22, conductors 9—21 and 9—31, front contact and right-hand armature of relay 9—28, conductor 9—31 which is found in Fig. 10 to be the lowermost of the top group of cross-bar switch horizontal conductors, to ground through the sixth of the closed cross-bar switch cross-connection contacts 10—04. Thus director circuit relay 9—28 will remain operated as long as hold magnet 16—01 is operated and holds the contact 10—04 closed although relay 9—26 and relays 23—03 and 22—07, through make contacts of which director circuit relay 9—28 became operated, release before the release of hold magnet 16—01.

With relay 9—28 in the director circuit operated ground on its outer left-hand armature is connected to a path traced through conductor 9—33, winding of machine alarm relay 9—34, conductor 9—36, which is found in Fig. 10 to be one of the cross-bar switch horizontal conductors, the fourth of the contacts 10—04, counting from the top, cross-bar switch vertical conductor 10—07, conductor 16—04 which is included in the group of conductors bracketed to Fig. 24, resistor 22—12, conductor 22—13, winding of relay 22—02 to battery and this relay operates. Relay 9—34 in the director circuit which is included in the energizing circuit of relay 22—02 just traced is a machine alarm relay and does not operate in this path unless current limiting resistor 22—12 has been shunted by the make contacts of relay 22—14 which is operable to indicate a machine alarm, as will be described hereinafter.

At its left-hand armature the relay 22—02 connects ground over conductor 22—03 to lock hold magnet 16—01 operated. At its right-hand armature relay 22—02 connects the path over which the hold magnet was originally energized, including the winding of relay 12—02, conductor 12—04, the left-hand armature and back contact of relay 22—01, to the winding of relay 22—07 through the front contact and outer right-hand armature of that relay and the right-hand armature and front contact of relay 22—02 in substitution for the energizing circuit of relay 22—07 that was originally completed over conductor 16—02 through the armature and front contact of hold magnet 16—01.

Relay 9—28 in the director circuit has armatures additional to those shown in Fig. 9 and upon the operation of relay 9—28 one of these armatures disconnects ground from the test lead path 9—12, thereby interrupting the current through the lower winding of relay 12—02 and through the winding of relay 22—07 which was connected to this path as described in the preceding paragraph. The armature of relay 12—02 returns to its left-hand contact, reestablishing the energizing circuit for relay 11—01, which interrupts the locking circuit which it had prepared for relay 22—01. If that relay has not yet been operated there has been no locking circuit. Relay 22—07, upon releasing, completes the energizing circuit for relay 22—16, the circuit being traced from battery through the winding of that relay, conductor 22—17, back contact and left-hand armature of relay 22—07, conductor 22—11 which is traced as previously described to Fig. 16 where it is connected to conductor 16—03, the path thence being traced through the second contact of the cross-bar switch contact group 10—04 to conductor 10—06 thence into Fig. 9, conductor 9—31, front contact and right-hand armature of relay 9—28, conductor 9—32 and the sixth contact of the contact group 10—04 to ground.

At its armature 1 and front contact the relay 22—16 prepares locking circuits for relays 22—21, 22—22, 22—23 and 22—24. At its armature 2 and front contact the relay 22—16 prepares an energizing circuit for relay 22—18. At its armature 3 and front contact the relay 22—16 completes the energizing circuit of relay 22—01 which operates. At its armature 5 and back contact the relay 22—16 disconnects ground from conductor 22—19 which is traced to Fig. 24 where it is connected through conductor 24—01 and operating windings of relays 24—02 and 24—03 to battery. The disconnection of ground from conductor 22—19 has no immediate effect upon the relays 24—02 and 24—03 because another path from the operating windings of these relays to ground is traced through conductor 24—04 included in the groups of conductors bracketed to Fig. 16 in which the conductor is found to be connected to cross-bar switch vertical conductor 16—06 over which the path continues, thence through the fifth contact of the contact group 10—04, cross-bar switch horizontal conductor 10—09, break contacts controlled by the armature of relay 9—37, conductor 9—38 and break contacts controlled by the outer armature of relay 9—39 at which point the ground is connected. Ultimately the relays 24—02 and 24—03 will be rendered responsive to signals transmitted from transmitter 9—07 and the removal of the ground connection supplied through the armature 5 of relay 22—16 represents an unblinding of relays 24—02 and 24—03 in so far as the supplementary multiple address circuit is concerned but these relays are still blinded by the ground connection supplied through the break contacts of the outermost armature of relay 9—39.

Figure 18:
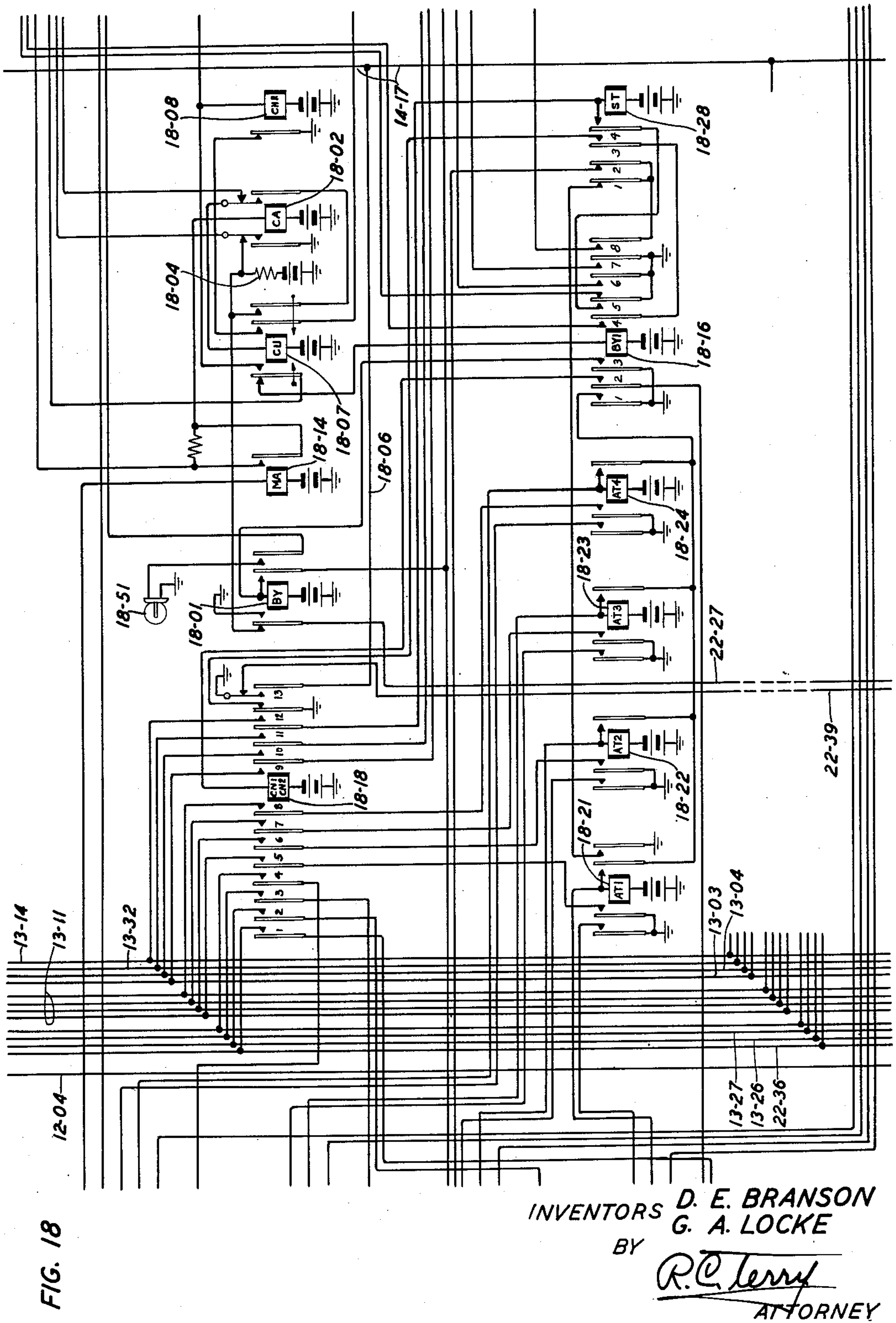
Figure 19:
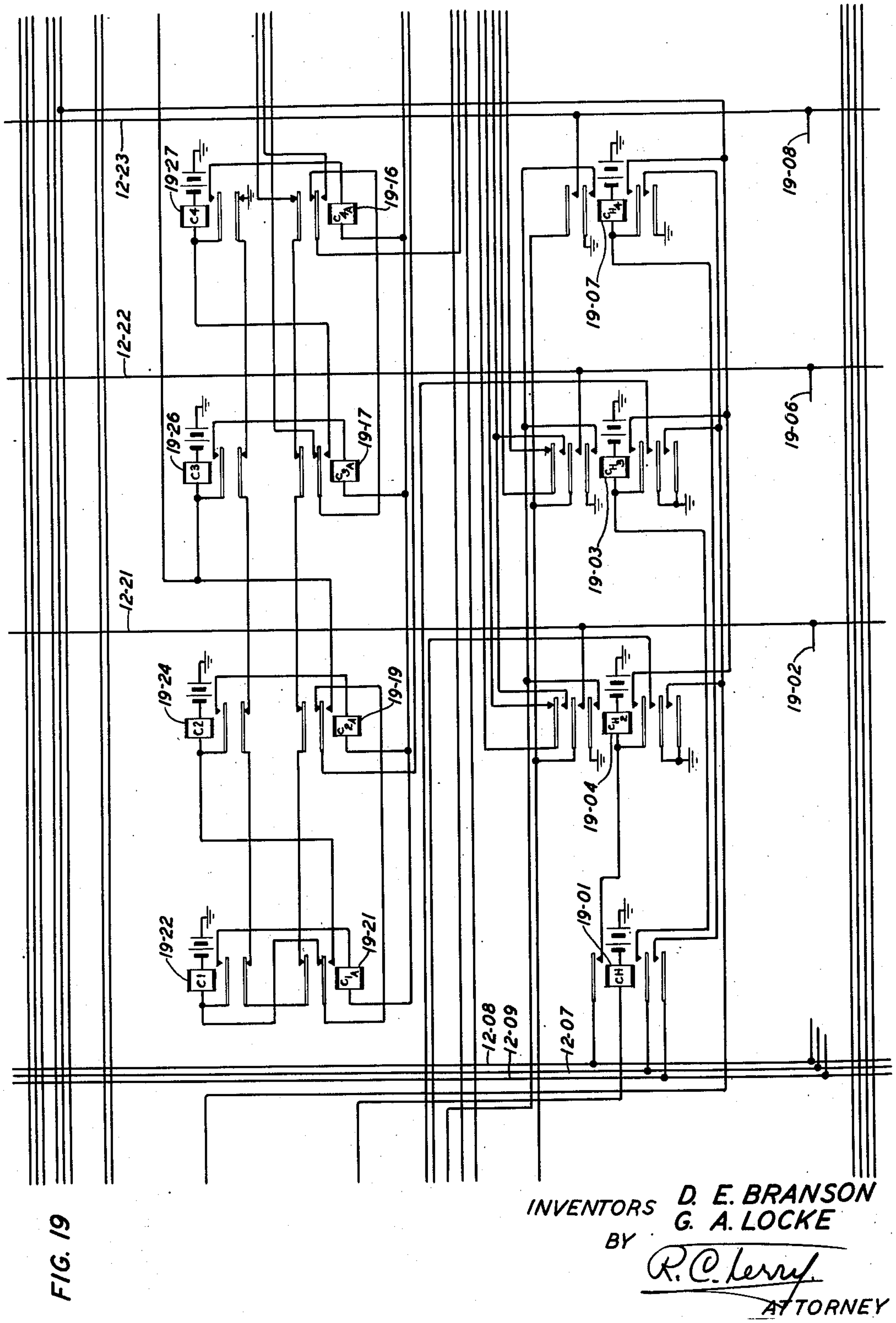
Figure 20:
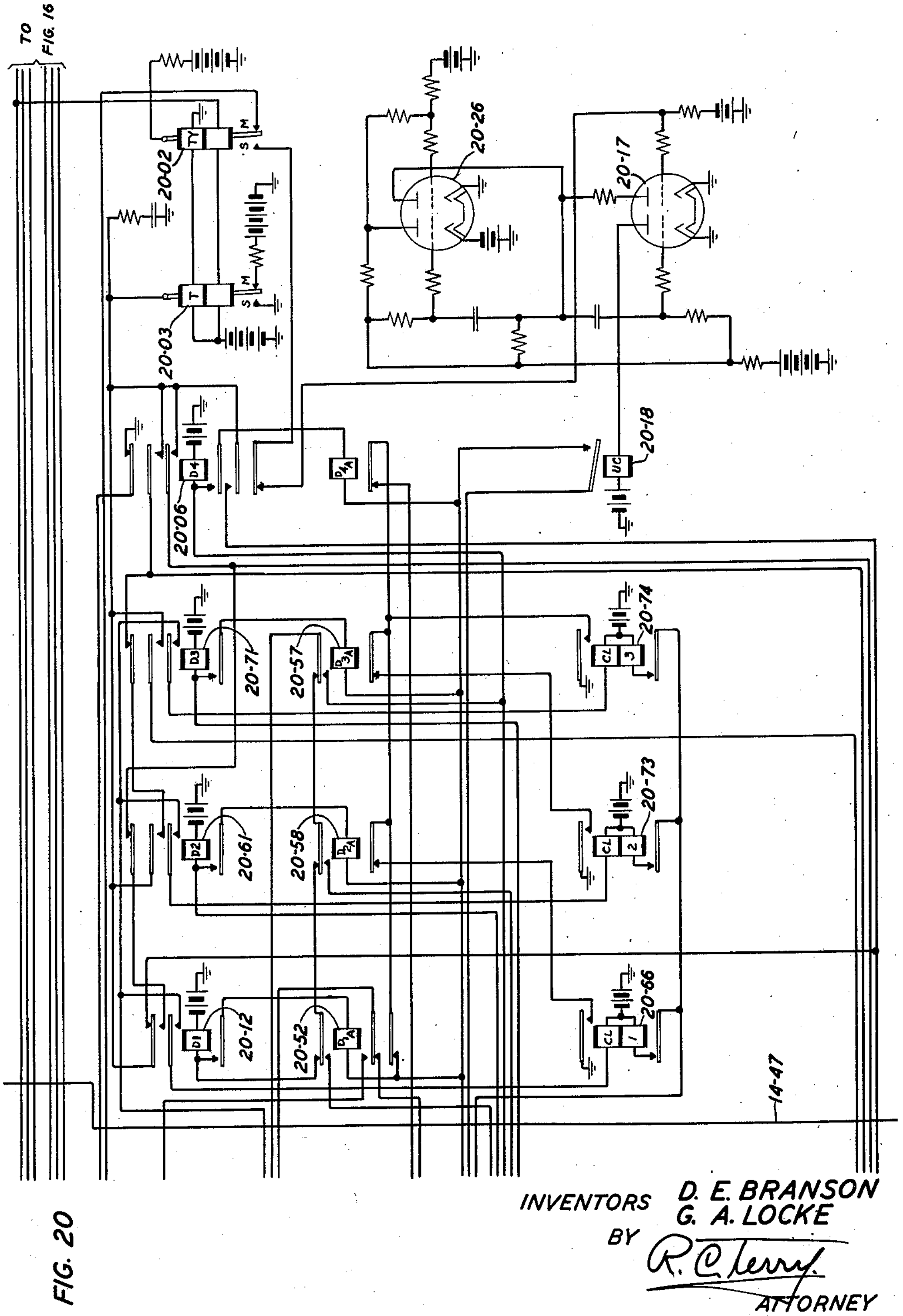
Figure 21:
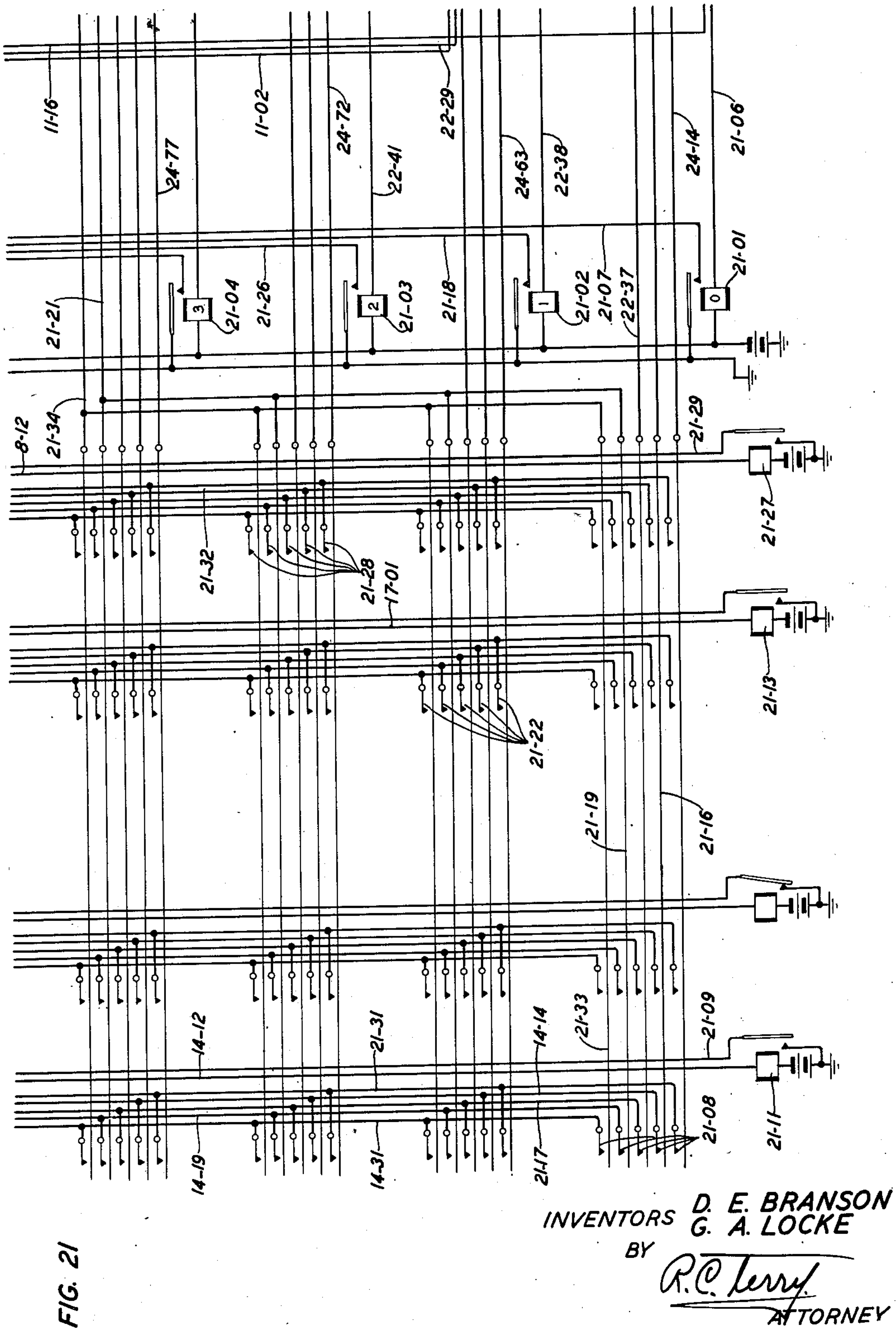

Busy relay 22—01, operated by relay 22—16, locks in a circuit traced through its front contact and inner right-hand armature, conductors 22—06 and 22—26 and innermost upper armature of relay 23—03; which is now operated, to ground. At its left-hand armature busy relay 22—01 transfers that portion of the busy test lead that is common to the relays 12—01, 12—02 and 12—03, namely, the lead 12—04, to conductor 22—27 which extends to the left-hand armature of busy relay 18—01, the cooperating back contact of which is connected to the front contact of the outer right-hand armature of relay 18—07, and to the break contacts controlled by the left-hand armature of relay 18—02, and through resistor 18—04 to battery. Figs. 18, 19 and 20 comprise another of the five inward paths of the supplementary multiple address circuit, namely, the last or fifth of those paths. Relays 18—01, 18—07 and 18—02 of that circuit correspond with relays 22—01, 22—07 and 22—02, respectively, of the first inward path. The dotted portion of conductor 22—27 in Fig. 18 indicates intervening inward paths each having a busy relay corresponding to the relays 22—01 and 18—01 at which the busy test laid may be transferred and extended from one to another of the inward paths as they become busy, in the same manner that relay 22—01 has extended the busy test lead to conductor 22—27. When all of the inward paths are busy the busy test lead conductor 12—04 will be extended through left-hand armatures and front contacts of the busy relays to ground on the right-hand front contact of relay 18—01. This ground indicates to a director circuit seeking access to the supplementary multiple address circuit that all inward paths are busy and such director circuit must wait until one of the inward paths becomes idle, which will be evidenced by release of its busy relay, as will be described hereinafter.

*Availability of outward paths is registered*

An inward path of the supplementary multiple address circuit having been seized and rendered busy to other director circuits seeking access to the supplementary multiple address circuit, it is necessary for the multiple address circuit to indicate whether or not the required number of outward paths is available. The availability of two, three or four outward paths is evidenced by the condition of relays 12—12, 12—13 and 12—14. The upper or biasing windings of these relays are connected from ground through break contacts of jack 12—11 and individual resistors 12—16, 12—17 and 12—18, respectively, to battery. Jack 12—11 is provided for interrupting the circuits of the upper windings of relays 12—12, 12-13 and 12-14 for test purposes and the circuits may be interrupted merely by inserting a dummy plug in the jack. Resistors 12—16, 12—17 and 12—18 have such values as to cause the current flowing in the upper windings of relays 12—12, 12—13 and 12—14 to have values, expressed in milliamperes, of approximately 20, 33 and 45, respectively.

The lower or operating windings of relays 12—12, 12—13 and 12—14 are connected in series from ground to a conductor 12—19 through a branching point 14—01. From this point one path extends through conductor 14—02, armature 1 and back contact of relay 14—03, conductor 14—04, back contact and armature 2 of relay 14—06, and resistor 14—07 to battery. A parallel path extends from point 14—01 over conductor 14—08, conductor 8—02, armature 1 and back contact of relay 8—03, conductor 8—04, back contact and armature 2 of relay 8—06 and resistor 8—07 to positive battery.

Figure 14:
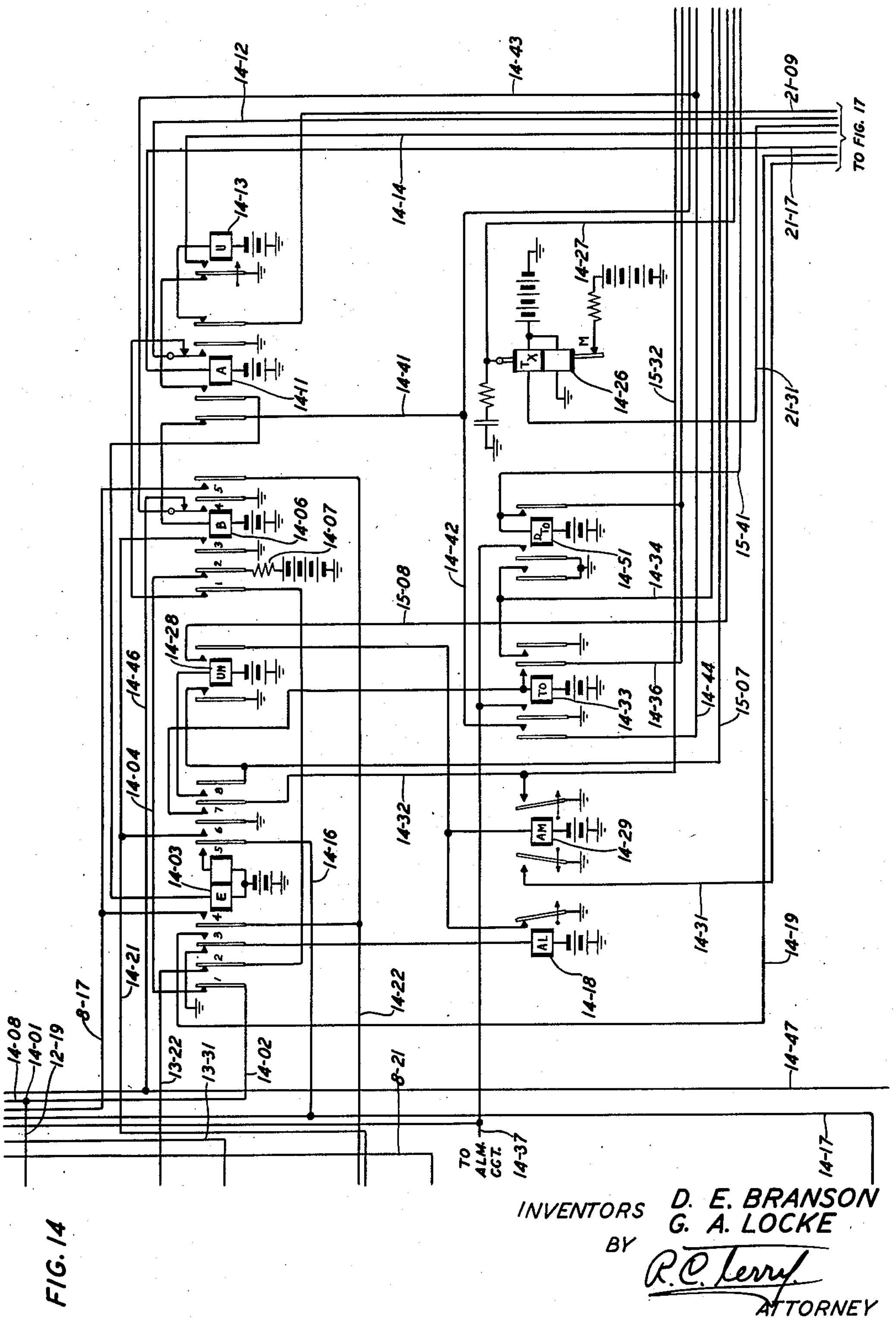
Figure 15:
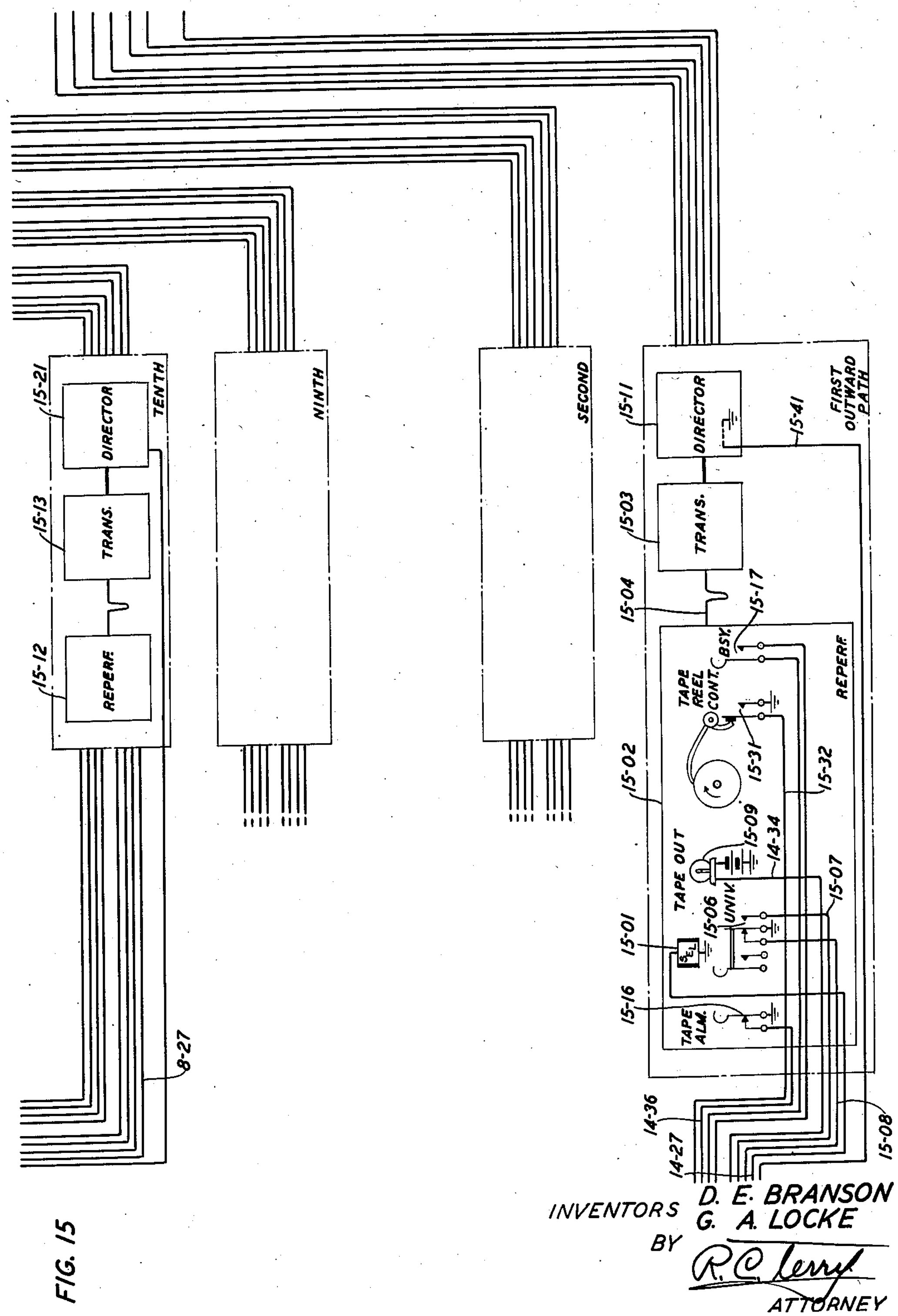

Figs. 8 and 14 represent two of the ten outward paths of the supplementary multiple address circuit and contain the control circuits by which access is gained to the reperforators of those outward paths. Fig. 14 contains the control circuits for the first outward path and Fig. 8 the circuits for the tenth. Stub conductor 8—01 connected by conductor 14—08 to branching point 14—01 represents eight conductors corresponding to the conductors 8—02 and 14—02 extending through break contacts of relays in other outward paths, corresponding to the relays 14—03 and 14—06, to battery through current limiting resistors corresponding to resistors 14—07 and 8—07. When an outward path is idle and available, such as the path shown in Fig. 14, its relays corresponding to the relays 14—03 and 14—06 are released. Thus there may be as many as ten paths from the branching point 14—01 to positive battery, and when all of the outward paths are busy there will be no such path to battery.

It will be apparent from this that the value of the current flowing through the lower windings of relays 12—12, 12—13 and 12—14 is dependent upon the number of outward paths that are idle. The approximate values of this current, expressed in milliamperes, for idle conditions of one, two, three, four, five, six, seven, eight, nine and ten outward paths are 14, 27, 39, 49, 61, 71, 80, 88, 96 and 105, respectively.

The biasing currents through the relays 12—12, 12—13 and 12—14 drive the armatures toward their right-hand contacts and as previously stated these currents have values of 20, 33 and 45 milliamperes, respectively. The current in the lower windings must exceed that in the upper windings in order to move the armatures to the left-hand contacts. It may be determined by comparison of the current values hereinbefore set forth that when four or more of the outward paths are available the armatures of relays 12—12, 12—13 and 12—14 engage their left-hand contacts, the current in their lower windings being about 49 or more milliamperes; that when only three outward paths are available the armature of relay 12—14 is operated to its right-hand contacts because the current through the lower windings of the three relays is approximately 39 milliamperes; that when only two outward paths are available the armature of relay 12—13 is also operated to its right-hand contacts because the current through the windings of the three relays is approximately 27 milliamperes; and that when only one outward path is available the armatures of all three relays engage their right-hand contacts because the current through their lower windings is only approximately 14 milliamperes.

It will be assumed that only three outward paths are available, so that the armatures of relays 12—12 and 12—13 are engaging their left-hand contacts and the armature of relay 12—14 is disengaged from its left-hand contact, thereby extending a ground connection on the armature of relay 12—12 over conductors 12—21 and 12—22, but not over conductor 12—23. Conductor 12—21 is connected in Fig. 23 to the front contact associated with the middle upper armature of relay 23—04 which is not operated. It is also connected to the corresponding front contact of the corresponding relay 19—04 in the fifth inward path. Stub conductor 19—02 also connected to conductor 12—21 in Fig. 19 indicates connections to corresponding front contacts of corresponding relays in the other three inward paths. Conductor 12—22 is connected to corresponding front contacts of corresponding relays 23—03 and 19—03 in the first and fifth inward paths and to corresponding relay contacts in the other three inward paths as indicated by stub conductor 19—06. Similarly conductor 12—23 is connected to the front contact of the outer upper armature of relay 23—07 and to the corresponding contact of relay 19—07, and as indicated by stub conductor 19—08, to other inward paths.

The middle upper armatures of relays 23—03 and 23—04 and the outer upper armature of relay 23—07 are connected to conductor 23—11, and since relay 23—03 is operated the ground connection on conductor 12—22 is extended through the front contact and middle upper armature of this relay to conductor 23—11 and thence through the front contact and armature 8 of relay 22—16, the armature 2 and back contact of relay 22—28, conductor 22—29, back contact and armature 1 of gate relay 11—03 and winding of first inward path sequence relay 11—04 to battery, this path, having been prepared when relay 23—03 became operated, was completed when relay 22—16 became operated, and the relay 11—04 operates. It should be noted at this point that had there been only two or less of the ten outward paths available the relays 12—13 and 12—14 would have had their armatures engaging the right-hand contacts; the ground on the armature of relay 12—12 would have been extended over conductor 12—21 only or not even extended over that path, and with relay 23—03 operated the circuit of relay 11—04 would not be completed. However, had the message been addressed to only two stations relay 23—04 would be operated instead of relay 23—03, the circuit of relay 11—04 would be completed and that relay would operate.

Relay 11—04, having operated, locks in a circuit traced from battery through its winding, front contact and armature 3, back contact and armature 3 of second inward path sequence relay 11—06, back contact and armature 3 of third inward path sequence relay 11—07, back contact and armature 3 of fourth inward path sequence relay 11—08, back contact and armature 2 of the fifth inward path sequence relay 11—09, armature 4 and back contact of the same relay, armature 5 and back contacts of relays 11—08, 11—07 and 11—06 in chain sequence, armature 5 and front contact of relay 11—04, and thence over conductor 22—29 over which the operating ground connection is being supplied, this holding path shunting the back contact and armature 1 of relay 11—03.

At its armatures 3 and 5 and back contacts, these being the armatures through which the relay 11—04 has established its locking circuits, the energizing circuit of the sequence auxiliary relay 11—11 is interrupted and this relay releases.

Relay 11—11, upon releasing, disconnects at its inner left-hand armature and front contact a connection from positive battery over conductor 11—12 to condenser 12—26 to the grid of electron discharge tube 12—27. Condenser 12—26 begins to discharge through resistors 12—28 and 12—29, carrying the grid of tube 12—27 toward ground to time an interval at the end of which tube 12—27 will be cut off, if relay 11—04 remains operated and relay 11—11 remains released that long. At its outer left-hand armature the relay 11—11, having released, completes the energizing circuit of gate relay 11—03 which operates. With relay 11—03 operated the paths over which sequence circuit relays 11—06, 11—07, 11—08 and 11—09 may be energized are disabled so that those paths cannot be completed nor the relays operated. With relay 11—03 operated and relay 11—11 released a circuit is completed which is traced beginning at ground on armature 3 of relay 11—09, thence through the armatures 4 and back contacts of relays 11—08, 11—07 and 11—06 in chain sequence, armature 4 and front contact of relay 11—04, conductor 11—13, back contact and outer right-hand armature of relay 11—11, armature 5 and front contact of relay 11—03, conductor 11—14, front contact and armature 1 of relay 11—04, conductor 11—16, armature 2 and front contact of relay 22—16, conductor 22—31 and winding of relay 22—18 to battery and this relay operates.

*Inward path seizes first available outward path*

At its armatures 9 and 10 the relay 22—18 extends conductive paths from the windings of connection control relays 13—01 and 13—02 over conductors 13—03 and 13—04, respectively, front contacts and armatures 9 and 10, respectively, of relay 22—18, conductors 22—32 and 22—33, respectively, to the front contacts associated with the middle lower armature of relays 23—04 and 23—03, respectively. Relay 23—03 is operated but relay 23—04 has not been operated, so that the circuit of relay 13—02 is completed and this relay operates. At its armatures 5 to 8, inclusive, the relay 22—18 extends paths from the windings of relays 13—06, 13—07, 13—08 and 13—09, which are cut-on relays, over a group of four conductors identified by the reference numeral 13—11, through the front contacts and armatures 5 to 8, inclusive, of relay 22—18 and over a group of four conductors 22—34 to the front contacts associated with the inner left-hand armatures of relays 22—21, 22—22, 22—23 and 22—24, respectively, which are unoperated at this time. At its armature 1 and front contact the relay 22—18 extends a path from the winding of select magnet 21—01 of the cross-bar switch link circuit shown in Figs. 17 and 21, over conductor 21—06, armature 1 and front contact of relay 22—18, conductor 22—36, back contacts and right-hand armatures of relays 13—06, 13—07, 13—08 and 13—09 in chain sequence, conductor 13—12, break contacts controlled by the left-hand armature of connect common relay 13—13, conductor 13—14 and front contact and armature 12 of relay 22—18 to ground, and the select magnet 21—01 operates, preparing for operation the lowermost horizontal row of sets of cross-connection contacts of the cross-bar switch.

Figure 13:
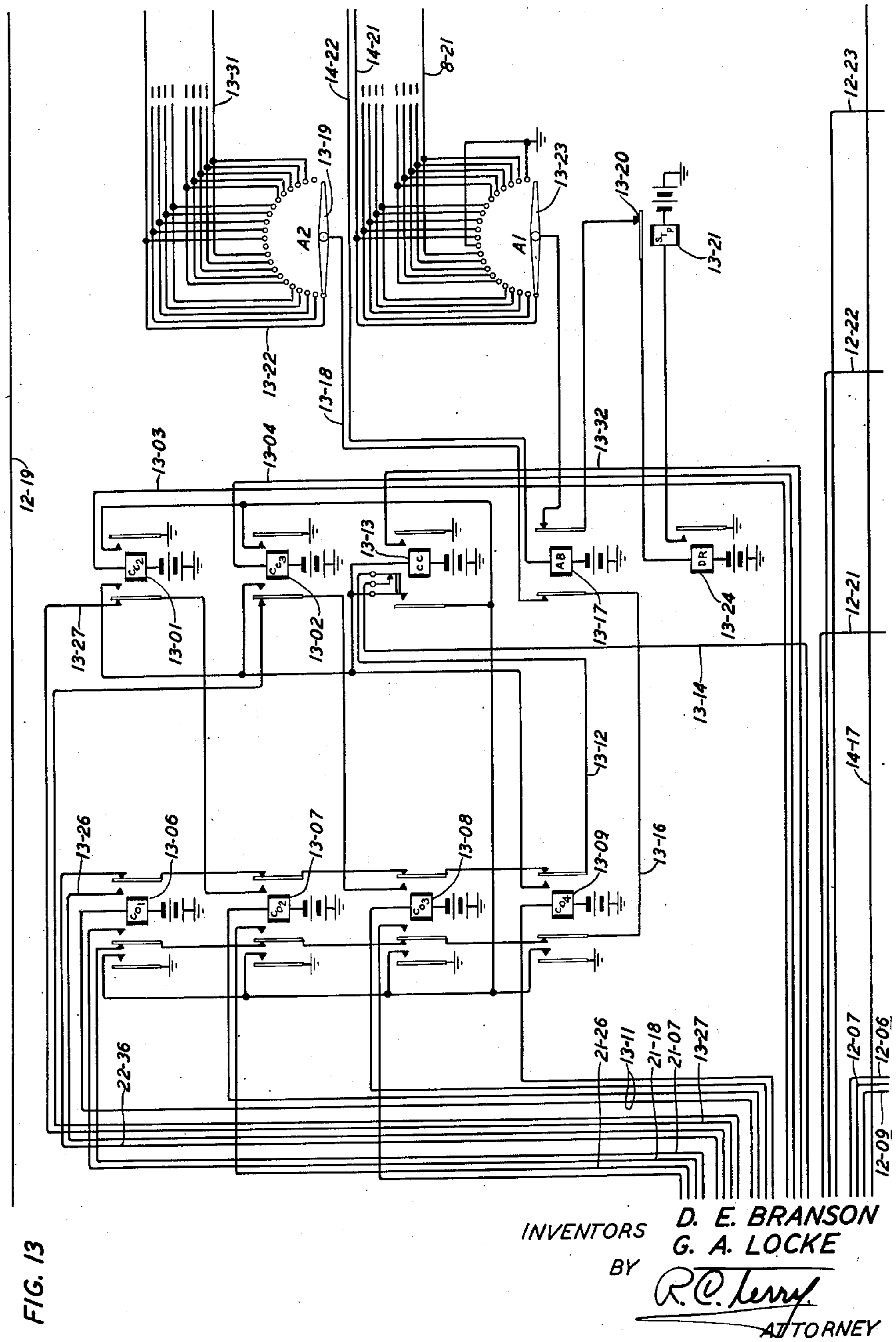

Select magnet 21—01, through its armature and front contact, connects ground over conductor 21—07, back contacts and inner left-hand armatures of relays 13—06, 13—07, 13—08 and 13—09 in chain sequence, conductor 13—16, left-hand armature and back contact of all-receivers-busy relay 13—17, which will be assumed to be released since outward paths are available, and conductor 13—18 to the contactor 13—19 of a stepping switch, the operating magnet of which is designated by reference numeral 13—21. The function of the stepping switch is to seek out idle outward paths and with contactor 13—19 engaging the first contact as shown in Fig. 13 the ground connection is extended over conductor 13—22, back contact and armature 2 of relay 14—03 in the control circuit for the first outward path, armature 1 and back contact of relay 14—06, break contacts controlled by the inner right-hand armature of relay 14—11, conductor 14—12 which is included in a group of conductors bracketed to Fig. 17, conductor 14—12 being traced through Figs. 17 and 21 through the winding of hold magnet 21—11 of the cross-bar switch, and this magnet operates, thereby operating the extreme left-hand group of contacts prepared by select magnet 21—01, these contacts being designated by the reference numeral 21—08.

Figure 17:
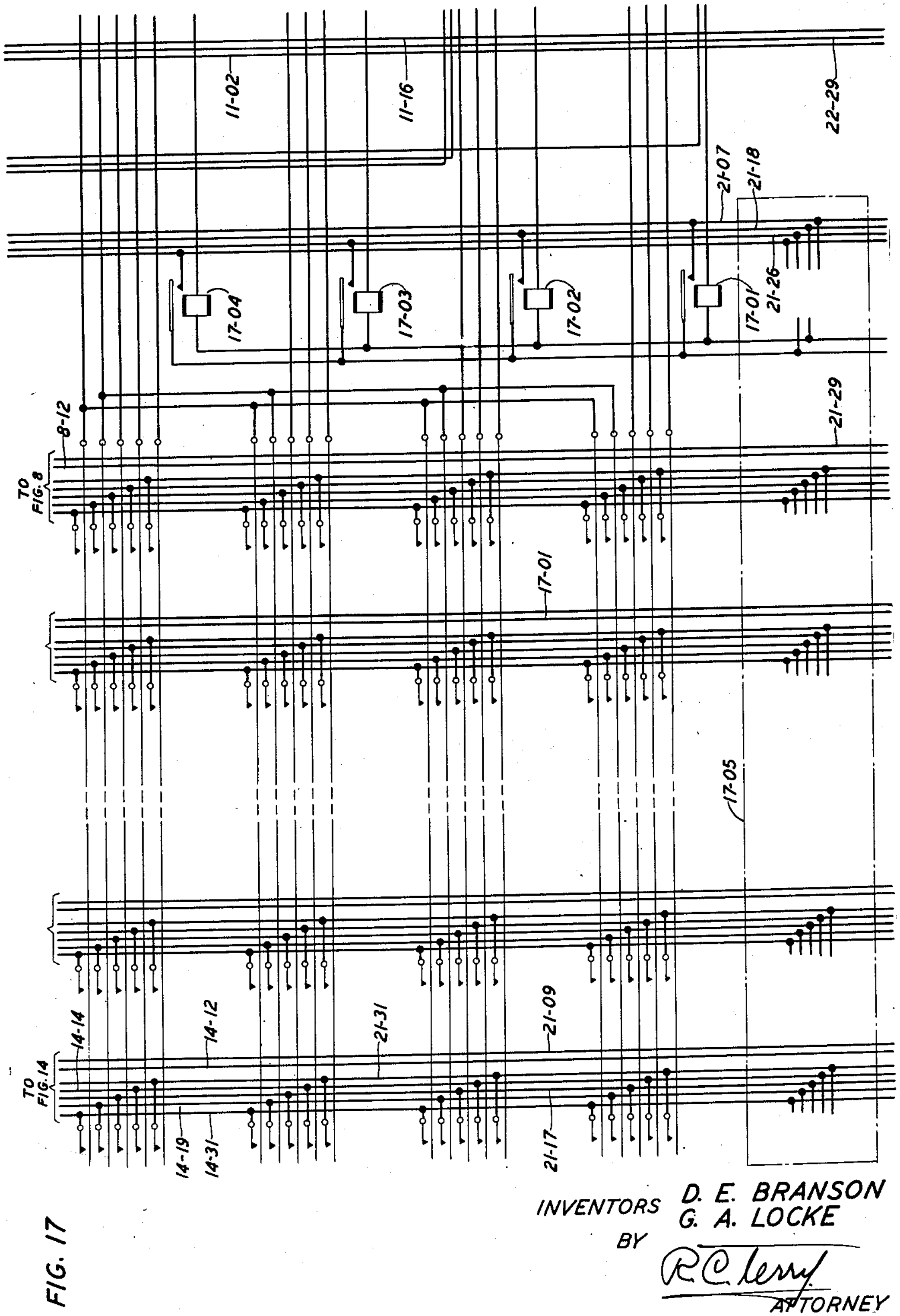

Hold magnet 21—11 connects ground through its front contact and armature and conductor 21—09 which is included in the group of conductors bracketed from Fig. 17 to Fig. 14, the path being traced in Fig. 14 through the outer right-hand armature and back contact of relay 14—11 to the winding of relay 14—13, which operates. Relay 14—13 has a slow operate characteristic and upon operation it connects ground over conductor 14—14 which is included in the group bracketed to Fig. 17 and is there found to be one of the vertical cross-connection conductors of the cross-bar switch, and has therefore become connected through the fourth of the contacts 21—08 to cross-bar switch horizontal conductor 21—16 which is traced to the winding of relay 22—21, and this relay operates, locking to the ground supplied through the armature 1 and front contact of relay 22—16.

At its outer right-hand armature and front contact the relay 22—21 connects ground through the back contact and armature 1 of relay 22—28 to armature 2 and back contact of the same relay and conductor 22—29 for locking sequence relay 11—04 independently of the ground connection supplied by relay 12—13 over conductor 12—22. At its inner left-hand armature and front contact the relay 22—21 completes a previously-traced energizing circuit for relay 13—06 and this relay operates. At its outer left-hand armature and front contact relay 22—21 connects ground over conductor 22—37, the third contact of the operated group of cross-connection contacts 21—08 in the cross-bar switch, vertical cross-bar switch conductor 21—17 which is included in the group of conductors bracketed to Fig. 14, to the winding of relay 14—11, and this relay operates.

Relay 13—06, having operated, as previously mentioned, its right-hand armature disconnects ground from conductor 22—36, over which select magnet 21—01 was energized, so that select magnet 21—01 releases, and extends the ground connection through the front contact of relay 13—06, conductor 13—26, front contact and armature 2 of relay 22—18, conductor 22—38 and winding of select magnet 21—02, which operates. Select magnet 21—02 prepares for operation the horizontal row of groups of cross-connection contacts which is controls and in addition connects ground over conductor 21—18, front contact and inner left-hand armature of relay 13—06 and through a previously traced path to stepping switch contactor 13—19.

With contactor 13—19 having remained on the first contact this path is extended to the break contacts controlled by the inner right-hand armature of relay 14—11. This relay was operated at the same time that relay 13—06 was operated, under the control of relay 22—21 and at its inner right-hand armature it connects ground over conductor 14—12 to lock the hold magnet 21—11, so that the circuit of this magnet is not disturbed by the operation of relay 13—06, the release of select magnet 21—01, or the operation of select magnet 21—02. Relay 14—11 interrupts the energizing circuit of relay 14—13 at its outer right-hand armature and back contact and upon the release of relay 14—13 the energizing circuit of relay 22—21 is interrupted, this relay remaining operated by virtue of its locking circuit previously described, and a circuit is completed from ground through the armature and back contact of relay 14—13, the front contact and inner left-hand armature of relay 14—11, and the left-hand winding of relay 14—03 and this relay operates, locking in a circuit through its right-hand winding, front contact and armature 5, conductors 14—16 and 14—17, armature 13 and front contact of relay 22—18, conductor 22—39 which includes a dotted section in Fig. 18 indicating a continuity path through break contacts of relays in other inward paths corresponding to the relay 22—18 in the first inward path, to ground through break contacts associated with the armature 13 of relay 18—18. Relay 18—18 is associated with the fifth inward path and corresponds to relay 22—18. Armature 13 of relay 18—18 is connected to conductor 14—17 by conductor 18—06 and the armature 13 of corresponding relays of other inward paths are similarly connected to conductor 14—17, so that if any one or more of the second, third, fourth and fifth inward paths is in use and the time of operation of relay 14—03 in response to seizure of the first outward path by the first inward path, conductor 14—17 will be grounded and relay 14—03 will lock immediately upon operating.

With relay 14—03 operated the path through resistor 14—07 from positive battery to conductor 12—19 which is in the energizing circuit for the lower windings of relays 12—12, 12—13 and 12—14 is interrupted at the back contact and armature 1 of relay 14—03, thereby changing the current through the operating windings of those relays, and if there had been only three outward paths available at the time of seizure of the first one, as has been assumed, the relay 12—13 would no longer be held on its left-hand contact and its armature would move to the right-hand contact. This does not affect the operation of the circuit in so far as the seizure of two more outward paths is concerned, but merely corrects the registration of availability of outward paths in view of the seizure of one of those paths.

At its armature 3 the relay 14—03 transfers the energizing circuit of alarm relay 14—18 from a direct ground on the back contact, through which relay 14—18 has been energized thus far, to a path extending over conductor 14—19 included in the group of conductors bracketed to Fig. 17, second contact of the contact group 21—08, conductor 21—19, conductor 21—21 and outer upper armature and back contact of relay 24—06 to ground. Alarm relay 14—18 has a slow release characteristic, so that it does not release during the transit of armature 3 of relay 14—03 from its back to its front contact. At its armature 6 the relay 14—03 extends a ground connection over conductor 14—21 to the first contact of the lower contact bank of the stepping switch in Fig. 13, which is engaged by contactor 13—23, and the path it extended from that contactor through the back contact and right-hand armature of relay 13—17, through the break contacts 13—20 controlled by stepping magnet 13—21 of the stepping switch, and winding of stepping magnet driving relay 13—24 to battery.

Relay 13—24 operates, and completes the circuit of stepping magnet which attracts its armature, opening the break contacts 13—20 and preparing to advance brushes 13—19 and 13—23. Contacts 13—20 interrupt the circuit of magnet driving relay 13—24, which releases. This relay interrupts the circuit of stepping magnet 13—21, which releases its armature, to reclose contacts 13—20 and to advance brushes 13—19 and 13—23 to the second contacts of the switch banks.

*Inward path seizes required two additional outward paths*

If the second outward path should be busy at the time contactor 13—23 engages the second contact the relay in the second outward path corresponding to relay 14—03 will be operated, or the relay corresponding to relay 14—06 may be operated under manual or automatic control to impose a busy condition on the second outward path, as will be described hereinafter, and in either case ground will be connected to the second contact of the lower contact bank, thus reestablishing the energizing circuit for relay 13—24 to cause the contactors 13—19 and 13—23 to be advanced to the third contacts in the two contact banks. The stepping of the contactors continues until contactor 13—23 finds a contact which is not grounded, and such contact indicates an available outward path. It will be supposed that the first available outward path following seizure of the first outward path is the ninth and that the contactors advance to the ninth contacts of the stepping switch where they stop. The ground connection now extended through the make contacts of select magnet 21—02 over conductor 21—18, and the front contact and inner left-hand armature of relay 13—06 and back contacts and inner left-hand armatures of relays 13—07, 13—08 and 13—09 and break contacts of relay 13—17 to the contactor 13—19 will be extended through a path in the control relay circuit of the ninth outward path comparable with the one traced in Fig. 14, to conductor 17—01 to cause the operation of hold magnet 21—13. Hold magnet 21—13 at its armature and front contact completes a circuit in the ninth outward path to operate a relay corresponding to relay 14—13 and this relay in turn completes the energizing circuit for relay 22—22 through one of the cross-connection contacts of the group 21—22 prepared by select magnet 21—02 and operated by hold magnet 21—13.

Relay 22—22 locks to the same locking circuit as relay 22—21, operates the relay of the outward path corresponding to relay 14—11 in the first outward path, and completes a circuit from ground through its inner left-hand armature and front contact, one of the conductors of group 22—34, armature 6 and front contact of relay 22—18, and one of the conductors of group 13—11, namely the one extending to the winding of relay 13—07 which operates. At its inner left-hand armature the relay 13—07 interrupts the energizing circuit for select magnet 21—02, which releases, and completes the energizing circuit for select magnet 21—03, which operates, the energizing circuit for select magnet 21—03 being as previously traced for the other select magnets to the right-hand armature of relay 13—07 and thence through its front contact, the left-hand armature and back contact of relay 13—01, conductor 13—27, front contact and armature 3 of relay 22—18 and conductor 22—41 and winding of select magnet 21—03 to battery.

The relay 22—22, in addition to operating relay 13—07, also operates a relay in the ninth outward path control circuit corresponding to the relay 14—11 in the first outward path, as previously stated. The relay corresponding to relay 14—11 provides a locking circuit for hold magnet 21—13, and releases the relay in the outward path corresponding to relay 14—13. This relay upon releasing operates the relay corresponding to relay 14—03, which locks and reenergizes the relay corresponding to relay 14—18 before that relay has had an opportunity to release. The relay corresponding to relay 14—03 completes the circuit of stepping switch driving relay 13—24 by grounding the ninth contact and thereby applying ground to contactor 13—23. This causes the contactor to step to the tenth contact, which will be assumed to have no ground upon it, the tenth outward path, the control circuit of which is shown in Fig. 8, being assumed to be idle.

With select magnet 21—03 operated, as previously stated, ground is extended through its armature and front contact and conductor 21—26, front contact and inner left-hand armature of relay 13—07, which is now operated, back contacts and inner left-hand armatures of relays 13—08 and 13—09, conductor 13—16, left-hand armature and back contact of relay 13—17, conductor 13—18, stepping switch contactor 13—19 and tenth contact of the upper bank, upon which the contactor has come to rest, conductor 13—31, back contact and armature 2 of relay 8—03, armature 1 and back contact of relay 8—06, break contacts controlled by the inner right-hand armature of relay 8—11, conductor 8—12 which is included in a group bracketed to Fig. 17, where conductor 8—12 reappears and extends to battery through the winding of hold magnet 21—27 which operates, operating one group of cross-connection contacts prepared by the select magnet 21—03, namely the group 21—28. Hold magnet 21—27 connects ground through its front contact and armature and over conductor 21—29 to operate relay 8—13. This relay in turn operates relay 22—23 over one of the cross-connections established by contacts 21—28 in the same manner that relay 14—13 operated the relay 22—21. Relay 22—23 operates, locks, and operates relay 8—11 through another path established through contacts 21—28 of the cross-bar switch and also operates relay 13—08 through one of the conductors 22—34, armature 7 and front contact of relay 22—18, and one of the conductors 13—11. Relay 8—11 releases relay 8—13 and locks hold magnet 21—27. Relay 8—13 upon releasing operates relay 8—03 which locks, in turn reestablishing the energizing circuit for alarm relay 8—18 which has not yet released if there is no trouble condition to cause an alarm.

Relay 8—03 connects ground through its armature 6 and front contact and over conductor 8—21 to the tenth contact of the lower contact bank, which is now engaged by its contactor, for the purpose of establishing the circuit of stepping switch magnet driving relay 13—24 to drive the stepping switch to seek the next idle outward path. If the tenth outward path should have been the last idle one the relay 8—03 will establish a circuit from ground through its front contact and armature 4, conductor 8—16, front contacts and armatures 4 of relays of the other outward path control circuit corresponding to the relay 8—03, one such relay being designated by the reference numeral X—03 in Fig. 8, conductor 8—17, front contact and armature 4 of relay 14—03, conductor 14—22 and winding of relay 13—17 to battery, and this relay operates. At its right-hand armature the relay 13—17 interrupts the connection between stepping switch contactor 13—23 and stepping magnet driving relay 13—24 so that the stepping switch contactors 13—19 and 13—23 cannot be advanced. At its left-hand armature the relay 13—17 interrupts the path to contactor 13—19 of the stepping switch over which idle outward paths are seized. Relay 13—17 will remain operated until one or more outward paths become idle, in a manner which will be described hereinafter, and when outward paths become available the energizing circuit of relay 13—17 will be interrupted at the armatures 4 and front contacts of one or more of the relays 14—03, X—03, and 8—03, to reestablish the circuit of driving relay 13—24 to advance the stepping switch contactors until contactor 13—23 comes into engagement with an ungrounded contact.

As previously stated, the relay 22—23 completed the energizing circuit of relay 13—08 which operated. Relay 13—08 completes the energizing circuit of relay 13—13, the circuit being traced from battery through the winding of relay 13—13, front contact and left-hand armature of relay 13—02, which was selectively operated by relay 22—18 because the relay 23—03, indicative of a demand for three outward paths, was operated prior to the operation of relay 22—18, the circuit being continued through the front contact and inner right-hand armature of relay 13—08 and thence to the ground connection which completed the energizing circuits for the select magnets in succession, the path being traced through the back contact and right-hand armature of relay 13—09, the break contacts controlled by the right-hand armature of relay 13—13, conductor 13—14 and front contact and armature 12 of relay 22—18 to ground. Relay 13—13 locks in a path traced through its front contact and left-hand armature, and through the front contact and outer left-hand armature of relay 13—08 to ground and also through the front contact and right-hand armature of relay 13—02 to ground.

Had only two outlets been required instead of three the relay 13—01 would have become operated when relay 22—18 operated, the reason for this being that the relay 23—04 would have been previously operated. Relay 13—13 would then have operated upon the operation of relay 13—07, the circuit being completed through the front contact and left-hand armature of relay 13—01. When neither of the relays 13—01 and 13—02 is operated the relay 13—13 becomes operated in a path through the front contact and right-hand armature of relay 13—09, relay 13—09 being operable in connection with the seizure of the last of four outward paths, since that is the maximum number intended to be seized in accordance with the arrangement disclosed herein.

Relay 13—13, upon operating and locking as previously described, completes a circuit from ground through its right-hand armature and front contact, conductor 13—32, front contact and armature 11 of relay 22—18, conductor 22—42 and winding of start relay 22—28 and this relay operates, locking in a path through its front contact and armature 4 and front contact and armature 5 of relay 22—16 to ground. Relay 22—28 interrupts the locking circuit of sequence relay 11—04 which releases. This relay reoperates the relay 11—11 which stops tube 12—27 from timing out, thereby preventing the cutting off of that tube and the release of relay 12—31 in its anode circuit, except under conditions which will be described hereinafter. Relay 11—04 also releases relay 22—18. This relay releases relays 13—06, 13—07 and 13—08, and they in turn release the relay 13—13.

*Inward path initiates cross-office transmission*

Figure 16:
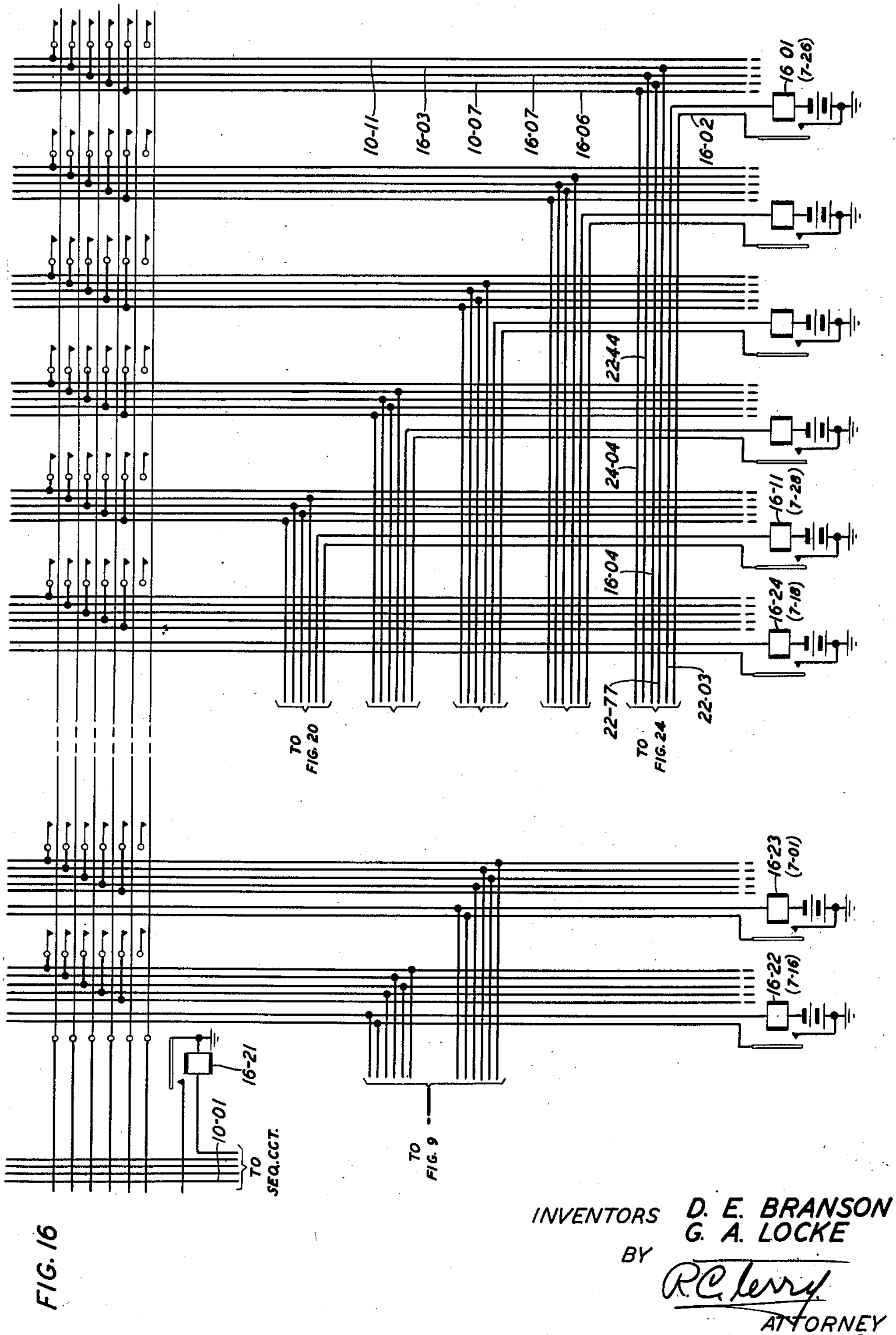

With relay 22—18 released a circuit is established from ground on its armature 12 through the back contact, conductor 22—43, front contact and armature 3 of relay 22—28, armature 4 and front contact of relay 22—16, conductor 22—44 which is included in the group bracketed to Fig. 16, where conductor 22—44 reappears and is connected to cross-bar switch vertical conductor 16—07 which is connected via the third of the cross-connection contacts 10—04, counting from the top, to cross-bar switch horizontal conductor 10—08, outer lower armature and front contact of relay 9—41, which became operated in connection with the decoding of the second character of the address code, as is described in the Bacon et al. application, in this case a supplementary multiple address code AB, the circuit being extended from the front contact through the winding of start relay 9—39 to battery. Start relay 9—39 locks through its front contact and inner armature to the same path over which it was energized but in shunt with the outer lower armature and front contact of relay 9—41.

At its middle upper armature the relay 9—39 supplies a ground connection in parallel with that supplied by the outer left-hand armature of relay 9—28 for holding relay 22—02 in the inward path energized. At its outer armature the relay 9—39 opens its break contacts to remove ground connection from the previously traced path to the operating windings of relays 24—02 and 24—03, and substitutes for that ground connection a ground supplied through the transmitter 9—07 and resistor 9—42. There are two transmission paths from transmitter 9—07 through the outer armature and front contact of relay 9—39, one previously traced through the break contacts of relay 9—37, conductors 10—09, conductor 10—06 and conductor 24—04 to the windings of relays 24—02 and 24—03, and the other extending over conductor 9—43, uppermost or first cross-connection contact of the cross-bar switch contact group 10—04 and cross-bar switch vertical conductor 10—11. The group of conductors bracketed to Fig. 24 does not include any conductor connected to cross-bar vertical conductor 10—11. From this it is apparent that the cross-office transmission to relays 24—02 and 24—03 takes place only over the path including the break contacts of relay 9—37.

As is disclosed in the Bacon et al. application the start relay, which in the present disclosure is relay 9—39, operates a relay which controls the transmission of the first call directing code of the first address code, which is no longer available in the transmitter but is stored in the first code fan relay circuit, this relay being the relay 9—37 in the diagrammatic representation of the director in Fig. 9 of the drawings accompanying the present specification. This relay in turn operates a transmitter-distributor clutch magnet to start transmission. Because of the fact that relay 9—37 is operated, conductor 9—09 is disconnected from the transmitter distributor and is connected to ground through the armature of relay 9—37 and break contacts of relay 9—44. This ground connection blinds the relays 24—02 and 24—03 so that the first call directing code of the supplementary multiple address code AB, namely the code for the letter A is discarded. Relay 9—37 releases before the transmission of the second call directing code, and remains released, the transmitter distributor continuing in operation to transmit the second call directing code B, the letters signal following it, the address codes for the three stations to which the message is addressed, each followed by a letters signal, the carriage return and line feed signals, the text of the message and the end-of-message signals comprising figures H.

During the transmission of the first two codes, B and letters, the director performs a sequence of operations which includes operation of relay 9—22. This relay has break contacts through which the ground connection supplied over conductor 9—32, right-hand armature and front contact of relay 9—28, conductors 9—31 and 9—21, is extended to lock relay 9—28 through its inner right-hand armature and front contact. The ground connection is also extended from conductor 9—31 to conductor 10—06 and over a path previously traced, to hold relay 22—16 operated. When relay 9—22 operates it extends ground from its inner armature over conductors 9—21 and 10—06 to hold relay 22—16 operated and at the same armature it interrupts the holding circuit of relay 9—28 which releases. Relay 9—22 remains operated during the transmission of the remaining address codes, and the message, and until the director recognizes the end-of-message signal.

At the time of response of the relays 24—02 and 24—03 to the second character of the first address code a path is traced from the armature of relay 24—03, which is shown engaging its marking contact, over conductors 24—07, 24—08, 24—09 and 24—11, the outer upper armature and back contact of relay 24—12, conductors 24—13 and 24—14, the fifth or lowermost of the cross-bar switch contacts 21—08 operated by hold magnet 21—11, conductor 21—31 included in the group bracketed to Fig. 14, and winding of repeating relay 14—26 to positive battery. Relay 24—03 has positive battery on its marking contact and since relay 14—26 has positive battery on its operating winding no current flows for the marking condition of relay 24—03 and the armature of relay 14—26 is held on the marking contact by current in the biasing winding. When relay 24—03 operates to spacing the ground on the spacing contact of the relay completes a circuit for current flow in the operating winding of relay 14—26, and this current overcomes that in the biasing winding operating the armature away from the marking contact. The armature of relay 14—26 is connected by conductor 14—27 to the winding of selector magnet 15—01 of a reperforator-transmitter unit comprising reperforator 15—02 and transmitter 15—03. Reperforator 15—02 perforates in the tape 15—04 the first code combination repeated by the relay 24—03 to relay 14—26 and in turn repeated by that relay to the selector magnet 15—01 and this is the code combination for the letter B, the second character of the supplementary multiple address code.

In the cycle of operation of reperforator 15—02 in which it receives the first code combination universal contacts 15—06 move off-normal momentarily and return, connecting ground over conductor 15—07, armature 8 and front contact of relay 14—03, which is locked operated, and winding of universal relay 14—28 to battery and this relay operates. At its left-hand armature the relay 14—28 provides a locking circuit for itself from ground through the left-hand armature and front contact and the armature 8 and front contact of relay 14—03. At its right-hand armature and front contact the relay 14—28 establishes a path from ground through the normal or break contacts of the universal contacts 15—06, conductor 15—08, right-hand armature and front contact of relay 14—28 and winding of alarm relay 14—29 to battery, this being in parallel with the ground connection supplied through the armature and front contact of alarm relay 14—18, which is at this time energized over a previously traced path including the armature 3 and front contact of relay 14—03 and the armature 1 and back contact of relay 24—06, this path also including cross-connection contacts in the cross-bar switch contact group 21—08. Until such time as the relay 24—06 operates, and with hold magnet 21—11 and relay 14—03 remaining operated, relay 14—18 remains operated, and the ground connection supplied steadily by relay 14—18 masks the ground intermittently removed from the winding of relay 14—29 by universal contacts 15—06, and machine alarm relay 14—29 cannot release.

Relay 24—02 controls a character timing circuit to pulse a relay, specifically to release and reoperate the relay, once for each code combination received by the relay 24—02. Because of the fact that only the spacing contact of relay 24—02 is used in controlling the character timing circuit the marking contact is connected by conductor 24—16 through the outer right-hand armature and front contact of relay 22—01 to lamp 22—51. Relay 22—01 has been operated and locked so that lamp 22—51 is lighted steadily while relay 24—02 is awaiting signals, and flashes during operation of the armature of relay 24—02 in response to signals, thereby giving a visual indication when signals are being received. The armature of relay 24—02 is connected to positive battery and the spacing contact is connected through the armature 6 and back contact of relay 24—06 to the right-hand grid of electron discharge tube 24—17 and through a resistor to negative battery. Prior to operation of the armature of relay 24—02 to the spacing contact in response to the start pulse of the first code combination the grid of the right-hand triode of tube 24—17 is negative and this triode is cut off. It serves as an input relay. The left-hand triode of tube 24—17 serves as an output relay, its anode circuit including the winding of relay 24—18. The left-hand triode of tube 24—17 is normally conductive so that relay 24—18 is operated. The anode circuit of the right-hand triode of tube 24—17 includes load resistors 24—21 and 24—22 and the anode supply battery designated 24—23.

Another electron discharge tube 24—26 comprising two triode sections is connected to operate as a flip-flop circuit. The grid of the left-hand triode of tube 24—16 is coupled through limiting resistor 24—27 and timing resistor 24—28 to positive battery 24—23. There is a resistor 24—29 between battery 24—23 and the circuits of tubes 24—17 and 24—26 but it is merely a protective resistor, and its value is extremely small in comparison with the other resistors, so that it may be disregarded. The load resistor for the left-hand triode of tube 24—26 is designated by the reference numeral 24—31 and the anode of that triode section is connected through coupling resistor 24—32 and limiting resistor 24—33 to the right-hand grid of tube 24—26. The grid of the right-hand triode of tube 24—26 is returned to negative battery from the junction of resistors 24—32 and 24—33 through resistor 24—34. Resistor 24—22, in addition to serving as part of the load for the right-hand triode of tube 24—17, is also the load for the right-hand triode of tube 24—26. The grid of the left-hand triode of tube 24—17 is returned to positive through grid current limiting resistor 24—36 and timing resistor 24—37 and is coupled from the junction of these resistors through condenser 24—41 to the junction of resistors 24—21 and 24—22 of the load circuit of the right-hand triode of tube 24—17. The grid of the left-hand triode of tube 24—26 is coupled to the same point through condenser 24—42.

Prior to responsive relay 24—02 to the first code combination the right-hand triode of tube 24—17 is cut off, the left-hand triode is conducting, the right-hand triode of tube 24—26 is cut off and the left-hand triode is conducting. When the relay 24—02 responds to the start impulse and connects positive battery to its spacing contact the grid of the right-hand triode section of tube 24—17 swings toward positive and that triode becomes conductive, producing a current flow through resistors 24—21 and 24—22 which swings the junction of those resistors toward negative. This negative voltage swing is impressed through condenser 24—42 on the grid of the left-hand triode of tube 24—26 to cut off that triode. With the left-hand triode of tube 24—26 cut off the anode swings toward positive, and swings the grid of the right-hand triode of the same tube toward positive, rendering that section conductive. This increases the potential difference across resistor 24—22, thereby impressing a further negative voltage swing through condenser 24—42 on the grid of the left-hand triode section of tube 24—26. At the same time that a negative pulse is applied through condenser 24—42 to the grid of the left-hand triode section of tube 24—26 to cut off that triode section a negative pulse is applied through condenser 24—41 to the grid of the left-hand triode section of tube 24—17 to cut off that triode section, and this results in the release of relay 24—18.

During the response of relay 24—02 to the marking and spacing impulses of the code combination the grid of the right-hand section of tube 24—17 is swung toward negative and toward positive, respectively, but little or no current flows even during the spacing intervals when the grid is swung toward positive and no significant change in conductivity occurs between the two conditions because the flow of current through the right-hand triode of tube 24—26 and its load resistor 24—22, which is common to the right-hand triode of tube 24—17, holds the anode potential of the right-hand triode of tube 24—17 to such a low value that anode current will not flow to any significant extent. In this way the right-hand triode of tube 24—26 renders the right-hand triode of tube 24—17 insensitive to the incoming signal pulses and there occurs no repetitious negative pulsing of the left-hand grids of tubes 24—17 and 24—26 as the impulses of the code combination are received.

The timing constants imparted by resistor

24—37 and condenser 24—41 are such that the left-hand triode of tube 24—17 again becomes conductive and reenergizes relay 24—18 about half-way through the code combination that is being received by relay 24—02. The timing constants imparted to the left-hand triode of tube 24—26 by resistor 24—28 and condenser 24—42 are such that the triode remains cut off until after the armature of relay 24—02 has returned to engagement with the marking contact in response to the stop impulse ending the code combination. During the intervals between the reactivation of the left-hand triode of tube 24—17 and the reactivation of the left-hand triode of tube 24—26 the left-hand triode of tube 24—17 is not again cut off because of the fact that the right-hand triode of tube 24—26 holds the right-hand triode of tube 24—17 insensitive to received spacing impulses.

When the left-hand triode of tube 24—26 is reactivated after the space-to-mark transition marking the beginning of the stop impulse it swings the grid of the right-hand triode section of tube 24—26 toward negative, thereby cutting it off. Since the relay 24—02 is at this time responding to the stop impulse of marking nature the grid of the right-hand triode of tube 24—17 is at negative potential and that triode is cut off, so that the circuit for pulsing relay 24—18 once for a received code combination is restored to normal condition at the end of the code combination. It repeats this cycle of operation in response to each code combination received by relay 24—02, releasing relay 24—18 for an interval of approximately one-half that of the complete code combination and then reoperating the relay.

*Message destination address codes are distributed to the outward paths*

Upon the first release of relay 24—18 a circuit is closed which is most conveniently traced by beginning at ground on the armature 6 of relay 22—16 and continuing through that armature and front contact, conductor 22—52, back contact and armature of relay 24—18, conductor 24—51, the inner upper armature and back contact of relay 23—16, inner upper armature and back contact of relay 23—17, conductor 23—18, inner lower armature and back contact of relay 24—52, conductor 24—53, inner armature and back contact of relay 23—19, inner armature and back contact of relay 23—21 and winding of relay 23—22 to battery and this relay operates. At its inner armature the relay 23—22 connects to the ground terminal of its own winding the winding of relay 23—21, the path being traced through the noted armature and front contact of relay 23—22, the winding of relay 23—21, conductor 23—23, back contact and armature of relay 24—54, conductor 24—56, outer lower armature and back contact of relay 24—52 to conductor 22—52 and back over that conductor through the front contact and armature 6 of relay 22—16 to ground, so that relay 23—21 has ground connected to both terminals of its winding and remains unoperated. Upon the reoperation of relay 24—18 the ground connection applied through the inner armature and back contact of relay 23—21 to the winding of relay 23—22 is disconnected but relay 23—22 remains operated through its inner armature and front contact and the winding of relay 23—21 and the latter relay operates in series with the relay 23—22 by virtue of the ground connection previously traced over conductor 23—23. The operation of relays 23—22 and 23—21 represents the registration of the first step in the counting of code combinations received by relays 24—02 and 24—03 from the incoming line transmitter, this count corresponding to the first code combination which is the second character of the supplementary multiple address code, this particular instance the code for the character B. Relay 23—21, at its inner armature and front contact, has transferred the original energizing circuit of the relay 23—22 to the relay 23—24.

The next code combination received by relays 24—02 and 24—03 is the letters signal preceding the first address code for an addressed station and the armature of relay 24—03 remains connected to the operating winding of repeating relay 14—26 so that selector magnet 15—01 of the reperforator in the first outward path receives this code combination and it is perforated in the tape. Upon the release of relay 24—18 by the pulsing circuit it completes the energizing circuit of relay 23—24 which operates and prepares a holding circuit in series with the winding of relay 23—19, and upon the reoperation of relay 24—18 this holding circuit becomes effective and relay 23—19 operates in series in the locking circuit of relay 23—24 in the same manner as relay 23—21 operated in the locking circuit of relay 23—22. At its inner armature and front contact the relay 23—19 transfers the original energizing circuit for relay 23—24 to relay 23—26.

The next character received by relays 24—02 and 24—03 and retransmitted by the relay 24—03 to selector magnet 15—01 through the intermediate agency of repeating relay 14—26 is the first character of the address code of the first addressed station, which has been assumed to be the character C. Upon the release of relay 24—18 during the transmission of this signal the relay 23—26 operates and upon the reoperation of relay 24—18 the relay 23—17 operates in the locking circuit of relay 23—26. Relay 23—17, at its inner armature and front contact, transfers the original energizing circuit for relay 23—26 to relay 23—27.

The next signal received is the second character of the first address code, assumed to be the character D, and the relay 24—18 releases to complete the operating circuit of relay 23—27 and reoperates to permit the operation of relay 23—16 in the locking circuit of relay 23—27. At its inner armature the relay 23—16 interrupts the original energizing circuit of relay 23—27 and transfers the ground supply path to the contact associated with that armature and thence over conductor 23—28, upper armature and back contact of relay 24—57, upper armature and back contact of relay 24—58, upper armature and back contact of relay 24—52 and winding of relay 24—12 to battery.

The next signal is the letters signal preceding the second address code. Upon the release of relay 24—18 during the transmission of the letters signal the relay 24—12 is operated and upon the reoperation of relay 24—18 the relay 24—52 operates in the locking circuit of relay 24—12.

With relay 24—12 operated the transmission path from the armature of relay 24—03 through the outer upper armature and back contact of the relay and over conductors 24—13 and 24—14 and the rest of the path previously traced to the operating winding of repeating relay 14—26 is interrupted and the path from the armature of relay 24—03 is transferred through the front contact and outer upper armature of relay 24—12, outer upper armature and back contact of relay 24—61, conductors 24—62 and 24—63, and lowermost contact of the cross-bar switch contact group 21—22 to a vertical conductor extending to the repeating relay in the ninth outward path corresponding to relay 14—26 in the first outward path. This transfer takes place during the transmission of the letters signal following the first station address code. Because of the fact that the letters signal has all of its significant elements of marking nature, the transfer from one to another of the outward path reperforators is made after the start impulse which is of spacing nature, and no mutilation occurs because relay 14—26 remains in the marking condition, which is a no-current condition in the operating winding, and is the same whether the positive battery on its upper winding is opposed by the positive battery on the marking contact of relay 24—03 or whether the transmission path to its upper winding is interrupted. This type of transmission, in which no current flows in the operating winding of the repeating relay for the marking condition and current flows for the spacing condition is called inverse neutral transmission and the advantage of this type of transmission to the outward paths will now be apparent, since the interruption of the transmission circuit to an outward path during the transmission of the letters signal causes no mutilation of the character and the reperforator interrupts the continuing marking condition as part of the letters signal and records the letters signal. Since the transfer to another outward path takes place after the transmission of the start impulse of the letters signal the outward path reperforator to which the transfer is made does not receive the letters signal and it interprets those of the marking impulses of the letters signal that it receives as a continuation of the steady idle condition of marking nature which existed prior to the connection of the armature of relay 24—03.

Relay 24—52 interrupts, at its outer lower armature, the locking circuits of relays 23—22, 23—24, 23—26 and 23—27 and these relays release, and because relays 23—21, 23—19, 23—17 and 23—16 were energized in these locking circuits they release also. With these eight relays released a path is traced from ground through the back contact and outer armature of relay 23—27, corresponding back contacts and armatures of relays 23—26, 23—24 and 23—22, outer armatures and back contacts of relays 23—21, 23—19, 23—17 and 23—16, this being a chain or series path, conductor 23—31, front contact and inner upper armature of relay 24—12 and winding of relay 24—66 to battery and this relay operates and locks in a path from battery through its lower winding, the front contact and lower armature, conductor 24—64 and front contact and armature 7 of relay 22—16 to battery. Relay 24—66 prepares a locking circuit for relay 23—26 when that relay operates in connection with the next code combination received by relays 24—02 and 24—03, as will now be described.

The next code combination received is the first character of the second station address code, assumed to be the character B. This code combination is received and perforated by the reperforator in the ninth outward path, and upon the release of relay 24—18 during the transmission of this code combination the ground supplied over conductor 22—52 from the armature 6 of relay 22—16 is extended through the back contact and armature of relay 24—18, conductor 24—51, inner armature and back contact of relay 23—16, inner armature and back contact of relay 23—17, conductor 23—18, inner lower armature and front contact of relay 24—52, conductor 24—67 and winding of relay 23—26 to battery and this relay operates. Upon the reoperation of relay 24—18 near the end of the received code combination, relay 23—26 locks through the winding of relay 23—17, conductor 23—23, back contact and armature of relay 24—54, conductor 24—56, lower armature and back contact of relay 24—58 and front contact and upper armature of relay 24—66, the operation of which was described in the preceding paragraph to ground.

The next code combination transmitted is the second character of the second station address code, assumed to be the character G, and upon the release of relay 24—18 the circuit of relay 23—27 is completed, this path being the same as that previously traced in the description of the first operation of relay 23—27, including the front contact and inner lower armature of relay 23—17 and the back contact and inner lower armature of relay 23—16. Upon the reoperation of relay 24—18 by the timed relay pulsing circuit comprising tubes 24—17 and 24—26 the locking circuit of relay 23—27 is completed through the winding of relay 23—16 and this relay operates.

The next code combination received is the letters signal intervening the second and third station address codes. The ground connection extended from conductor 22—52 to conductor 24—51 when relay 24—18 releases is traced from the armature of relay 24—18 over conductor 24—51, inner armature and front contact of relay 23—16, conductor 23—28, upper armatures and back contacts of relays 24—57 and 24—58 in series, upper armature and front contact of relay 24—52, conductor 24—68, outer upper armature and back contact of relay 23—04, conductor 23—32 and winding of relay 24—61 to battery and this relay operates. Upon the reoperation of relay 24—18 the relay 24—61 locks in a circuit paralleling that of relay 24—12 and including the winding of relay 24—58 which operates. It should be noted that the energizing circuit for relay 24—61 included break contacts of relay 23—04 which would have been energized instead of the relay 23—03 had the message been preceded by only two addresses and would have prevented the energization of relay 24—61 to transfer the output of repeating relay 24—03 to another outward path.

Relay 24—61, at its outer upper armature interrupts the path from the armature of relay 24—03 to conductor 24—63 over which the two code combinations of the second address code and the letters signal following that code have been transmitted, the interruption taking place during the transmission of the letters signal but without garbling it, and at its middle upper armature and front contact the relay 24—61 connects the armature of repeating relay 24—03 over conductors 24—07, 24—08 and 24—09, the noted armature and front contact of relay 24—61, the outer upper armature and back contact of relay 24—71, conductor 24—72, the lowermost or fifth of the cross-connection contacts 21—28 of the cross-bar switch, conductor 21—32 which is included in the group bracketed to Fig. 8, and winding of repeating relay 8—26 to battery, relay 8—26 being associated with the tenth outward path and being arranged to transmit over conductor 8—27 to reperforator 15—12 of the tenth outward path. At its inner upper armature and front contact the relay 24—61 prepares an energizing circuit for relay 24—73 but the completion of this circuit awaits the connection of ground to conductor 23—31 which in turn awaits the release of relays 23—26 and 23—27. Relay 24—58, upon operating in the locking circuit of relay 24—61, interrupts at its lower armature and back contact the holding circuits for relays 23—26 and 23—27 and these relays release, completing the circuit of relay 24—73 which operates and locks through its lower winding and lower armature and front contact to the locking circuit for relay 24—66. Relay 24—73, at its upper armature, prepares another holding circuit for relays 23—26 and 23—27.

During the transmission of the next code combination, which is the first character of the third station address code, assumed to be the character C, relay 24—18 releases and reoperates, operating and locking relays 23—26 and 23—17. During the transmission of the next signal, which is the second character of the address code, assumed to be the character A, the relay 24—18 releases and reoperates, operating and locking the relays 23—27 and 23—16. During the transmission of the letters signal following the second character, the relay 24—18, upon releasing, extends the ground connection on conductor 22—52 over conductor 24—51, the inner armature and front contact of relay 23—16, conductor 23—28, upper armature and back contact of relay 24—57, upper armature and front contact of relay 24—58, conductor 24—75, outer upper armature and front contact of relay 23—03, which is operated to signify a three-address message, conductor 23—33 and winding of relay 24—06 to battery and this relay operates. It may be noted that had the relay 23—04, instead of the relay 23—03, been operated at the time of transmission of the letters signal following the second station address code, the circuit of relay 24—06 would have been completed instead of the circuit of relay 24—61. It should also be noted that if relay 23—07 were at this time operated instead of the relay 23—03, the former relay designating a four-address message, the ground connection would not have been extended over conductor 23—33 but would have been extended through the outer upper armature and back contact of relay 23—03 and over conductor 23—34, to operate relay 24—71. To complete the consideration of the possibilities it should be noted that in the case of a four-address message, after the relays 24—71 and 24—57 have been operated, relays 23—26, 23—27, 23—17 and 23—16 have been released, reoperated during the transmission of the code combinations of the fourth address code, and locked by relay 24—74, the circuit completed by relay 24—18 upon its release, involving ground extended to the upper armature of relay 24—57 over conductor 23—28, includes the front contact associated with that armature, conductor 24—76 and conductor 23—33 and winding of relay 24—06 to battery, and relay 24—06 would be operated.

Since the switching of the message that is being described does not involve the operation of relays 24—71 and 24—57 the consideration of the operation returns to the point of operation of relay 24—06 in a circuit including the outer upper armature and front contact of relay 23—03. Relay 24—06 locks, upon the reoperation of relay 24—18, in a circuit including the winding of relay 24—54, which operates.

*Inward path transmits to all seized outward paths following last address code*

At its armatures 2, 3 and 5 the relay 24—06 connects the armature of repeating relay 24—03 to conductors 24—14, 24—63 and 24—72 for transmission of the signals which follow the address codes, namely carriage return, line feed, the text of the message and the end-of-message signals, to the three reperforators that have been seized, namely reperforator 15—02, reperforator 15—12 and reperforator in the ninth outward path. In the case of the transmission conductor 24—72 the connection thereto through the front contact and armature 2 of relay 24—06 shunts the connection through the middle upper armature and front contact of relay 24—61 and outer upper armature and back contact of relay 24—71, this connection being maintained because relay 24—71 did not become operated. Had it become operated a connection would have been established from the armature of repeating relay 24—03 through conductors 24—07 and 24—08, the front contact and middle upper armature of relay 24—71 and conductor 24—77 which is the cross-bar switch horizontal transmission conductor for transmission through contacts controlled by select magnet 21—04 for transmission to a fourth outward path of a four-address message.

At its armature 6 the relay 24—06 interrupts the connection from the spacing contact of relay 24—02 to the grid of the right-hand triode of tube 24—17. This tube accordingly remains cut off during the transmission of the message, the character timing and relay pulsing circuits comprising tubes 24—17 and 24—26 remain dormant and relay 24—18 remains operated. At its armature 1 the relay 24—06 disconnects ground from conductor 21—21 which is traced to Fig. 21 where it branches to include a conductor in each of the horizontal levels of the cross-bar switch in Fig. 21 and from these branches the ground is extended through operated contacts 21—08, 21—22 and 21—28 over paths previously traced to relay 14—18 in the first outward path, to a corresponding relay in the ninth outward path and to relay 8—18 in the tenth outward path, these being alarm relays. The relays 14—18 and 8—18 release slowly, disconnecting ground from the windings of relays 14—29 and 8—29, respectively. The latter relays are machine alarm relays and in the case of relay 14—29 an energizing path has previously been traced through the right-hand armature and front contact of relay 14—28, conductor 15—08 and break contacts of the universal contacts 15—06 to ground. Control of machine alarm relay 14—29 is thus transferred to the universal contacts 15—06 and control of machine alarm relay 8—29 is transferred to similar contacts associated with reperforator 15—12. Machine alarm relay 14—29 is a slow release relay and if contacts 15—06 remain off-normal for an abnormal interval, which would indicate a machine failure the relay 14—29 releases to bring in an alarm as will be described hereinafter. With relay 24—54 operated the locking circuit of relays 23—26, 23—27, 23—17 and 23—16 are interrupted and these relays release.

*Disconnect signal causes release of connected inward path and seized outward paths*

An inward path, such as the one shown in Figs. 22, 23 and 24, and the outward paths to which it has established connections remain in the present condition during the transmission of the message and the recording thereof by the connected reperforators. At the end of the message the disconnect or end-of-message signal, comprising the codes for figures and H are received by repeating relay 24—03 and repeated by it to the outward path repeating relays, such as relays 14—26 and 8—26 which in turn repeat them to reperforators 15—02 and 15—12, respectively. As described in the Bacon et al. application, the director circuit in Fig. 9 recognizes the sequence of codes figures and H as the end-of-message signal and performs a sequence of operations including the release of relay 9—22. With this relay released, and relay 9—28 previously released, ground is disconnected from conductors 9—21 and 16—06 included in the holding circuit of relay 22—16 in the inward path. This relay releases relays 24—12 and 24—52, relays 24—61 and 24—58, and relays 24—06 and 24—54. Relays 24—12 and 24—61 release relays 24—66 and 24—73, respectively. Relay 22—16 also releases relays 22—21, 22—22 and 22—23. Relay 22—21 releases relay 14—11 in the first outward path, relay 22—23 releases a corresponding relay in the ninth outward path and relay 22—23 releases relay 8—11 in the tenth outward path. Relay 14—11 releases hold magnet 21—11, relay 8—11 releases hold magnet 21—27, and the corresponding relay in the ninth outward path releases hold magnet 21—13. Relay 14—11 also releases relay 14—03 which releases relay 14—28 and reoperates relay 14—18. Similarly 8—11 also releases relay 8—03 which releases relay 8—28 and reoperates relay 8—18. Corresponding operations take place in the control circuit for the ninth outward path. With relays 14—03, 8—03 and the corresponding relay of the ninth outward path released the relay 13—17 is released, if it has not previously released due to the release of other outward paths in the meantime.

Relay 22—16 also releases start relay 9—39 in the director circuit. This relay in turn releases relay 22—02 in the first inward path and the relay 22—02 releases hold magnet 16—01. Hold magnet 16—01 releases relay 23—03 and this relay in turn releases relay 22—08 and relay 22—01. It is convenient to note at this point that relay 22—01 will not release in response to the release of relay 23—03 if a previously traced supplementary locking circuit for relay 22—01 is at this time effective, the path being traced from conductor 22—06 over conductor 11—02 to the back contact and grounded armature 1 of relay 11—01 if that relay should at this time be released. It has previously been set forth that relay 11—01 is released when any one of the relays 12—01, 12—02 and 12—03 is operated to its right-hand contact because one of the incoming line or trunk circuit directors is in the process of seizing an idle one of the inward paths to the supplementary multiple address circuit. For example, one of the directors might have tested over one of the test leads 9—11, 9—12 and 9—13 and found only the inward path shown in Figs. 18, 19 and 20 idle. The seizure of that inward path would not be completed until the hold magnet in the link circuit had been operated, relay 18—02 had been operated by the hold magnet, relay 19—01 had been operated by relay 18—02, one of the relays 19—04, 19—03 and 19—07 had been operated from one of the relays 12—01, 12—02 and 12—03 over a path prepared by relay 19—01, until relay 18—08 had been operated by relay 19—04 or 19—03 or 19—07, and until relay 18—08 had released relay 19—01. The release of relay 22—01 before these operations had been accomplished would result in the transfer, at the left-hand armature of relay 22—01 of the test path from the fifth inward path to the first, causing the seizure of the first and the operation of relays in Figs. 22 and 23, and another hold magnet in the link circuit, namely the hold magnet 16—01, although certain relays in Figs. 18 and 19 and another hold magnet, the magnet 16—11 had been operated as part of the procedure of seizing the fifth inward path. The transfer of the test path following the release of relay 19—01 does not interfere with the routing of the message to the fifth inward path and the seizure by that path or two or more outward paths, so the relay 11—01, under the control of relays 12—01, 12—02 and 12—03, is arranged to prevent the release of relay 22—01 during the critical interval.

A further result of the release of relay 22—16 is the reconnection of ground to the operating windings of relays 24—02 and 24—03 to hold them in the marking condition. This completes the release and disconnection of apparatus in response to the end-of-message signal. The director in Fig. 9 has been restored to normal and is ready to route another message received over incoming line circuit 9—02. The first inward path to the supplementary multiple address circuit has been released and restored and is available to the same director or any other incoming line or trunk circuit director to receive a multiple address message having two, three or four addresses. The first, ninth and tenth outward paths have been released and restored to normal and they are available for seizure by the same or any other of the five inward paths to record in their reperforators another message preceded by the address code of a single station.

*Outward paths retransmit recorded messages*

The tape produced by reperforator 15—02 and containing codes representing B, letters C, D, letters, carriage return, line feed, the text of the message and the end-of-message signals feeds into transmitter 15—03 which has a director circuit 15—11 in the same manner that director 9—06 is associated with transmitter 9—07. This director circuit interprets the code combination for the character B as the first character of a two-letter address code and decodes it accordingly. The next code in the tape is the code combination for the letters signal, and as disclosed in the Bacon et al. application, the letters signal is one of several that a director discards when it is in the search or address decoding and message routing condition, as distinguished from the text transmission condition of the director that prevails after a connection has been made to an outlet. Moreover it is disclosed in the Bacon et al. application that when the director, in the search or address decoding condition, encounters a discard character following a character which it has interpreted as a valid first code of a two-letter address code, it discards not only the discard character, in this instance the letters code, but also the one that preceded it, in this instance the code for the character B. In this way the remainder of the supplementary multiple address code which the director that seized the supplementary multiple address circuit could not discard, has been discraded by the director 15—11. The next two characters in the tape are CD and the director 15—11 decodes them and tests for availability of one of the reperforators associated with outgoing line circuit 9—03 since the station CD to which the message in the tape is addressed is located on the multi-station line. Finding one of the reperforators idle the director 15—11 operates its select magnet 16—21, after which the appropriate one of the hold magnets 16—22 and 16—23, which are designated in Fig. 7 by the reference numerals 7—16 and 7—01, respectively, is operated to complete a transmission and control connection from director 15—11 and transmitter 15—03 to outgoing line circuit 9—03, and the message is transmitted to the outgoing line reperforator transmitter, which retransmits the message out over the multistation line when it gains access thereto in the manner described in the Bacon et al. application. At the end of the message the director 15—11 recognizes the disconnect signal comprising the codes, figures and H and the connection to outgoing line circuit 9—03 through the link circuit contained in Figs. 10 and 16 is broken by the release of hold magnets 16—22 and 16—23, and director 15—11 and the outgoing line circuit 9—03 are restored to normal.

Similarly the director associated with the reperforator transmitter in the ninth outward path decodes the address code BC, there being no extra characters preceding this address code in the tape because the extra characters were received only by the first outward path and were discarded, and the director associated with the ninth outward path seizes one of the outgoing line reperforators associated with the single station line, the terminating station of which is designated by the address code BG, whereupon select magnet 10—21 individual to the director associated with the ninth outward path is operated and then the appropriate hold magnet, which may be the magnet 16—24 is operated for establishing a connection to the seized reperforator of the outgoing line circuit of the single station line. At the end of the message the connection is broken under the control of the end-of-message signal.

In like manner transmitter 15—13 and director 15—21 of the tenth outward path cooperate to decode the signal address code contained in the tape perforated reperforator 15—12, namely the address code CA designating a station served by the switching center designated 1—51 in Fig. 1 and reached over trunk 1—48, and the connection is established by the operation of select magnet 10—22 followed by the operation of the proper hold magnet to establish a connection to one of the reperforators associated with the outgoing side of the full duplex trunk 1—48.

In this way each of the outward path transmitters gains access to the outgoing line or trunk over which the single addressee station of the message is reached, access to the outlet being gained under the control of the sequence circuit and through the link circuit or cross-bar switch in the same manner as any incoming line or trunk circuit transmitter. Director circuits 15—11 and 15—21 and those of the other outward paths may be identical with incoming line or trunk circuit directors, such as the director 2—07, 2—24 or 2—38. In common with the incoming line or trunk circuit directors, since they may be identical with those directors, the directors 15—11, 15—21 and other outward path directors may have their final code points or terminals for the supplementary multiple address routing codes AA, AB and AC connected in multiple to the test conductors 9—11, 9—12 and 9—13. Under any normal operating procedure it is unlikely that the directors 15—11, 15—21 and other outward path directors would ever find preceding a message in their transmitting tapes the address codes AA, AB or AC because the appearance of such codes would result in the routing back into the supplementary multiple address circuit of a message that had already been routed through that circuit, and would indicate multiple appearance of supplementary address circuit routing codes preceding a message.

*Alarm features*

In the description of the routing of the message into the supplementary multiple address circuit the release of relay 11—11 in the sequence circuit of the supplementary multiple address circuit, and the discharging of condenser 12—26 through resistor 12—28 to swing the grid of tube 12—27 toward ground was described but its function was not set forth. Tube 12—27 and relays controlled by it comprise an alarm circuit to bring in an alarm if the sequence circuit in Fig. 11 is in use longer than a predetermined interval in seizing the outward paths to receive a message. Failure to seize the required number of outward paths within the predetermined interval would be due to a trouble condition.

With relay 11—11 released, due to operation of any one of the five sequence circuit relays 11—04, 11—06, 11—07, 11—08 and 11—09 individual to the five inward paths, battery is disconnected from condenser 12—26 and it begins to discharge through resistor 12—28 and if the condenser discharges continuously for three seconds the plate current through the tube will have decreased as the grid swings toward ground to the point where it is insufficient to hold operated the relay 12—31 connected in the plate circuit. Relay 12—31, upon releasing, interrupts the circuit of slow-release relay 12—32 and this relay releases slowly. Upon releasing, it completes the energizing circuit for relay 12—33 which operates. At its lower armature the relay 12—33 completes the circuit of alarm lamp 12—34 which lights. At its upper armature the relay 12—33 connects ground to paths extending to the alarm circuit, one of these paths including the armature and back contact of relay 12—36. A similar sequence circuit alarm arrangement, including details of its cooperation with an alarm circuit, is shown in Fig. 90 of the Branson et al. patent and is fully described in the specification of that patent. Tube 12—27 hereinbefore described corresponds with tube 9020 and relays 12—31, 12—32, 12—33 and 12—36 hereinbefore described correspond with relays 9012, 9014, 9015 and 9019 of Fig. 90 of the Branson et al. patent. A minor difference between the two circuits is the provision in the Branson et al. disclosure of a relay 9013 interposed between relays 9012 and 9014, whereby relay 9012 releases relay 9013 which in turn releases the slow-release relay 9014 whereas the circuit shown in Fig. 12 hereinbefore described relay 12—31 directly releases the slow-release relay 12—32.

Another alarm feature mentioned previously but not described is the machine alarm individual to each outward path. In the description of the operations performed by relay 24—06 when it operates to establish paths for the transmission of the message text to the seized outward paths was the disconnection of ground at its armature 1 from a path traced to the winding of relay 14—18 in Fig. 14 and the relay 8—18 in Fig. 8, to place the machine alarm relays 14—29 and 8—29 under the control of the universal contacts of the outward path reperforators, in the case of the first outward path these contacts being designated 15—06. If the motor of the reperforator had not been running at the time the address codes were transmitted to reperforator 15—02, or if repeating relay 14—26 or selector magnet 15—01 had failed to respond to those signals the universal contacts 15—06 would not have closed on the make contact side and the circuit of universal relay 14—28, having been prepared at the armature 8 and front contact of relay 14—03 when that relay operated, would not have been completed, so that at the time of release of relay 14—18 the relay 14—28 would be unoperated. Under this condition the circuit of machine alarm relay 14—29 would be open at the right-hand armature of relay 14—28 and the relay 14—29 would release after a delay interval, because it has a slow release characteristic. If on the other hand the reperforator had properly responded to one or more signals but subsequently had failed with the universal contacts 15—06 off normal the circuit of machine alarm relay 14—29 would be opened at the break contacts and this relay would release. At its left-hand armature the relay 14—29 connects ground over conductor 14—31, which is one of the conductors in the group bracketed to Fig. 17, in which the conductor reappears and is traced to the uppermost cross-connection contacts of group 21—08, from which the path extends over conductor 21—33 and conductor 21—34 and the winding of machine alarm relay 22—14 in the first inward path to battery, and this relay operates. The machine alarm relay in each of the other outward paths, including the relay 8—29 in the tenth outward path, when it releases, connects ground through operated cross-connection contacts of the supplementary multiple address link circuit, in this case the contacts 21—23 in Fig. 21, to conductor 21—34 to operate the machine alarm relay 18—14. Returning to consideration of the first inward path, the relay 22—14, upon being operated, short-circuits resistor 22—12 included in the previously-traced circuit from battery through the winding of relay 22—02 in the first inward path and machine alarm relay 9—34 in the director circuit which seized and established the transmission path to the first inward path, to ground through the middle armature and front contact of start relay 9—39 of the director circuit. It was previously set forth that with resistor 22—12 effectively included in this circuit relay 22—02 operates but machine alarm relay 9—34 in the director circuit does not. With a shunt established across relay 22—12 due to the operation of relay 22—14 sufficient current flows to operate relay 9—34 and as is fully disclosed in the Bacon et al. application this relay causes a director tie-up alarm to be brought in and also stops transmission from transmitter 9—07.

At its right-hand armature the relay 14—29, upon releasing, connects ground over conductor 14—32 and armature 7 and front contact of relay 14—03 to the winding of tape-out relay 14—33, and this relay operates. At its outer right-hand armature and front contact the relay 14—33 completes a circuit over conductor 14—34 for lamp 15—09 which lights. At its inner right-hand armature the relay 14—33 completes a locking circuit over conductor 14—35 and break contacts 15—16 to ground. At its inner left-hand armature the relay 14—33 connects ground to conductor 14—37 which extends to the alarm circuit for bringing in an alarm, both audible and visible, indicative of the operated condition of relay 14—33.

The usual method of resuming transmission when a machine alarm has been registered is to disconnect the seized outward paths and restart the message tape in the incoming line or trunk transmitter from the beginning. As is fully disclosed in the Branson et al. patent and the Bacon et al. application each director circuit has a key associated with it which, when operated, will cause the generation and transmission of a disconnect signal comprising the code combinations, figures and H. The director circuit responds to this artificially manufactured end-of-message signal in the same manner that it would respond to such signal contained in the tape, namely by disconnecting the cross-office path over which transmission had been in progress. As applied to the present system this would cause the connected inward path and the seized outward paths to be restored to normal in the manner hereinbefore described, with an exception in the case of the first outward path. Upon the release of the relay 14—11 as part of the restoration an energizing path for relay 14—06 is established, the path being traced from battery through the winding of the relay, the back contact and outer left-hand armature of relay 14—11, conductors 14—41 and 14—42, the front contact and outer left-hand armature of relay 14—33, which is now operated and held over a circuit including the tape alarm release contact 15—16, conductors 14—44 and 14—43, break contacts controlled by armature 4 of relay 14—06, conductors 14—46 and 14—47, break contacts controlled by armature 13 of relay 22—18 and over conductor 22—39 and break contacts of corresponding relays in the second, third and fourth inward paths and finally through break contacts controlled by armature 13 of relay 18—18 to ground. Relay 14—06 connects ground on its armature 4 to the circuit of its winding in substitution for the ground supplied over conductor 14—46 and then interrupts the break contacts through which that ground connection was supplied, thereby locking itself. Relay 14—06 is a busy relay and indicates to the inward paths that it is not available for connection, in the same manner that that indication was given by relay 14—03 when the first outward path was seized, namely by interrupting at its armatures 1 and 2, conductive paths that were interrupted by armatures 2 and 1, respectively, of relay 14—03, and completing at its armatures 3 and 5 the paths that were completed at armatures 6 and 4, respectively, of relay 14—03.

The attendant now sets the incoming line or trunk circuit transmitter tape back to the beginning of the address codes, clears out the director tie-up alarm by operation of an alarm release key and restarts the transmitter. The director will proceed in the manner hereinbefore described to seize one of the inward paths into the supplementary multiple address circuits, not necessarily the same one, which in turn will seize the necessary number of outward paths, if a sufficient number is available, and the outward paths seized will not necessarily be the same ones and in any case the first outward path will not be seized because it is indicated as busy. When the attendant has remedied the trouble that caused reperforator 15—02 to fail, he momentarily opens tape alarm release key 15—16 which interrupts the locking circuit of relay 14—33. This relay releases and extinguishes lamp 15—09, disconnects ground from conductor 14—37 which extends to the alarm circuit and interrupts the locking circuit of relay 14—06. The latter relay releases to cancel the busy indication, whereby the first outward path is now available for seizure.

If the supply of tape in reperforator 15—02 becomes exhausted or substantially exhausted contacts 15—31 will close, connecting ground over conductors 15—32 and 14—32, armature 7 and front contact of relay 14—03 when that relay is operated, and winding of tape-out relay 14—33 to battery and this relay operates as it did when machine alarm relay 14—29 released, locking to the tape alarm release contacts 15—16. The operations performed by relay 14—33 are the same as those previously described, but because relay 14—29 has not operated ground is not connected over conductor 14—31 to bring in a machine alarm at the director which seized the outlets and this director is not brought into the tie-up condition nor is its transmitter stopped, and cross-office transmission to the outward paths continues. Tape reel contacts 15—31 are arranged to close while there is a sufficient supply of tape to complete the recording of any ordinary message so it may be expected that the complete message will be recorded by reperforator 15—02 and it is not necessary to suspend cross-office transmission. When the recording of the message has been completed and the director, in response to the end-of-message signal, breaks down the cross-office path and releases the inward path of the supplementary multiple address circuit, which in turn releases the connected outward paths, relay 14—11 releases and completes the circuit of busy relay 14—06 prepared by relay 14—33 so that the first outward path will test busy to an inward path seeking connection to outward paths until the attendant has replenished the supply of tape in reperforator 15—02 and has momentarily opened tape alarm release key 15—16 to release relay 14—33 which in turn releases relay 14—06.

When an attendant notes that the supply of tape in a reperforator, such as the reperforator 15—02, is running low he may prepare for replenishing the tape by closing the manually operable busy key 15—17, which is a locking key. This key places a shunt around the outer left-hand armature and front contact of relay 14—33, thereby preparing for operation of relay 14—06. If the outward path is not connected at the time busy key 15—17 is closed relay 14—11 will be released and relay 14—06 will operate immediately to give a busy indication and prevent seizure of the first outward path during the time that a new reel of tape is being placed in reperforator 15—02. If relay 14—11 is operated at the time key 15—17 is closed busy relay 14—06 will not operate until the end of the message that is being transmitted to reperforator 15—02, at which time relay 14—11 will release as part of the disconnect operation and complete the circuit of relay 14—06 to prevent seizure of the outward path until the attendant has supplied a new reel of tape and has reopened busy key 15—17.

As set forth in the Branson et al. patent there are certain circumstances under which it becomes necessary to sever the tape passing from a reperforator to its transmitter, such as the tape 15—04 passing from reperforator 15—02 to transmitter 15—03. The transmitter is provided with contacts held opened by a depressible pin that is maintained depressed by tape passing through the transmitter. When the free end of severed tape moves clear of the depressible pin in the transmitter the contacts close and complete the circuit of a relay in the associated director circuit the function of which is to register the detection by the depressible pin of the tape-out condition of the transmitter. Directors associated with the outward path reperforator transmitters, such as the director 15—11, are provided with such a transmitter tape-out relay and among other operations performed by that relay is the connection of ground to conductor 15—41, in the case of director 15—11 which extends to the winding of director tape-out relay 14—51 in the relay circuit of the first outward path. This relay locks to the ground supplied over conductor 14—36 from the tape alarm release key 15—16, extends ground over conductor 14—34 to light lamp 15—09, and extends ground over conductor 14—37 to the alarm circuit to bring in an alarm. This condition is remedied by inserting the end of the tape that is emerging from reperforator 15—02 into the transmitter 15—03 and restarting the transmitter. The occurrence of the tape-out condition of the transmitter does not in any way affect the operation of reperforator 15—02, and it may continue to receive signals from one of the incoming line or trunk circuit reperforator transmitters. Accordingly the relay 14—51 is not arranged to prepare for or establish a busy condition in the outward path nor to suspend transmission from the incoming line or trunk circuit transmitter from which the outward path is receiving signals nor to bring in a director tie-up condition in the director associated with that incoming line or trunk transmitter.

Figs. 18, 19 and 20 represent a fifth inward path and the operation thereof is the same as the operation of the first inward path shown in Figs. 22, 23 and 24. The relays and certain other elements of Figs. 18, 19 and 20 have been identified by reference numerals which correspond with those of Figs. 22, 23 and 24, the last two digits of the reference numerals being the same for corresponding relays and the first two being alike for all reference numerals on a figure of the drawings. Similarly, Fig. 17 contains the four sets of horizontal cross-bar switch conductors over which the fifth inward path may be connected to as many as four outward paths. The select magnets for these four levels of the cross-bar switch have been given reference numerals corresponding to those associated with the first inward path in Fig. 21. At the lower part of Fig. 17 the dotted rectangle 17—05 encloses multiple connections to the cross-bar switch vertical conductors representing cross-connection contacts corresponding to all of those shown in Fig. 21 for each of the second, third and fourth inward paths.

Although a specific embodiment of the invention has been shown in the drawings and described in the foregoing specification it will be understood that the invention is not limited to the specific embodiment so shown and described, but is capable of modification, substitution of parts, components and elements, and rearrangement of parts, elements and circuits without departing from the spirit of the invention.

What is claimed is:

1. In a telegraph switching system, a switching center having message recorders, switching means responsive to any of a plurality of switching control codes that may precede a received message for selecting a plurality of message recorders the number whereof is dependent upon the particular control code and differs for each of the several control codes, means for transmitting to each of said selected message recorders one of a plurality of station address codes intervening said control code and said message and thereafter transmitting the message to all of the selected recorders, and switching means controllable by said address codes for selecting retransmission channels for the message recorded in said message recorders.

2. In a telegraph switching system, a switching center having message recorders, switching means for selecting a plurality of message recorders the number whereof is equal to the number of station address codes preceding a message, means for transmitting to each of said selected message recorders one of said station address codes and thereafter transmitting the message to all of the selected recorders, and switching means controllable by said address codes for selecting retransmission channels for the message recorded in said message recorders.

3. In a telegraph switching center, a plurality of incoming transmission channels, a plurality of message recorders, switching means operable in response to code signals for receptively associating with any of said channels more than one of said recorders the number whereof is predetermined by the code signal monitoring means for indicating the exact number of available recorders when fewer than a predetermined number are available, and busy control means controlled by said monitoring means for precluding receptive association of any of said recorders with a channel when the number designated by the code signal exceeds the number available.

4. In a telegraph switching center, a plurality of incoming transmission channels, a plurality of message recorders, a plurality of paths of access to said recorders, switching means for associating any one of said paths of access with any of said channels, other switching means for receptively associating at least two of said recorders with any one of said paths of access, and monitoring means common to all of said paths of access for indicating the exact number of available recorders when fewer than a predetermined number are available.

5. In a telegraph switching center, a plurality of incoming transmission channels, a plurality of message recorders, a plurality of paths of access to said recorders, switching means for associating any one of said paths of access with any of said channels, other switching means for receptively associating from two to a predetermined number of said recorders with any one of said paths of access, and monitoring means common to all of said paths of access for indicating, when fewer than said predetermined number of said recorders are available, the exact number available.

6. In a telegraph switching system, an arrangement for converting a message addressed by code signals to a plurality of addressee stations to a plurality of messages each addressed by code signals to a single addressee station which comprises a plurality of message recorders, control means for receptively associating with itself two or more of said recorders in accordance with the number of stations to receive a message, means for transmitting address code signals and message signals to said recorders through said control means, counting means for counting the code signals comprising each address, distributor means controlled by said counting means for rendering each of the receptively associated recorders responsive to the address code signals comprising only one address, and means controlled by said distributor means for rendering all of the receptively associated recorders responsive to the message signals.

7. In a telegraph switching system, an arrangement for converting a message addressed by code signals to a plurality of addressee stations to a plurality of messages each addressed by code signals to a single addressee station which comprises a plurality of message recorders, control means for receptively associating with itself two or more of said recorders in accordance with the number of stations to receive a message, means for transmitting address code signals and message signals to said recorders through said control means, counting means for counting the code signals comprising each address, distributor means controlled by said counting means for rendering each of the receptively associated recorders responsive to the address code signals comprising only one address, and control means for said counting means conditioned in accordance with the number of said receptively associated recorders for disabling said counting means upon counting the code signals comprising addresses equal to the number of said receptively associated recorders.

8. In a telegraph switching center, a plurality of incoming transmission channels, a plurality of message recorders, a plurality of paths of access to said recorders, signal responsive switching means for associating any one of said paths of access with any one of said channels, means common to said paths of access and controlled by said switching means for indicating a definite number of said recorders to be seized, means individual to each of said paths for registering under the control of said common means an indication of said number, and recorder seizing means controlled by said registering means for receptively associating said number of recorders with the particular path of access.

9. In a telegraph switching center, a plurality of incoming transmission channels, a plurality of message recorders, a plurality of paths of access to said recorders, a control circuit common to said paths for controlling seizure of said paths individually by said channels to gain access to said recorders, switching means controllable by a seized path of access for receptively associating a plurality of said recorders with the particular channel, and means for indicating to said paths the availability of a predetermined number or fewer of said recorders, comprising a plurality of relays having their operating windings connected in series to be energized in common and having individual energizing circuits for their biasing windings to provide different effective biasing fluxes, parallel impedance paths from the series circuit of said operating windings to a source of energizing current, and means for interrupting one of said impedance paths upon and for the duration of receptive association of each of said recorders with one of said channels, whereby to cause said relays to change their indicative conditions only upon changes in recorder availability below said predetermined number.

10. In a telegraph switching center, a plurality of incoming transmission channels, a plurality of message recorders, a plurality of paths of access to said recorders, signal responsive switching means for associating any one of said paths of access with any one of said channels, means individual to said paths for registering under the control of said switching means a number of said recorders to be receptively associated with the particular path, distributing means individual to said paths for distributing message destination address codes to the associated recorders, and means controlled by said registering means for rendering all of the associated recorders receptive upon the distribution thereto of message destination address codes equal to the number registered by said registering means.

11. In a multiple address telegraph message switching system, a switching center having a plurality of incoming transmission channels over which messages preceded by message destination address codes are received, a plurality of message recorders, a plurality of paths of access to said recorders, switching means for associating any one of said paths of access with any one of said channels, means individual to said paths for registering under the control of said switching means the number of message destination address codes preceding the particular message, switching means controllable by said registering means for seizing a number of said recorders equal to the number of said message destination address codes, distributing means individual to said paths for distributing said address codes to the seized recorders, one address to each recorder, and means controlled by said registering means for deactivating said distributing means and for rendering all of the seized recorders responsive to the message following the last of said address codes.

12. In a multiple address telegraph message switching system, a switching center having a plurality of incoming transmission channels over which messages preceded by a plurality of message destination address codes and a code indicative of the number of said address codes are received, a plurality of message recorders, a plurality of paths of access to said recorders, switching means for associating any one of said paths of access with any one of said channels, means individual to said paths for registering under the control of said number indicative code a condition representing the number of message destination address codes preceding said message, switching means controllable by said registering means for seizing a number of said recorders equal to the number of said message destination address codes, means associated with said channels for retransmitting said message destination address codes and the message following, and transmission control means for causing each of said seized recorders to receive one of said message destination address codes and all of them to receive the message.

13. In a telegraph switching system, an arrangement for converting a message addressed by code signals to a plurality of addressee stations to a plurality of messages each addressed by code signals to a single addressee, which comprises a plurality of message recorders, control means for seizing two or more of said recorders in accordance with the number of stations to receive a message, relay means for repeating address code signals and message signals to said seized recorders, means effective after seizure of said two or more recorders for receptively associating them individually and in succession with said repeating means to receive code signals comprising a single address, and means for reassociating all of the seized recorders with said repeating means to receive the message signals.

14. In a multiple address telegraph message switching system, a switching center having a plurality of incoming transmission channels over which messages preceded by a plurality of message destination address codes and any one of a plurality of codes indicative of different numbers of said address codes are received, a plurality of message recorders, a plurality of paths of access to said recorders, switching means selectively controllable by said number indicating codes for seizing any one of said paths of access and registering therein the number of address codes, other switching means controlled by the seized path of access for receptively associating therewith a plurality of said recorders in accordance with the number of address codes registered in said path, means for transmitting the address codes and the message received over the particular incoming channel to the seized path of access, and address code distributing means for routing one message destination address code to each receptively associated recorder and the message to all of them.

15. In a telegraph switching system, an arrangement for converting a message addressed by accompanying address code signals to a plurality of stations to a plurality of messages each addressed by accompanying address code signals to a single station and in which each address code comprises a plurality of telegraph signal code combinations, which comprises a plurality of message recorders, control means for receptively associating with itself two or more of said recorders in accordance with the number of stations designated by accompanying address codes to receive a message, means for transmitting address code signals and message signals to said recorders through said control means, counting means for counting the code combinations comprising each address code, signal responsive means for pulsing said counting means, and distributing means controlled by said counting means for causing each of said receptively associated recorders to record the signal code combinations comprising one station address code.

16. In a telegraph switching system, an arrangement for converting a message addressed by accompanying address code signals to a plurality of stations to a plurality of messages each addressed by accompanying address code signals to a single station and in which each address code comprises a plurality of telegraph signal code combinations, which comprises a plurality of message recorders, control means for receptively associating with itself two or more of said recorders in accordance with the number of stations designated by accompanying address codes to receive a message, means for transmitting address code signals and message signals to said recorders through said control means, counting means for counting the code combinations comprising each address code, electron discharge means operable in cycles of one per signal code combination for pulsing said counting means, and distributing means controlled by said counting means for causing each of said receptively associated recorders to record the signal code combinations comprising one station address code.

17. In a telegraph switching system, an arrangement for converting a message addressed by accompanying address code signals to a plurality of stations to a plurality of messages each addressed by accompanying address code signals to a single station and in which each address code comprises a plurality of telegraph signal code combinations, which comprises a plurality of message recorders, control means for receptively associating with itself two or more of said recorders in accordance with the number of stations designated by accompanying address codes to receive a message, means for transmitting address code signals and message signals to said recorders through said control means, counting means for counting the code combinations comprising each address code, electron discharge means in a flip-flop circuit having one condition of stability and operated out of the stable condition in response to each signal code combination for pulsing said counting means, and distributing means controlled by said counting means for causing each of said receptively associated recorders to record the signal code combinations comprising one station address code.

18. In a telegraph switching system, a switching center having means for recording incoming messages having accompanying destination designating codes, switching means controllable by said codes for selecting outgoing channels for retransmission of incoming messages, a plurality of message recorders, a plurality of paths of access thereto selectable by said switching means in response to particular destination designating codes, switching means controlled by said paths of access for seizing a plurality of said recorders to record a message, and means associated with said recorders for controlling said first-mentioned switching means in common with said incoming message recording means to give said recorders message transmitting access to said outgoing channels.

19. In a telegraph switching center, a plurality of incoming transmission channels, a plurality of message recorders, a plurality of paths of access to said recorders, signal responsive switching means for seizing any one of said paths of access for receptive association with any one of said channels, sequence means for precluding concurrent seizure of two or more of said paths of access for association with a like number of said channels, switching means for receptively associating two or more of said recorders with a seized path of access, and means in said sequence means for precluding release of a path of access to idle condition during seizure of another of said paths.

20. In a telegraphic message switching system, means for recording in succession on a medium indicia representing several addresses followed by a message to be sent to each address, means including a transmitter controlled by said indicia, a plurality of channels of transmission seizable by said transmitter, a recorder on each channel for receiving from said transmitter, an address distributor whereby all but one of said addresses are selectively suppressed from each said recorder, and means whereby identical messages are transmitted to said recorders under control of the indicia representing messages.

21. A multiple address message transmission system having a message originating sender for initiating messages each of which is accompanied by codes representing several distinct coded addresses, means including switching apparatus for selectively switching and retransmitting each such message under control of each of its address representing codes to each of said addresses accompanied by signals representing the said coded address to the exclusion of other codes representing other addresses originally accompanying the message, and a selective address suppressor for excluding said other address codes.

22. In a switching system, means for producing a record bearing a sequence of codes representing indicia in successive groups, means adapted to sense such indicia in succession in a straight-forward direction without back-stepping, different of said groups having distinctive functional purposes, a channel connectable to said sensing means for the transmission thereover of code groups representing and under control of said indicia, a recording device connectable to said channel to receive and record indicia under control of said transmission, suppressing means for causing said recording device to omit recording in response to certain intermediate portions of said sensed indicia, and determining means whereby the portions whose recording is to be omitted are determined.

23. In a switching system, means for producing records bearing indicia representing messages having address information including variable numbers of addresses represented by address-representing indicia accompanying the indicia representing each message, different transmission paths, means controlling the selection of said transmission paths, certain of said paths being assigned to the transmission of messages having numbers of addresses within a given range and certain others assigned to the transmission of messages having numbers of addresses in some other range, and means controlled by the address information of a given message to select transmission paths assigned for the transmission of messages having the number of addresses possessed by the given message.

24. In a telegraph switching system, a source of signals comprising a message preceded by signals designating a plurality of addressee destinations for said message and by signals representing the number of said destinations, a plurality of message storing repeaters, switching means selectively controllable by said number representation signals for connecting the represented number of said storing repeaters to said source, distributing means for causing each of the connected storing repeaters to store the signals designating one only of said addressee destinations, and other switching means selectively controllable by said stored destination designating signals for routing the message to the designated destinations.

25. In a telegraph switching system, a source of signals comprising a message preceded by signals designating a plurality of addressee destinations for said message and by signals representing the number of said destinations, a plurality of message storing repeaters the number whereof is at least twice the highest destination representing number, switching means selectively controllable by said number representation signals for connecting from among idle ones of said storing repeaters the represented number thereof to said source, distributing means for causing each of the connected storing repeaters to store the signals designating one only of said addressee destinations, and other switching means selectively controllable by said stored destination designating signals for routing the message to the designated destinations.

26. In a telegraph switching system, a plurality of sources of signals comprising messages each preceded by signals designating a plurality of addressee destinations for said message and by signals representing the number of said destinations, a plurality of message storing repeaters the number whereof is at least twice the highest destination representing number, switching means selectively controllable by said number representation signals for connecting from among the idle ones of said storing repeaters the represented number thereof to said sources as long as there are sufficient idle ones available to satisfy the represented numbers, distributing means for causing each of the connected storing repeaters to store the signals designating one only of said addressee destinations, and other switching means selectively controllable by said stored destination designating signals for routing the message to the designated destinations.

27. In a telegraph switching system, a plurality of sources of signals comprising messages each preceded by signals designating a plurality of addressee destinations for said message and by signals representing the number of said destinations, a plurality of message storing repeaters the number whereof is at least twice the highest destination representing number, switching means available to said signal sources one at a time and selectively controllable by the number representation signals for connecting from among the idle ones of said storing repeaters the represented number thereof to said sources as long as there are sufficient idle ones available to satisfy the represented number, distributing means for causing the connected storing repeaters to store the signals designating one only of said addressee destinations, and means for precluding access of a signal source to said switching means during the operation of said distributing means to distribute signals designating addressee destinations from another signal source to storing repeaters connected thereto.

DAVID E. BRANSON.
GEORGE A. LOCKE.

References Cited in the file of this patent

UNITED STATES PATENTS

| Number | Name | Date |
|---|---|---|
| 2,365,750 | Dore | Dec. 26, 1944 |
| 2,587,253 | Vernan | Feb. 26, 1952 |
| 2,599,988 | Halvorsen | June 10, 1952 |